(12) United States Patent
Zhou

(10) Patent No.: US 12,445,676 B2
(45) Date of Patent: Oct. 14, 2025

(54) COMBINED DISPLAY METHOD, MOBILE DEVICE, AND ELECTRONIC DEVICE

(71) Applicant: HUAWEI TECHNOLOGIES CO., LTD., Guangdong (CN)

(72) Inventor: Ding Zhou, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 157 days.

(21) Appl. No.: 18/263,692

(22) PCT Filed: Jan. 5, 2022

(86) PCT No.: PCT/CN2022/070384
§ 371 (c)(1),
(2) Date: Jul. 31, 2023

(87) PCT Pub. No.: WO2022/161128
PCT Pub. Date: Aug. 4, 2022

(65) Prior Publication Data
US 2024/0314388 A1    Sep. 19, 2024

(30) Foreign Application Priority Data

Jan. 31, 2021   (CN) .......................... 202110132290.5

(51) Int. Cl.
*H04N 21/4363*   (2011.01)
*H04N 21/41*     (2011.01)
(Continued)

(52) U.S. Cl.
CPC ... *H04N 21/43637* (2013.01); *H04N 21/4122* (2013.01); *H04N 21/41407* (2013.01); *H04N 21/472* (2013.01); *G09G 2300/026* (2013.01)

(58) Field of Classification Search
CPC ..... G06F 17/16; G06F 3/14; G09G 2300/026; H04N 21/41; H04N 21/4122;
(Continued)

(56) References Cited

U.S. PATENT DOCUMENTS

2012/0242868 A1* 9/2012 Anzai ................... G08C 17/00
                                                348/240.99
2016/0103650 A1* 4/2016 Lim ....................... G06F 3/147
                                                345/2.2
(Continued)

FOREIGN PATENT DOCUMENTS

| CN | 106598524 A | 4/2017 |
| CN | 109271125 A | 1/2019 |
| CN | 110515572 A | 11/2019 |

*Primary Examiner* — Dmitriy Bolotin

(57) ABSTRACT

A combined display method includes: the mobile device broadcasts a first message in response to receiving a first input, where the first message indicates that the combined display needs to be performed; the mobile device obtains a first image, where the first image includes a first display and a second display, the first display displays first information, and the second display displays second information; the mobile device sends a second message to a first electronic device, where the second message includes the first information, the second information, orientation information of the first display and the second display, a size proportion relationship between the first display and the second display, and a correspondence between the first information and the first display; and the first electronic device controls, in response to receiving the second message, a plurality of electronic devices to perform combined display.

20 Claims, 44 Drawing Sheets

(51) Int. Cl.
*H04N 21/414* (2011.01)
*H04N 21/472* (2011.01)

(58) Field of Classification Search
CPC ........... H04N 21/41407; H04N 21/422; H04N 21/43637; H04N 21/472
See application file for complete search history.

(56) References Cited

U.S. PATENT DOCUMENTS

| | | | |
|---|---|---|---|
| 2020/0278822 A1* | 9/2020 | Kwon | G06F 3/04886 |
| 2021/0405828 A1* | 12/2021 | Jiang | G06Q 30/0633 |
| 2022/0326902 A1* | 10/2022 | Raucher | H04M 7/0027 |
| 2024/0314388 A1* | 9/2024 | Zhou | H04N 21/422 |

* cited by examiner

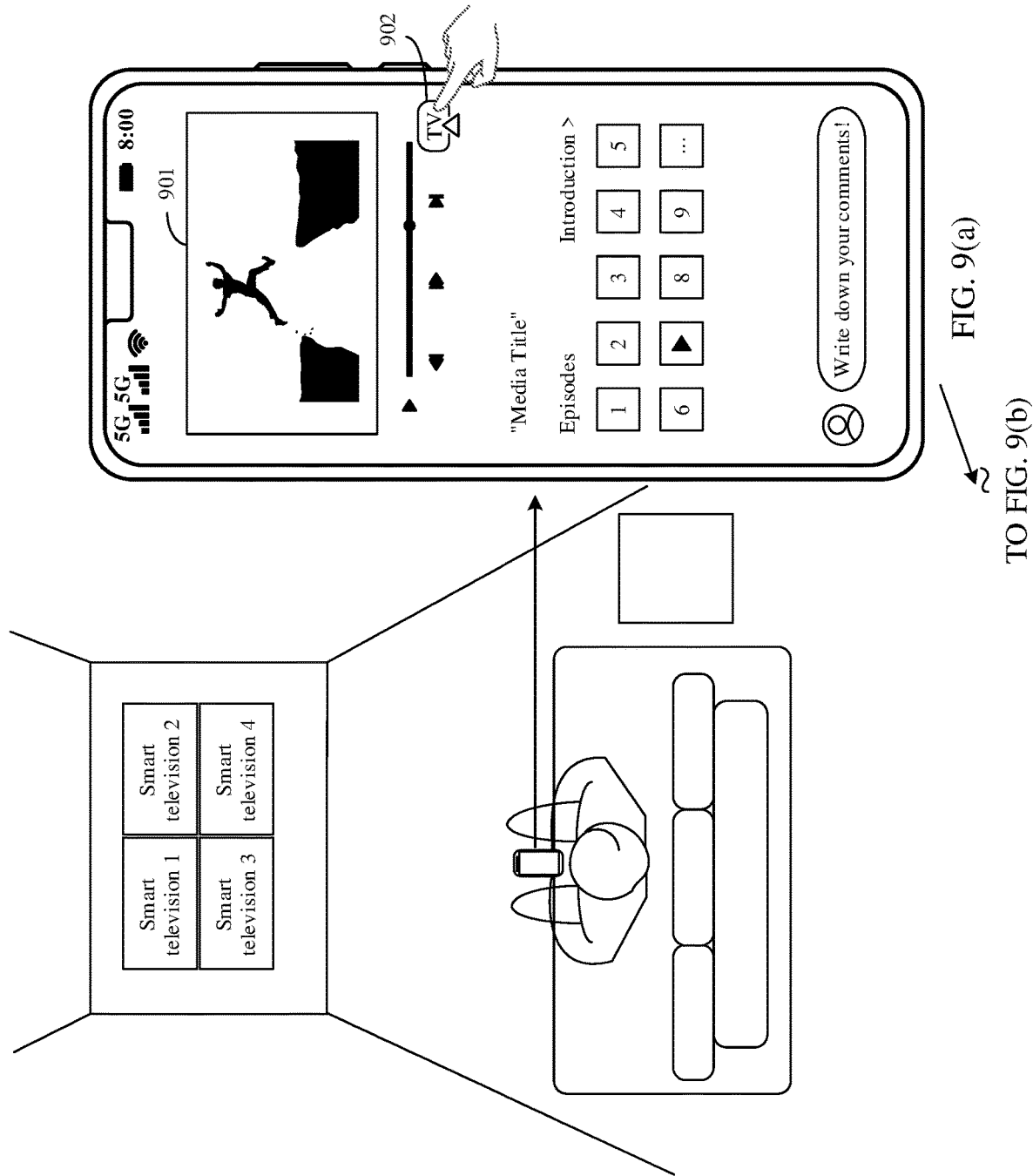

COMBINED DISPLAY METHOD, MOBILE DEVICE, AND ELECTRONIC DEVICE

CROSS-REFERENCE TO RELATED APPLICATIONS

This application is a National Stage of International Application No. PCT/CN2022/070384 filed on Jan. 5, 2022, which claims priority to Chinese Patent Application No. 202110132290.5 filed on Jan. 31, 2021. Both of the aforementioned applications are hereby incorporated by reference in their entireties.

TECHNICAL FIELD

This application relates to the communication field, and specifically, to a combined display method, a mobile device, and an electronic device.

BACKGROUND

Generally, compared with an electronic device having a small display size, an electronic device having a large display size brings a better visual impact effect and better user experience to a user during use. However, the electronic device having a large display size is limited by manufacturing technologies and entails significantly higher costs.

In an occasion such as a stage performance or home viewing, joint display of a plurality of electronic devices having small display sizes can be implemented through a screen splitting device and a wired connection between different electronic devices, so that a distant audience can also feel a good display effect, or a display effect the same as that of the electronic device having a large display size is implemented. However, complex cabling and a dedicated screen splitting device (for example, a screen splitter) are required to control combinations of different displays of different electronic devices and image display. Consequently, hardware costs are increased.

Therefore, how to implement combined display of the foregoing plurality of different electronic devices by using different electronic devices having small display sizes while reducing hardware costs becomes a technical problem to be resolved.

SUMMARY

To resolve the foregoing technical problem, this application provides a combined display method, a mobile device, and an electronic device. According to the technical solutions provided in this application, no dedicated screen splitting device is required. In addition, complex cabling between different electronic devices is not required in a wireless manner. Because the screen splitting device and cabling between different electronic devices are not used, costs are accordingly reduced. In addition, combined display performed by a plurality of different electronic devices is implemented.

According to a first aspect, a combined display system is provided. The system includes a mobile device, a first electronic device, and a second electronic device that are located in a same local area network. The first electronic device includes a first display, and the second electronic device includes a second display. The mobile device is configured to broadcast a first message in response to a received first input, where the first message indicates that combined display needs to be performed. The first electronic device is configured to display first information on the first display in response to the received first message, where the first information indicates address information of the first electronic device. The second electronic device is configured to display second information on the second display in response to the received first message, where the second information indicates address information of the second electronic device. The mobile device is further configured to obtain a first image, where the first image includes the first display and the second display, the first display displays the first information, and the second display displays the second information. The mobile device is further configured to: select the first electronic device corresponding to the first display as a main control device, and send a second message to the first electronic device, where the second message includes the first information, the second information, orientation information of the first display and the second display, and a correspondence between the first information and the first display that are obtained by the mobile device based on the first image; and the second message further indicates that the first electronic device is selected as the main control device. The first electronic device is further configured to: control, in response to the received second message, the first display and the second display to perform combined display.

In this way, the mobile device sends the first message, to trigger the first electronic device to display the first information used to indicate the address information of the first electronic device, and trigger the second electronic device to display the second information used to indicate the address information of the second electronic device. After obtaining the first image, the mobile device may determine orientation information and the address information of the first electronic device and the second electronic device. The mobile device may indicate the orientation information and the address information of the first electronic device and the second electronic device to the first electronic device, so that the first electronic device can control the first display and the second display to perform combined display. No dedicated screen splitting device is required. In addition, complex cabling between different electronic devices is not required in a wireless manner. Because the screen splitting device and cabling between different electronic devices are not used, costs are accordingly reduced. In addition, combined display performed by a plurality of different electronic devices is implemented.

Optionally, the mobile device may send only the first image to the first electronic device, and the first electronic device obtains the first information, the second information, the orientation information of the first display and the second display, and the correspondence between the first information and the first display based on the first image. The first electronic device may determine, based on whether the first image is sent to the first electronic device, that the first electronic device is a selected main control device. The optional manner may also be used in another embodiment of this application.

In some possible implementations, the first information, the second information, the orientation information of the first display and the second display, and the correspondence between the first information and the first display may be carried in the second message. The information used to indicate that the first electronic device is selected as the main control device may be carried in a third message. The second message and the third message are different messages.

In some possible implementations, the second message further includes a correspondence between the second information and the second display.

With reference to the first aspect, in some implementations of the first aspect, the selecting the first electronic device corresponding to the first display as a main control device includes: The mobile device receives user selection for the first electronic device corresponding to the first display; and the mobile device records the first electronic device as the main control device in response to the user selection. In this way, it is convenient for a user to select one electronic device from a plurality of electronic devices as a main control device, and the main control device controls the plurality of electronic devices for combined display to display images.

With reference to the first aspect, in some implementations of the first aspect, the selecting the first electronic device corresponding to the first display as a main control device includes: The mobile device randomly selects the first electronic device corresponding to the first display as the main control device.

With reference to the first aspect, in some implementations of the first aspect, the first electronic device and the second electronic device are further configured to maintain a first state after being powered on, until duration elapsing after the power-on reaches preset duration or until the first electronic device and the second electronic device receive the second message, a notification message, or a stop message. In the first state, the first electronic device and the second electronic device are configured to display the first information and the second information respectively on the first display and the second display after receiving the first message from the mobile device. The first electronic device is further configured to send a notification message to the second electronic device after receiving the second message from the mobile device, where the notification message indicates the second electronic device to stop being in the first state. The second electronic device is further configured to enter a second state after receiving the notification message. In the second state, the second electronic device is controlled only by the main control device. The second electronic device is further configured to skip displaying the second information on the second display after receiving the stop message.

In some possible implementations, the first state is a to-be-discovered state.

With reference to the first aspect, in some implementations of the first aspect, the controlling the first display and the second display to perform combined display includes: The first electronic device receives a to-be-displayed image frame; segments the image frame based on the orientation information of the first display and the second display, the size proportion relationship between the first display and the second display, and a size of the first display, to obtain a first partial image and a second partial image; displays the first partial image on the first display; sends the second partial image to the second electronic device; and indicates to display the second partial image on the second display. The size of the first display may be obtained by the first electronic device, and then the first electronic device may obtain a size of the second display based on the size proportion relationship between the first display and the second display.

In some possible implementations, the orientation information of the first display and the second display may be a relative position relationship between the first display and the second display.

With reference to the first aspect, in some implementations of the first aspect, the segmenting the image frame based on the orientation information of the first display and the second display, the size proportion relationship between the first display and the second display, and a size of the first display includes: segmenting the image frame based on the orientation information of the first display and the second display, the size of the first display, and the size of the second display.

With reference to the first aspect, in some implementations of the first aspect, the image frame comes from projection data of the mobile device.

With reference to the first aspect, in some implementations of the first aspect, the mobile device is specifically configured to: before obtaining the first image, prompt to photograph the first display and the second display that need to perform combined display; and obtain the first image in response to a detected photographing operation performed on the first display and the second display.

With reference to the first aspect, in some implementations of the first aspect, the first information indicates a media access control layer MAC address of the first electronic device, and the second information indicates a MAC address of the second electronic device.

According to a second aspect, a combined display method is provided, where the method is applied to a mobile device. The mobile device, a first electronic device, and a second electronic device are located in a same local area network. The first electronic device includes a first display, and the second electronic device includes a second display. The method includes: receiving a first input; and broadcasting a first message in response to the first input, where the first message indicates that combined display needs to be performed; obtaining a first image, where the first image includes the first display and the second display, the first display displays first information, the second display displays second information, the first information indicates address information of the first electronic device, and the second information indicates address information of the second electronic device; selecting the first electronic device corresponding to the first display as a main control device, and sending a second message to the first electronic device, where the second message includes the first information, the second information, orientation information of the first display and the second display, and a correspondence between the first information and the first display that are obtained by the mobile device based on the first image, and the second message further indicates that the first electronic device is selected as the main control device; and sending an image frame to the first electronic device, or sending a link address to the first electronic device.

With reference to the second aspect, in some implementations of the second aspect, the selecting the first electronic device corresponding to the first display as a main control device includes: The mobile device receives user selection for the first electronic device corresponding to the first display; and the mobile device records the first electronic device as the main control device in response to the user selection.

With reference to the second aspect, in some implementations of the second aspect, the selecting the first electronic device corresponding to the first display as a main control device includes: The mobile device randomly selects the first electronic device corresponding to the first display as the main control device.

With reference to the second aspect, in some implementations of the second aspect, the image frame comes from projection data of the mobile device.

With reference to the second aspect, in some implementations of the second aspect, the first information indicates a media access control layer MAC address of the first electronic device, and the second information indicates a MAC address of the second electronic device.

According to a third aspect, a combined display method is provided, where the method is applied to a first electronic device. The first electronic device, a second electronic device, and a mobile device are located in a same local area network. The first electronic device includes a first display, and the second electronic device includes a second display. The method includes: The first electronic device receives a first message, where the first message indicates that combined display needs to be performed; the first display displays first information in response to the received first message, where the first information indicates address information of the first electronic device; the first electronic device receives a second message sent by the mobile device, where the second message includes the first information, the second information, orientation information of the first display and the second display, and a correspondence between the first information and the first display that are obtained by the mobile device based on a first image, and the second message further indicates that the first electronic device is selected as a main control device; and the first electronic device controls, in response to the received second message, the first display and the second display to perform combined display.

With reference to the third aspect, in some implementations of the third aspect, before the first electronic device receives the first message, the method further includes: The first electronic device maintains a first state after being powered on, until duration elapsing after the power-on reaches preset duration or until the first electronic device receives the second message, where in the first state, the first electronic device is configured to display the first information on the first display after receiving the first message from the mobile device.

With reference to the third aspect, in some implementations of the third aspect, the method further includes: The first electronic device sends a notification message to the second electronic device after receiving the second message from the mobile device, where the notification message indicates the second electronic device to stop being in the first state.

With reference to the third aspect, in some implementations of the third aspect, that the first electronic device controls the first display and the second display to perform combined display includes: The first electronic device receives a to-be-displayed image frame; segments the image frame based on the orientation information of the first display and the second display, a size proportion relationship between the first display and the second display, and a size of the first display, to obtain a first partial image and a second partial image; displays the first partial image on the first display; sends the second partial image to the second electronic device; and indicates to display the second partial image on the second display.

With reference to the third aspect, in some implementations of the third aspect, the first information indicates a media access control layer MAC address of the first electronic device, and the second information indicates a MAC address of the second electronic device.

According to a fourth aspect, a mobile device is provided, including one or more processors, one or more memories, and one or more computer programs. The one or more computer programs are stored in the memory. When the mobile device runs, the processor executes the one or more computer programs stored in the memory, so that the mobile device performs the method according to any implementation of the second aspect.

According to a fifth aspect, an electronic device is provided, including one or more processors, one or more memories, and one or more computer programs. The one or more computer programs are stored in the memory. When the electronic device runs, the processor executes the one or more computer programs stored in the memory, so that the electronic device performs the method according to any implementation of the third aspect.

According to a sixth aspect, this application provides a computer storage medium, including computer instructions. When the computer instructions are run on a mobile device, the mobile device is enabled to perform the method according to any implementation of the second aspect; or when the computer instructions are run on an electronic device, the electronic device is enabled to perform the method according to any implementation of the third aspect.

According to a seventh aspect, this application provides a computer program product. When the computer program product is run on a mobile device, the mobile device is enabled to perform the method according to any implementation of the second aspect; or when the computer program product is run on an electronic device, the electronic device is enabled to perform the method according to any implementation of the third aspect.

It may be understood that the mobile device, the electronic device, the computer storage medium, and the computer program product provided above are all configured to perform the corresponding methods provided above. Therefore, for beneficial effects that can be achieved by the mobile device, the electronic device, the computer storage medium, and the computer program product, refer to beneficial effects in the corresponding methods provided above. Details are not described herein again.

BRIEF DESCRIPTION OF DRAWINGS

FIG. 9(a) and FIG. 9(b) show a set of graphical user interfaces according to an embodiment of this application;

FIG. 10(a)-1 to FIG. 10(h) show another set of graphical user interfaces according to an embodiment of this application;

FIG. 11(a)-1 to FIG. 11(b)-2 show another set of graphical user interfaces according to an embodiment of this application;

DESCRIPTION OF EMBODIMENTS

Figure 1:
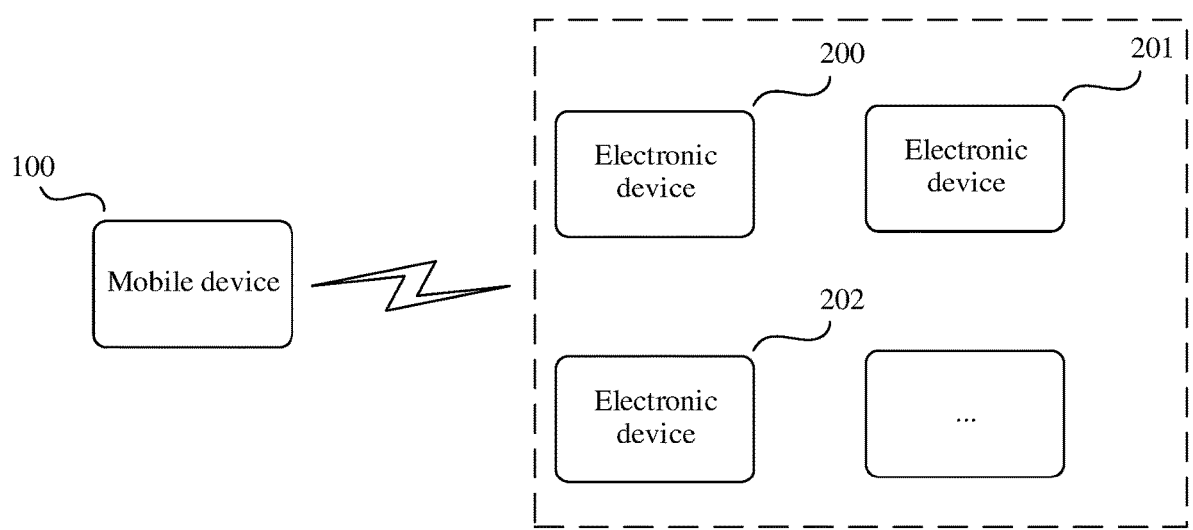
FIG. 1 is a schematic diagram of a scenario of a combined display method according to an embodiment of this application.

The following describes the technical solutions in embodiments of this application with reference to the accompanying drawings in embodiments of this application. In the descriptions of embodiments of this application, terms used in the following embodiments are merely intended to describe purposes of specific embodiments, but are not intended to limit this application. As used in the specification and appended claims of this application, singular expressions "a", "the", "the foregoing", "this", and "the one" are also intended to include expressions such as "one or more", unless the contrary is clearly indicated in the context. It should be further understood that in the following embodiments of this application, "at least one" and "one or more" mean one or more than two (including two). The term "and/or" is used to describe an association relationship between associated objects and represents that three relationships may exist. For example, A and/or B may represent the following cases: Only A exists, both A and B exist, and only B exists, where A and B may be singular or plural. A character "/" generally represents an "or" relationship between the associated objects.

Reference to "an embodiment", "some embodiments", or the like described in this specification indicates that one or more embodiments of this application include a specific feature, structure, or characteristic described with reference to the embodiment. Therefore, statements such as "in one embodiment", "in some embodiments", "in some other embodiments", and "in still some other embodiments" that appear in this specification and differ from each other do not necessarily refer to a same embodiment; instead, it means "one or more, but not all, embodiments", unless otherwise specifically emphasized. The terms "comprise", "include", "have", and other variants thereof all mean "include but are not limited to", unless specifically emphasized in another manner. The term "connection" includes direct connection and indirect connection, unless otherwise specified. "First" and "second" are merely intended for a purpose of description, and shall not be understood as an indication or implication of relative importance or implicit indication of the number of indicated technical features.

In embodiments of this application, the word "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the term "example", "for example", or the like is intended to present a related concept in a specific manner.

Generally, compared with an electronic device having a small display size, an electronic device having a large display size brings a better visual impact effect and better user experience to a user during use. However, the electronic device having a large display size is limited by manufacturing technologies and entails significantly higher costs. In an occasion such as a stage performance or home viewing, joint display of a plurality of electronic devices having small display sizes can be implemented through a wired connection between different electronic devices and by using a screen splitting device, so that a distant audience can also feel a good display effect, or a display effect the same as that of the electronic device having a large display size is implemented. However, complex cabling and a dedicated screen splitting device (for example, a screen splitter) are required to control combinations and image display of different displays of different electronic devices, thereby increasing hardware costs. Therefore, how to implement combined display of the foregoing plurality of different electronic devices by using different electronic devices having small display sizes while reducing hardware costs becomes a technical problem to be resolved.

To resolve the foregoing technical problem, this application provides a combined display method, a mobile device, an electronic device, and a combined display system. According to the technical solutions provided in this application, no dedicated screen splitting device is required. In addition, complex cabling between different electronic devices is not required in a wireless manner. Because the screen splitting device and cabling between different electronic devices are not used, costs are accordingly reduced. In addition, combined display performed by a plurality of different electronic devices is implemented.

For example, FIG. 1 shows a schematic diagram of a scenario of a combined display method according to an embodiment of this application. As shown in FIG. 1, a mobile device 100 and a plurality of electronic devices (for example, an electronic device 200, an electronic device 201, and an electronic device 202) are located in a same local area network. When receiving a first input, the mobile device 100 may send a broadcast message to the plurality of electronic devices. The broadcast message indicates the plurality of electronic devices in the local area network to enter a combined display state. After receiving the broadcast message, the plurality of electronic devices may display, on respective displays, information used to indicate addresses of the plurality of electronic devices. The mobile device 100 may determine orientation information of each electronic device in the plurality of electronic devices and address information of each electronic device based on a first image. The mobile device 100 may send indication information to one (for example, the electronic device 200) of the plurality of electronic devices, where the indication information indicates the orientation information of each electronic device in the plurality of electronic devices and the address information of each electronic device. The electronic device 200 that receives the indication information may segment, based on the indication information, an image that needs to be displayed, to display a part of the image on a display of the electronic device 200, and send the other part of the image to another electronic device.

In this embodiment of this application, the mobile device includes but is not limited to a smartphone, a tablet computer, and a wearable electronic device (such as a smart watch, a smart band, a smart ring, and smart glasses) with a wireless communication function. An example embodiment of the mobile device includes, but is not limited to, a portable electronic device on which iOS®, Android®, Harmony®, Windows, Linux, or another operating system is installed. The mobile device may alternatively be another portable device such as a laptop (Laptop). It should be further understood that, in some other embodiments, the mobile device may not be a portable device, but a desktop computer.

Figure 2:
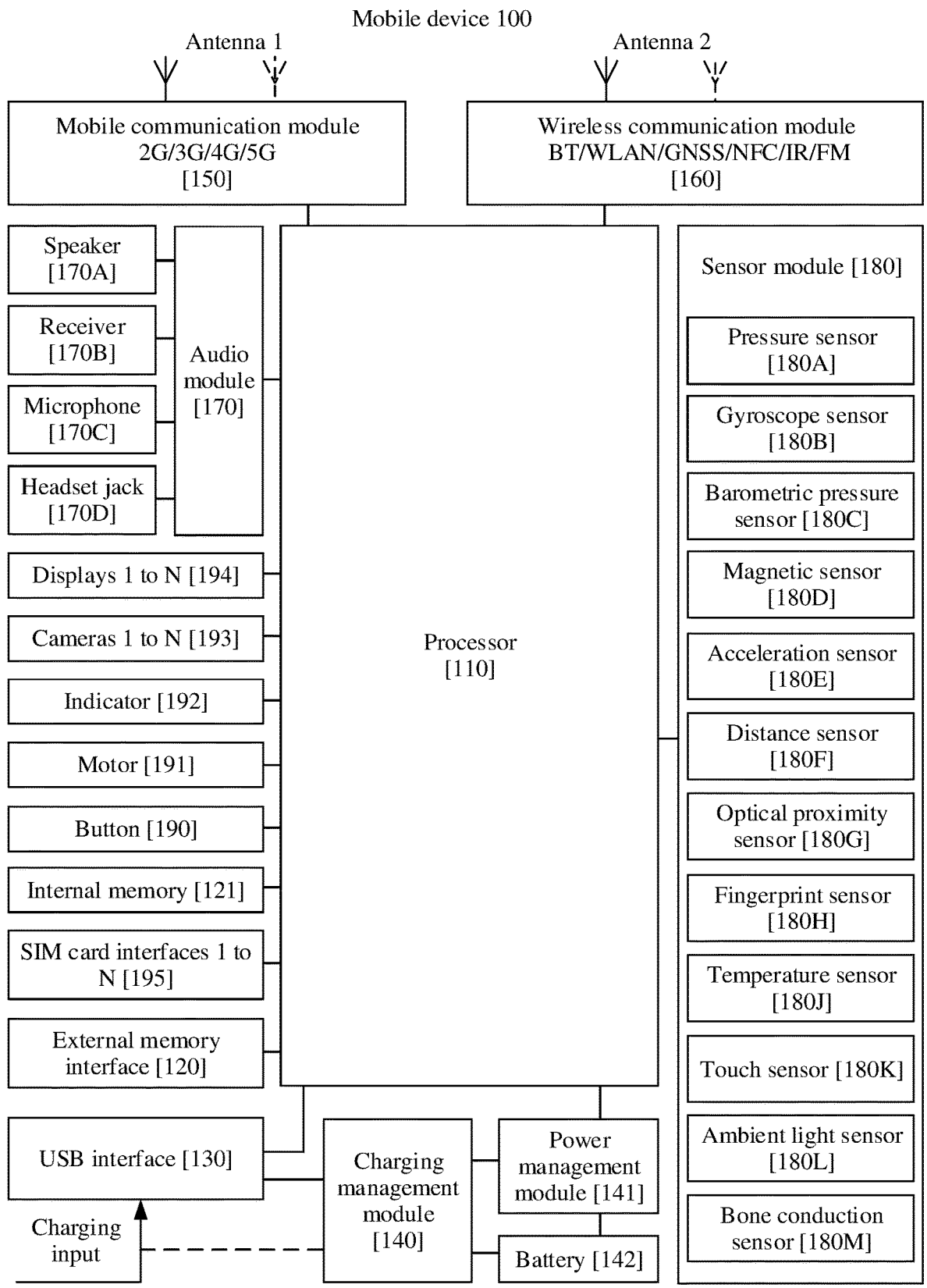
FIG. 2 is a schematic diagram of a hardware structure of a mobile device according to an embodiment of this application.

For example, FIG. 2 shows a hardware structure of the mobile device 100 according to an embodiment of this application. As shown in FIG. 2, the mobile device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that, a structure illustrated in this embodiment of this application does not constitute a specific limitation on the mobile device 100. In some other embodiments of this application, the mobile device 100 may include more or fewer components than those shown in the figure, or combine some components, or split some components, or have different component arrangements. The components shown in the figure may be implemented by hardware, software, or a combination of software and hardware.

The charging management module 140 is configured to receive a charging input from a charger. The power management module 141 is configured to connect to the battery 142, the charging management module 140, and the processor 110. A wireless communication function of the mobile device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the mobile device 100 may be configured to cover one or more communication frequency bands. Different antennas may be multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the mobile device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the mobile device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In this embodiment of this application, the mobile device 100 may send a broadcast message by using the wireless communication module 160. The broadcast message indicates electronic devices in the local area network to enter a combined display state. The mobile device 100 may send indication information to the electronic device 200 by using the wireless communication module 160, where the indication information indicates the orientation information of each electronic device in the plurality of electronic devices and the address information of each electronic device.

In some embodiments, in the mobile device 100, the antenna 1 and the mobile communication module 150 are coupled, and the antenna 2 and the wireless communication module 160 are coupled, so that the mobile device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The mobile device 100 may implement a photographing function through the ISP, the camera 193, the video codec, the GPU, the display 194, the application processor, and the like.

The external memory interface 120 may be configured to connect to an external storage card, for example, a Micro SD card, to extend a storage capability of the mobile device 100. The external storage card communicates with the processor 110 through the external memory interface 120, to implement a data storage function. For example, files such as music and videos are stored in the external storage card.

The mobile device 100 may implement audio functions, for example, a music playing function and a recording function, by using the audio module 170, the speaker 170A, the receiver 170B, the microphone 170C, the headset jack 170D, the application processor, and the like.

Figure 3:
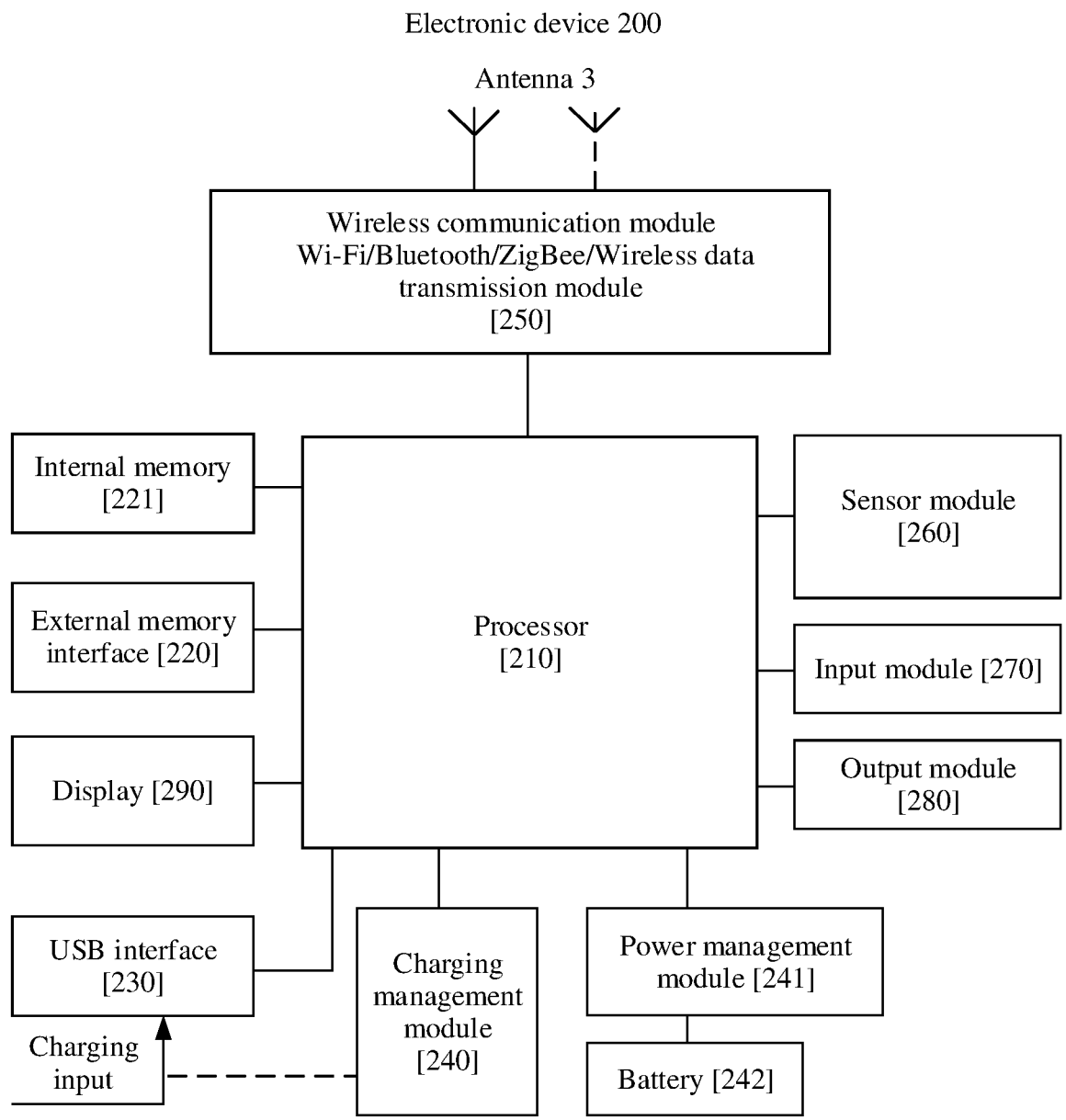
FIG. 3 is a schematic diagram of a hardware structure of an electronic device according to an embodiment of this application.

For example, FIG. 3 shows a hardware structure of the electronic device 200 according to an embodiment of this application. The electronic device 200 may include a processor 210, an external memory interface 220, an internal memory 221, a universal serial bus (universal serial bus, USB) interface 230, a charging management module 240), a power management module 241, a battery 242, an antenna 3, a wireless communication module 250, a sensor module 260, an input module 270, an output module 280, a display 290, and the like.

It may be understood that the structure shown in this embodiment of this application does not constitute a specific limitation on the electronic device 200. In some other embodiments of this application, the electronic device 200 may include more or fewer components than those shown in the figure, or combine some components, or split some components, or have different component arrangements. The components shown in the figure may be implemented by hardware, software, or a combination of software and hardware. For example, the electronic device 200 may be a smart lamp, a smart television, a smart speaker, or the like.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors. In some embodiments, the electronic device 200 may alternatively include one or more processors 210. The controller may generate an operation control signal based on instruction operation code and a time sequence signal, to complete control of instruction reading and instruction execution.

In some embodiments, the processor 210 may include one or more interfaces. The interface may include an inter-integrated circuit (inter-integrated circuit, I2C) interface, an integrated circuit sound (integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB interface, and/or the like. The USB interface 230 is an interface that conforms to a USB standard specification, and may be specifically a mini USB interface, a micro USB interface, a USB Type-C interface, or the like. The USB interface 230 may be configured to connect to a charger to charge the electronic device 200, or may be configured to perform data transmission between the electronic device 200 and a peripheral device.

It may be understood that an interface connection relationship between the modules shown in this embodiment of this application is merely an example for description, and does not constitute a limitation on the structure of the electronic device 200. In some other embodiments of this application, the electronic device 200 may alternatively use an interface connection mode different from an interface connection mode in this embodiment, or a combination of a plurality of interface connection modes.

The charging management module 240 is configured to receive a charging input from a charger. The charger may be a wireless charger or a wired charger. In some embodiments of wired charging, the charging management module 240 may receive a charging input of a wired charger through the USB interface 230. In some embodiments of wireless charging, the charging management module 240 may receive a wireless charging input by using a wireless charging coil of the electronic device 200. The charging management module 240 supplies power to the electronic device by using the power management module 241 while charging the battery 242.

The power management module 241 is configured to connect to the battery 242, the charging management module 240, and the processor 210. The power management module 241 receives an input of the battery 242 and/or the charging management module 240, to supply power to the processor 210, the internal memory 221, the external memory interface 220, the wireless communication module 250, and the like. The power management module 241 may be further configured to monitor parameters such as a battery capacity, a quantity of battery cycles, and a battery health status (electric leakage and impedance). In some other embodiments, the power management module 241 may alternatively be disposed in the processor 210. In some other embodiments, the power management module 241 and the charging management module 240 may alternatively be disposed in a same device.

A wireless communication function of the electronic device 200 may be implemented through the antenna 3, the wireless communication module 250, and the like.

The wireless communication module 250) may provide a wireless communication solution that is applied to the electronic device 200 and that includes Wi-Fi, Bluetooth (Bluetooth, BT), a wireless data transmission module (for example, 433 MHz, 868 MHz, or 915 MHz), and the like. The wireless communication module 250 may be one or more components integrating at least one communication processing module. The wireless communication module 250 receives an electromagnetic wave through the antenna 3, performs filtering processing and frequency modulation on an electromagnetic wave signal, and sends a processed signal to the processor 210. The wireless communication module 250 may further receive a to-be-sent signal from the processor 210, perform frequency modulation and amplification on the signal, and convert the signal into an electromagnetic wave for radiation through the antenna 3.

In this embodiment of this application, the electronic device 200 may receive, by using the wireless communications module, a broadcast message sent by the mobile device 100. In response to receiving the broadcast message sent by the mobile device 100, the electronic device 200 may display, on the display 290, information used to indicate an address of the electronic device 200. The electronic device 200 may receive, by using the wireless communication module, indication information sent by the mobile device 100, where the indication information indicates the orientation information of each electronic device in the plurality of electronic devices and the address information of each electronic device.

The external memory interface 220 may be configured to connect to an external storage card, for example, a micro SD card, to extend a storage capability of the electronic device 200. The external storage card communicates with the processor 210 through the external memory interface 220, to implement a data storage function. For example, files such as music and videos are stored in the external storage card.

The internal memory 221 may be configured to store one or more computer programs, and the one or more computer programs include instructions. The processor 210 may run the instructions stored in the internal memory 221, so that the electronic device 200 performs an automatic unlocking method provided in some embodiments of this application, various applications, data processing, and the like. The internal memory 221 may include a code storage area and a data storage area. The code storage area may store an operating system. The data storage area may store data created during use of the electronic device 200, and the like. In addition, the internal memory 221 may include a high-speed random access memory, or may include a nonvolatile memory, for example, one or more magnetic disk storage devices, a flash memory, or a universal flash storage (universal flash storage, UFS). In some embodiments, the processor 210 may run the instructions stored in the internal memory 221 and/or instructions stored in the memory disposed in the processor 210, to enable the electronic device 200 to perform the combined display method provided in embodiments of this application, other applications, and data processing.

The input module 270 includes but is not limited to a keyboard, a touchscreen (which may also be a touch display screen), a mouse, a camera, a laser pointer, a handwriting input board, a microphone, and the like. The microphone includes a single microphone, and also includes a microphone array.

The output module 280 includes but is not limited to a display, an LED lamp, a speaker, a headset, a motor that generates vibration and an auxiliary device thereof, a heat emitting component that generates heat, and the like.

The electronic device 200 includes but is not limited to a tablet computer, a desktop computer, a portable electronic device (such as a laptop computer, Laptop), a smart television (such as a smart screen), a vehicle-mounted computer, an augmented reality (augmented reality, AR) device, a virtual reality (virtual reality, VR) device, another intelligent device having a display, and the like. An example embodiment of the electronic device includes, but is not limited to, a portable or non-portable electronic device on which iOS®, Android®, Harmony®, Windows®, Linux, or another operating system is installed.

Figure 4A:
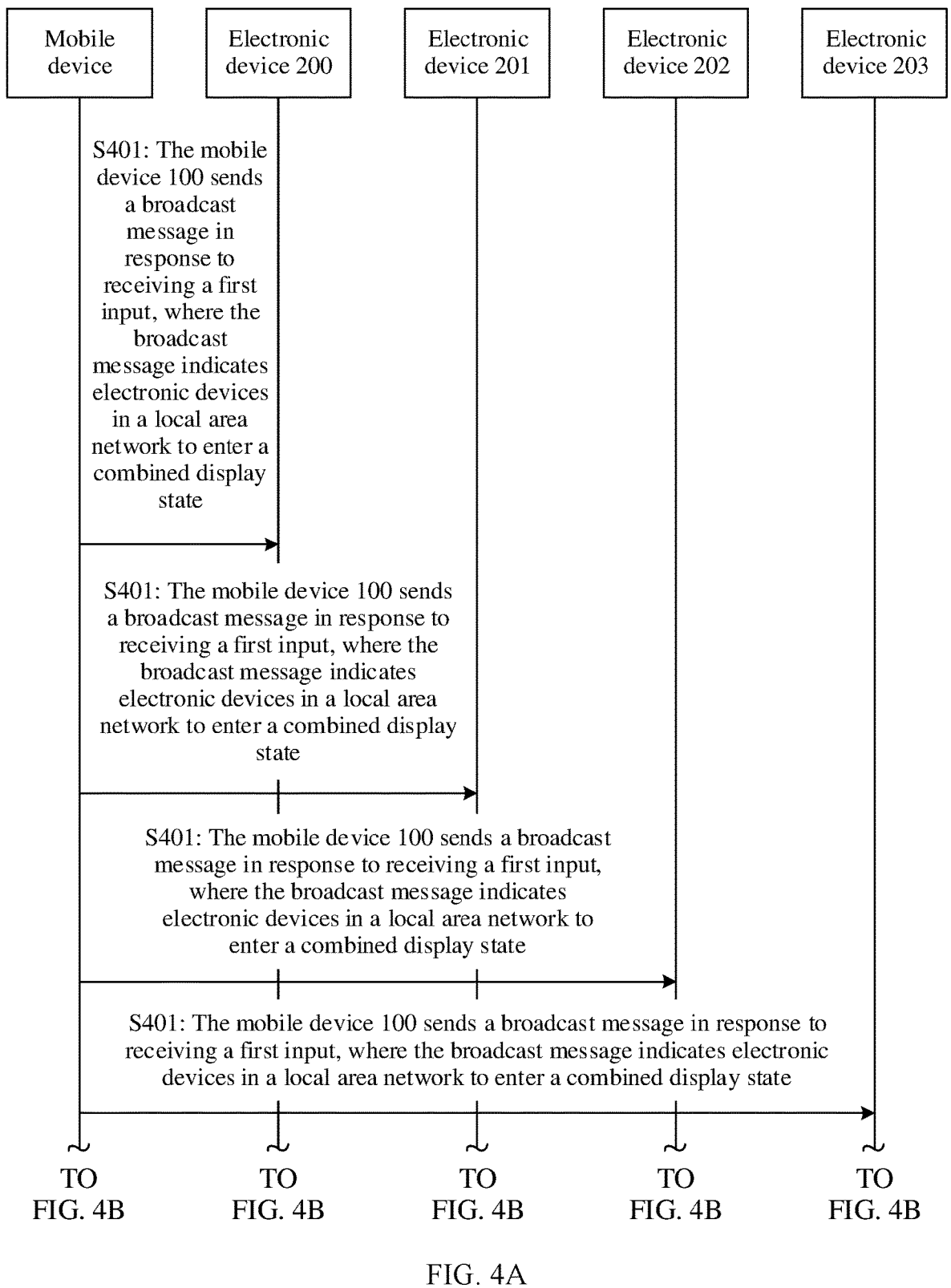
FIG. 4A to FIG. 4C are a schematic flowchart of a combined display method according to an embodiment of this application.
Figure 4B:
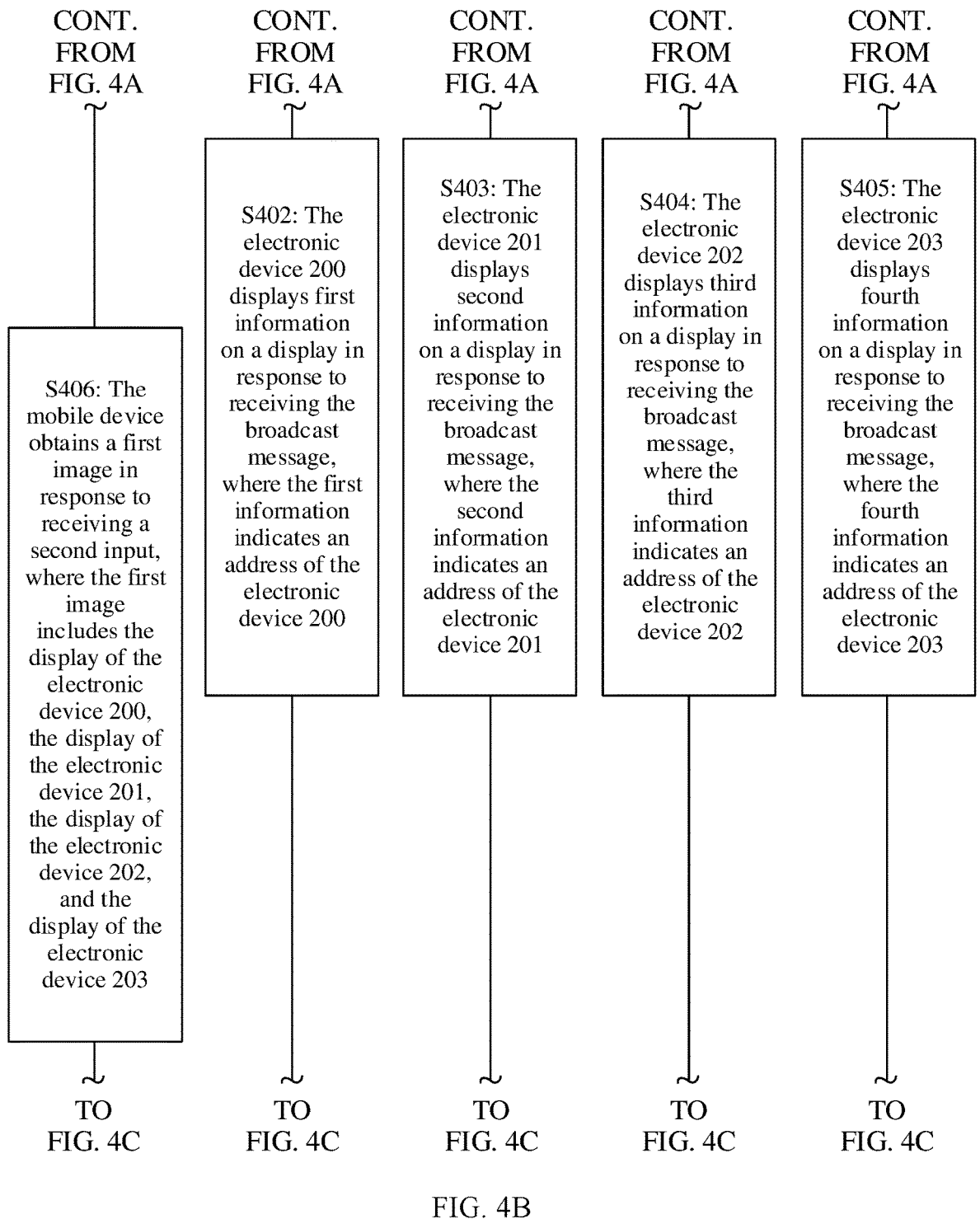
Figure 4C:
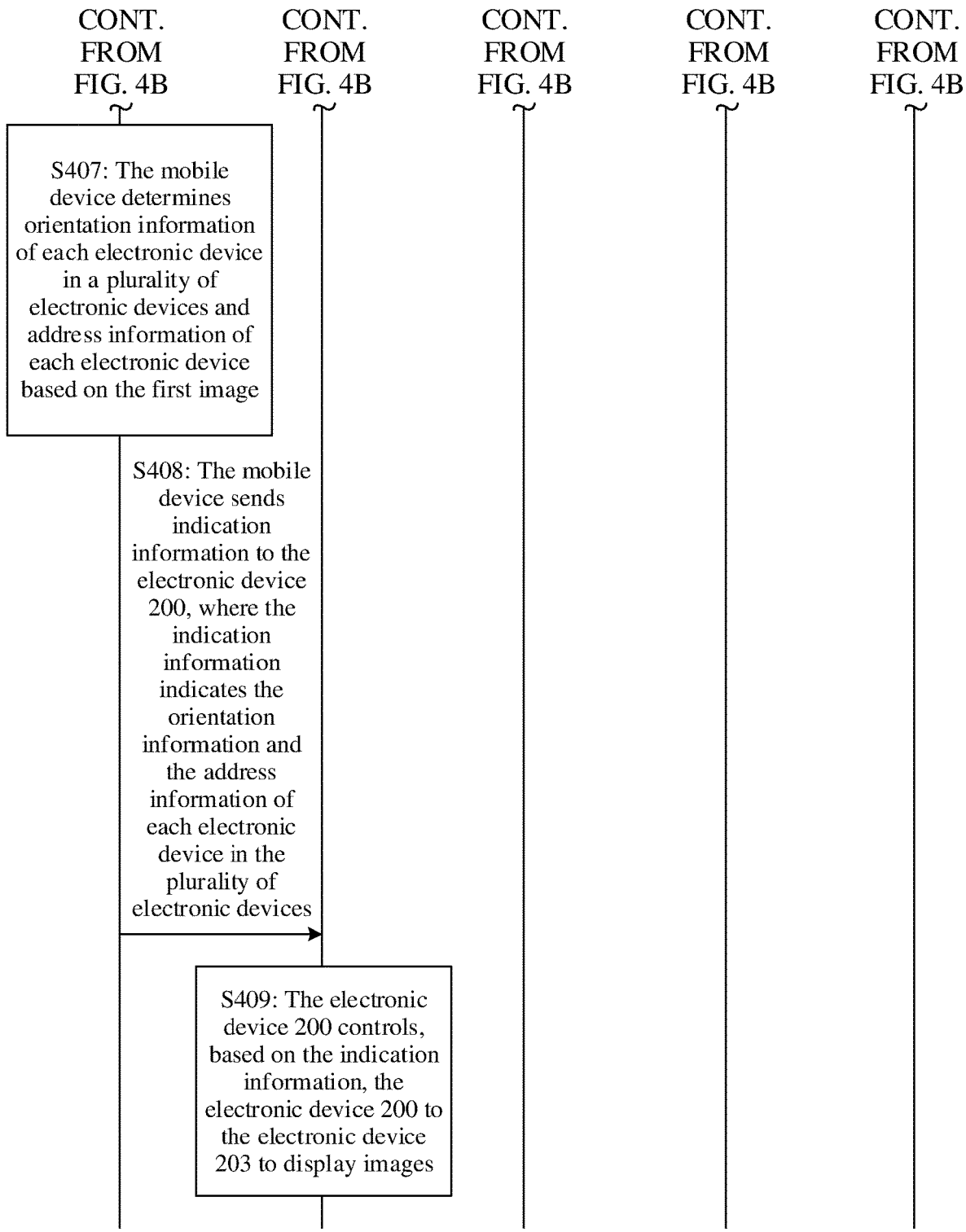

An example in which the electronic device 200 to the electronic device 203 are included in a local area network is used in the following. FIG. 4A to FIG. 4C to FIG. 7A and FIG. 7B are schematic flowcharts of combined display methods according to embodiments of this application. FIG. 4A to FIG. 4C are a schematic flowchart of a combined display method according to an embodiment of this application. As shown in FIG. 4A to FIG. 4C, the combined display method includes the following steps.

S401: A mobile device 100 sends a broadcast message in response to receiving a first input, where the broadcast message indicates electronic devices in a local area network to enter a combined display state.

In an embodiment, the electronic device 200 to the electronic device 203 may be in a to-be-discovered state.

Figure 9B:
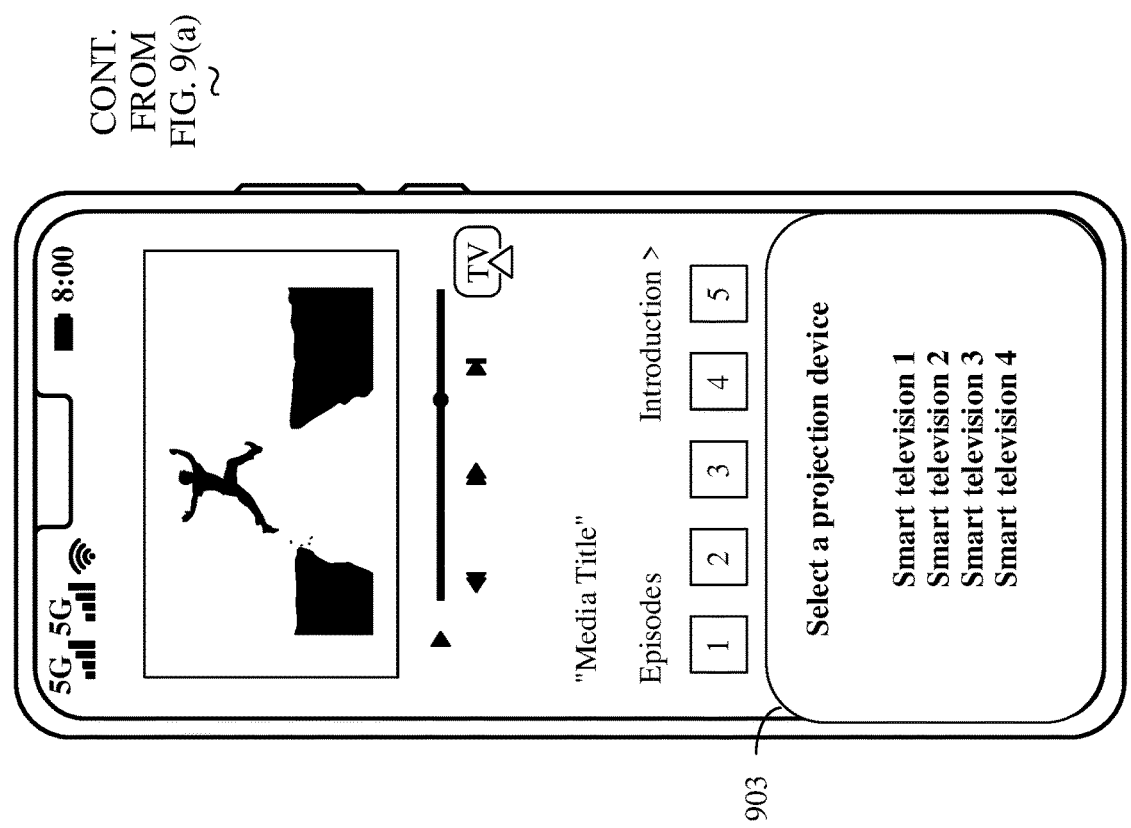

For example, when the mobile device needs to perform projection, the mobile device may search for a to-be-discovered electronic device in the local area network, to prompt a user that projection may be performed on the electronic device 200 to the electronic device 203. As shown in FIG. 9(a), a mobile phone, a smart television 1, a smart television 2, a smart television 3, and a smart television 4 are located in a same local area network. The mobile phone displays a video playback interface. The video playback interface includes a video display window 901 and a projection control 902. The smart television 1, the smart television 2, the smart television 3, and the smart television 4 are in a to-be-discovered state. In response to detecting an operation of tapping the control 902 by the user, the mobile phone may display a GUI shown in FIG. 9(b). On the GUI shown in FIG. 9(b), the mobile phone may display a prompt box 903, where the prompt box 903 includes device information of the smart television 1, the smart television 2, the smart television 3, and the smart television 4 that are in a to-be-discovered state in the local area network.

In an embodiment, when detecting a power-on operation of the user, the electronic device 200 to the electronic device 203 may enter a to-be-discovered state.

In an embodiment, the electronic device 200 to the electronic device 203 may alternatively be in a to-be-discovered state within preset duration (for example, 10 minutes) starting from detection of the power-on operation of the user.

In an embodiment, when the mobile device detects a first operation of the user, the mobile device sends the broadcast message to the devices in the local area network.

Figures 1, 10A:
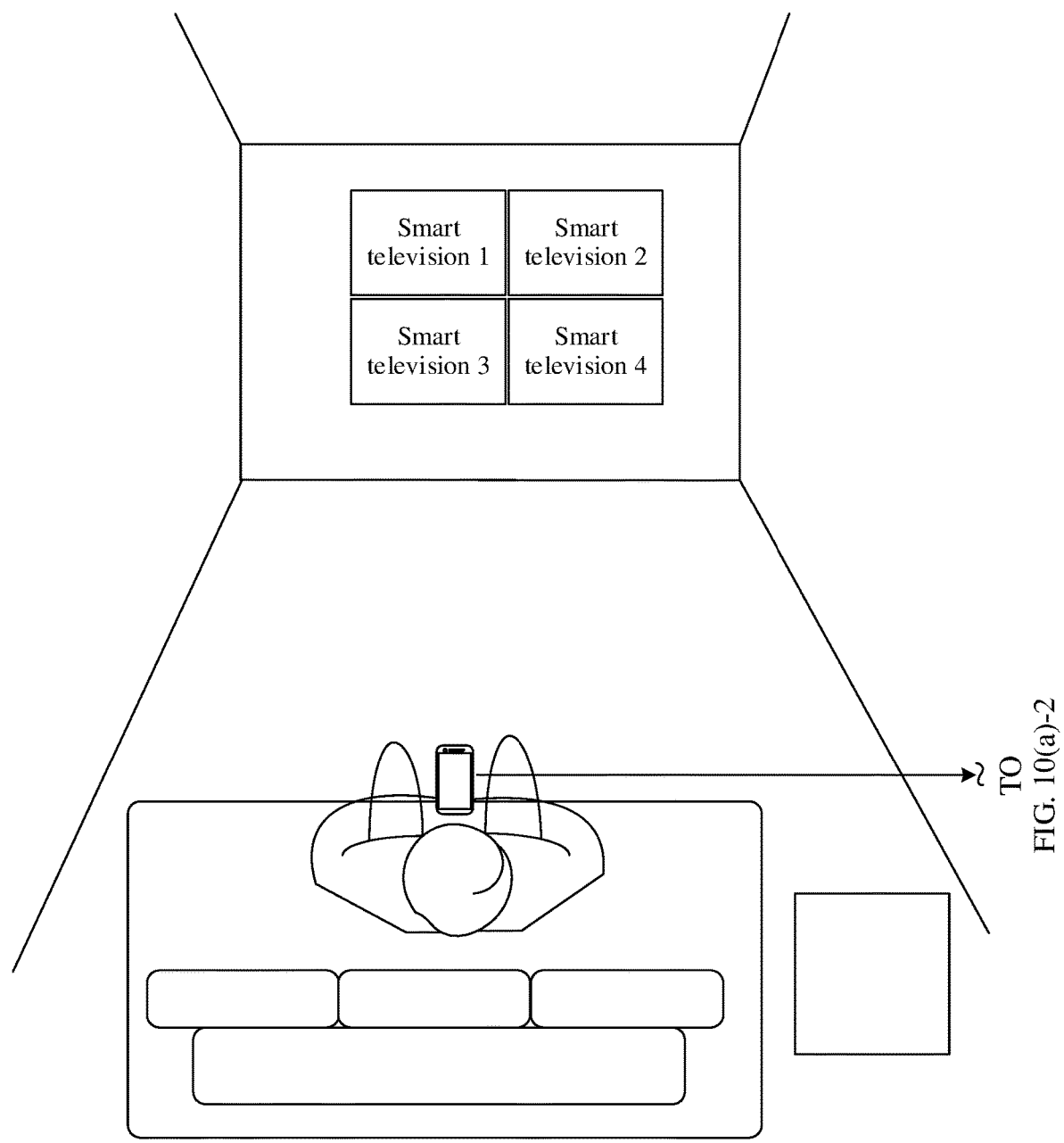
Figures 2, 10A:
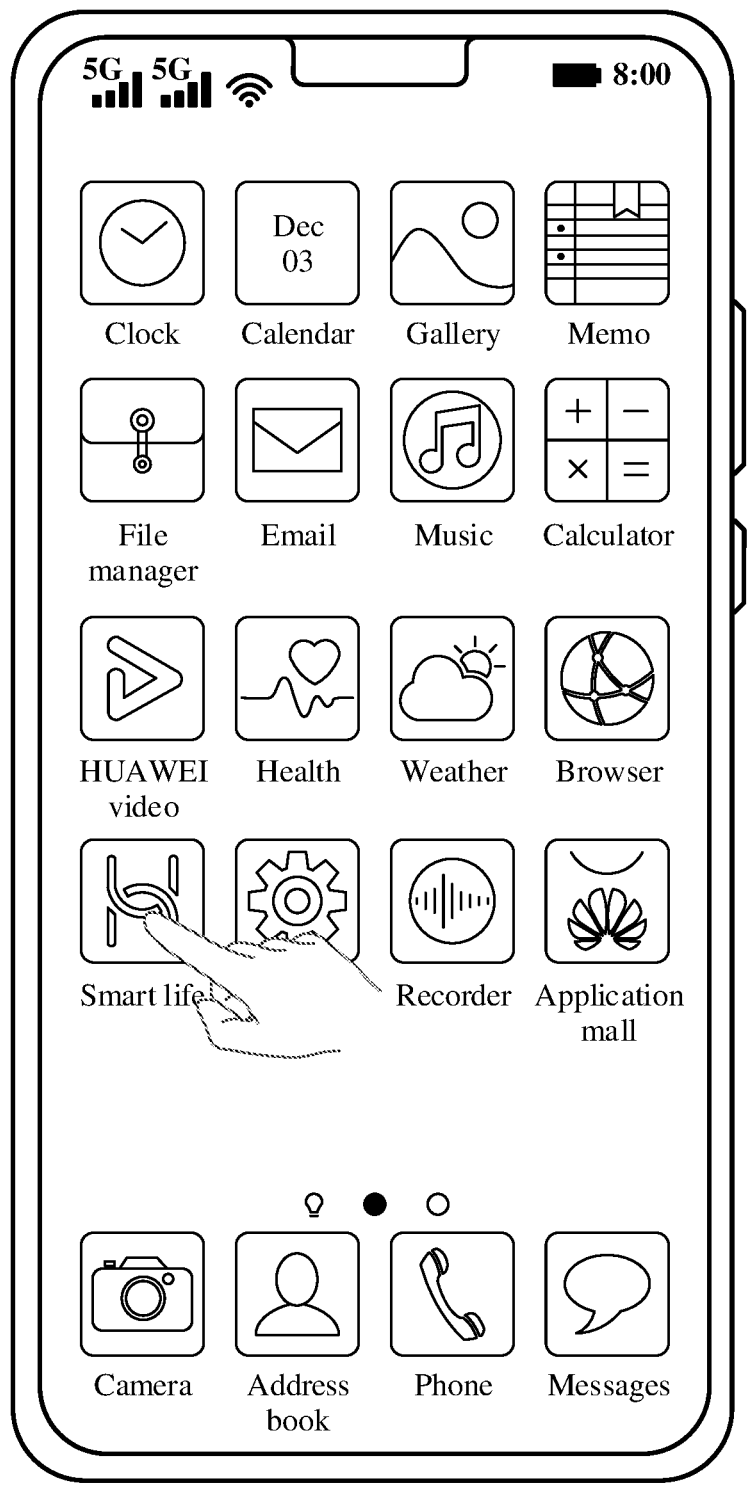
Figures 1, 10B:
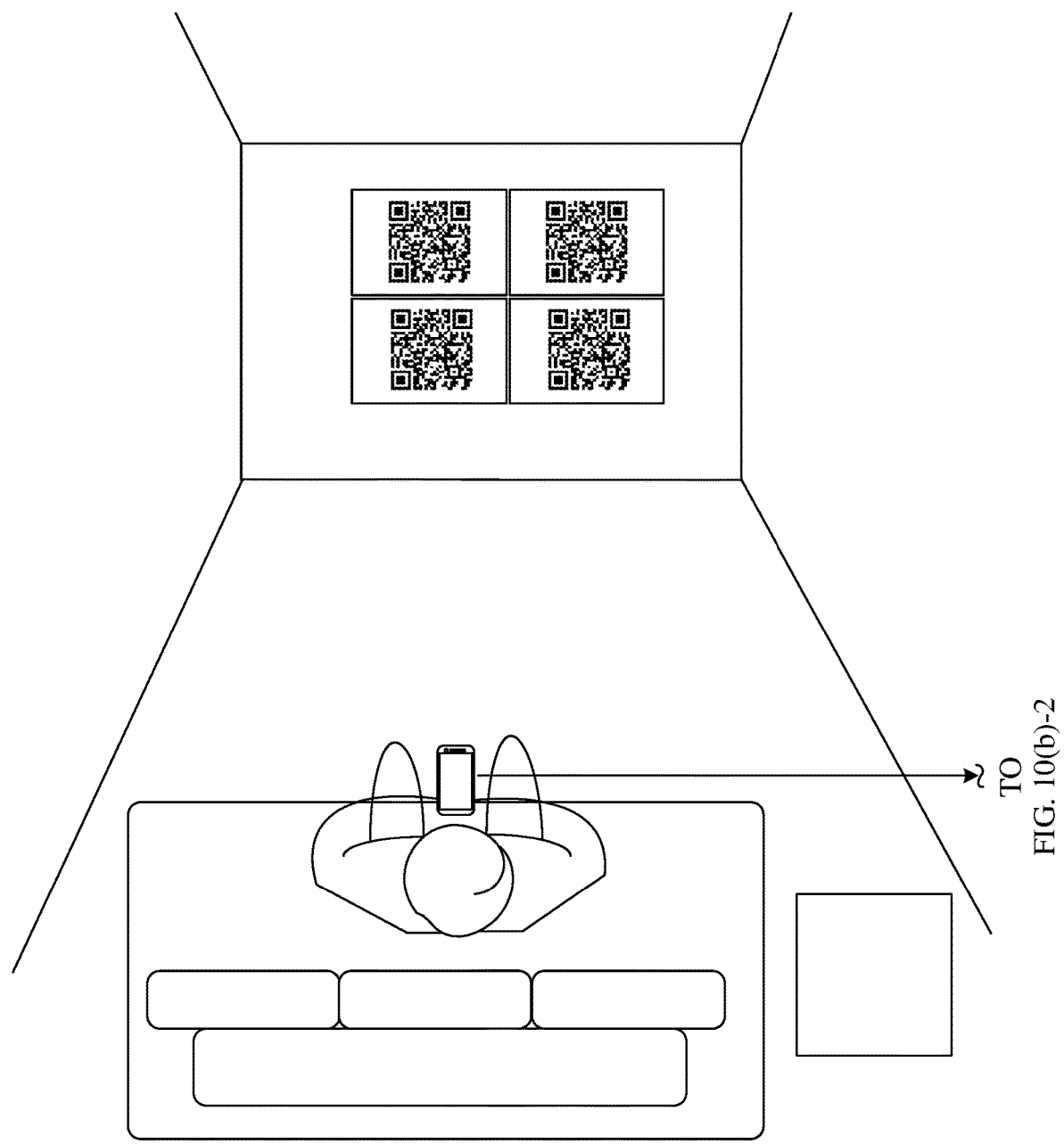
Figures 2, 10B:
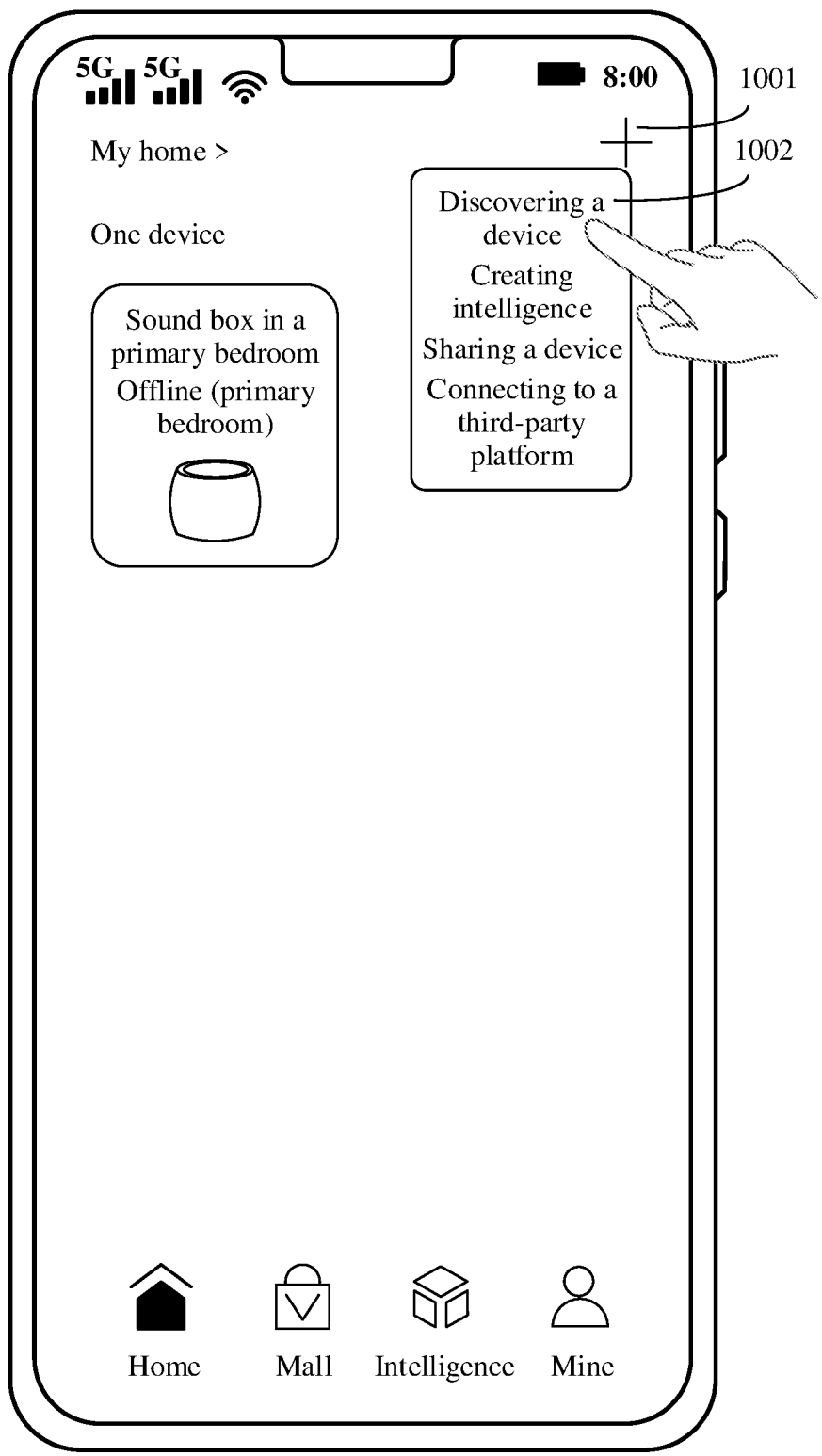
Figures 1, 10C:
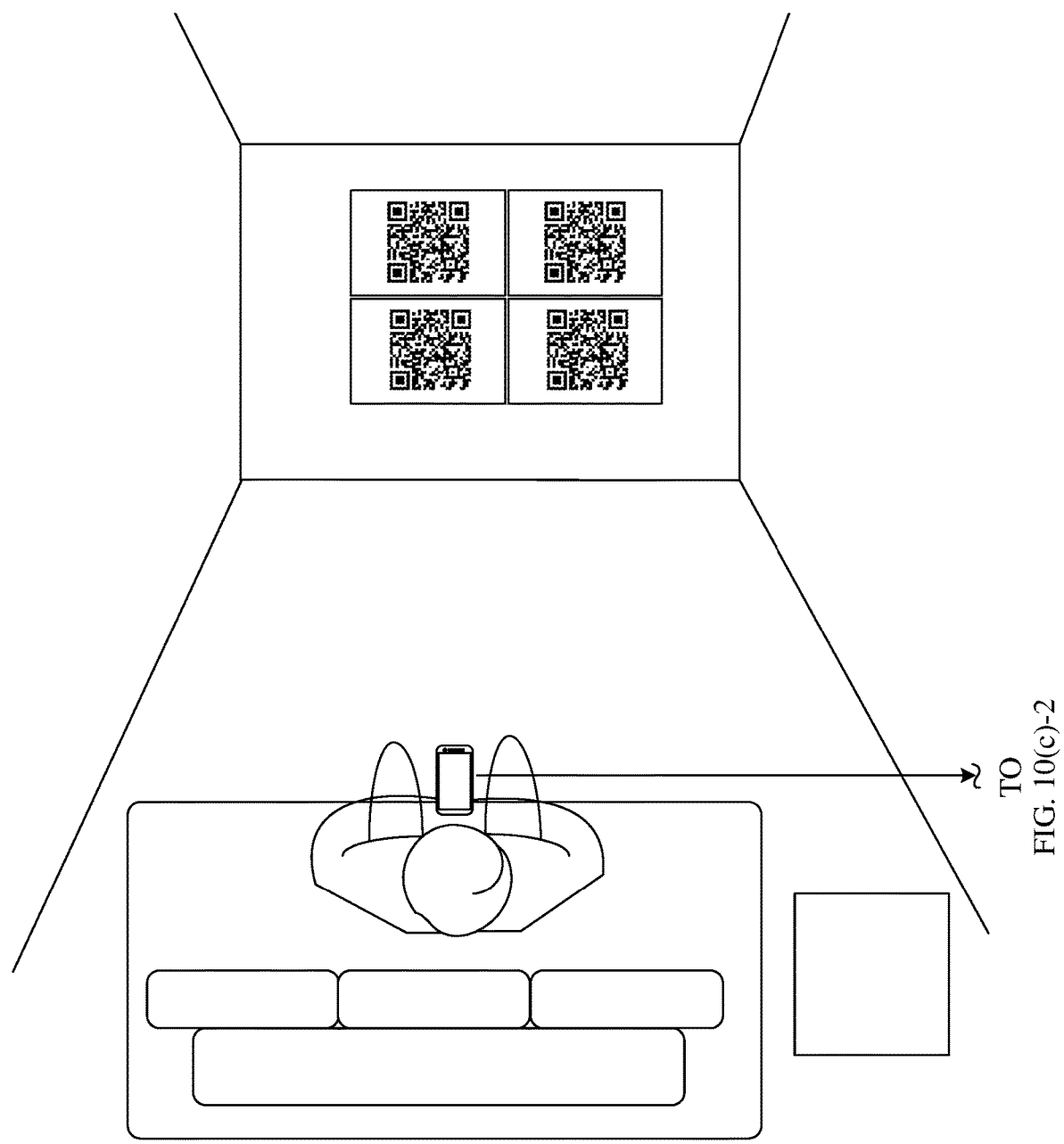
Figures 2, 10C:
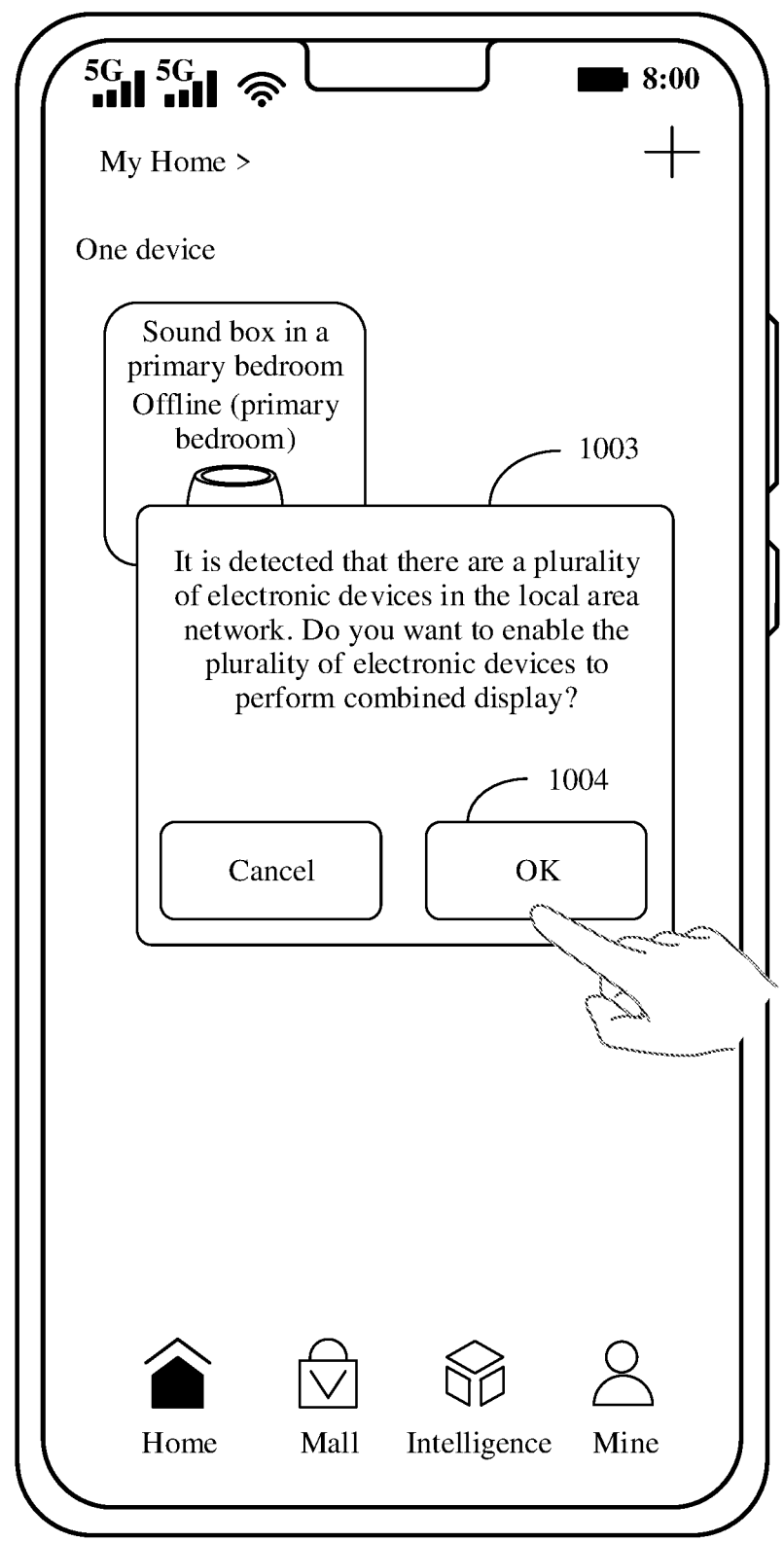

For example, as shown in FIG. 10(b)-1 and FIG. 10(b)-2, when the mobile phone detects an operation of tapping a control 1002 by the user, the mobile phone may send the broadcast message to the devices in the local area network.

Figures 1, 11A:
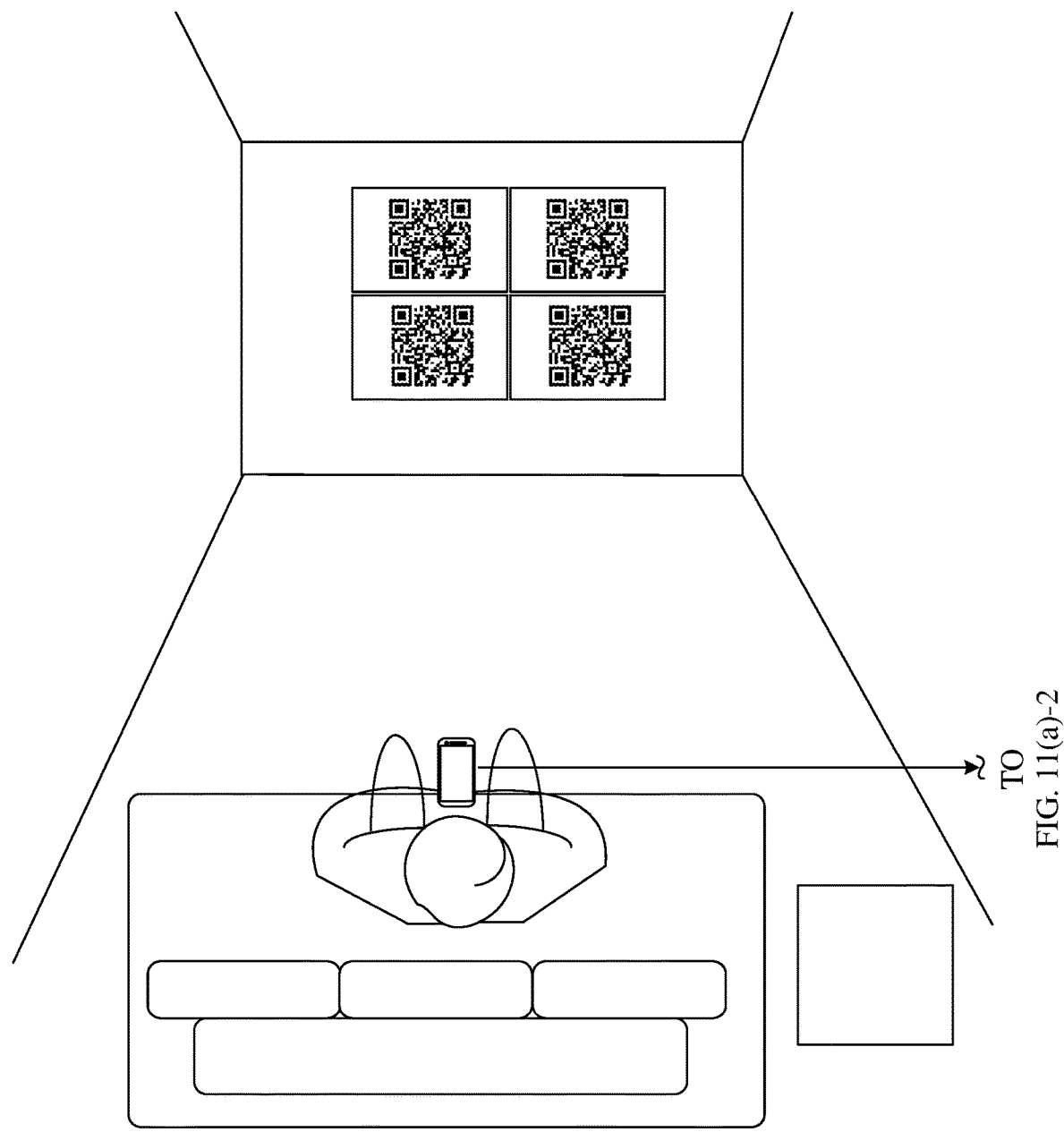
Figures 2, 11A:
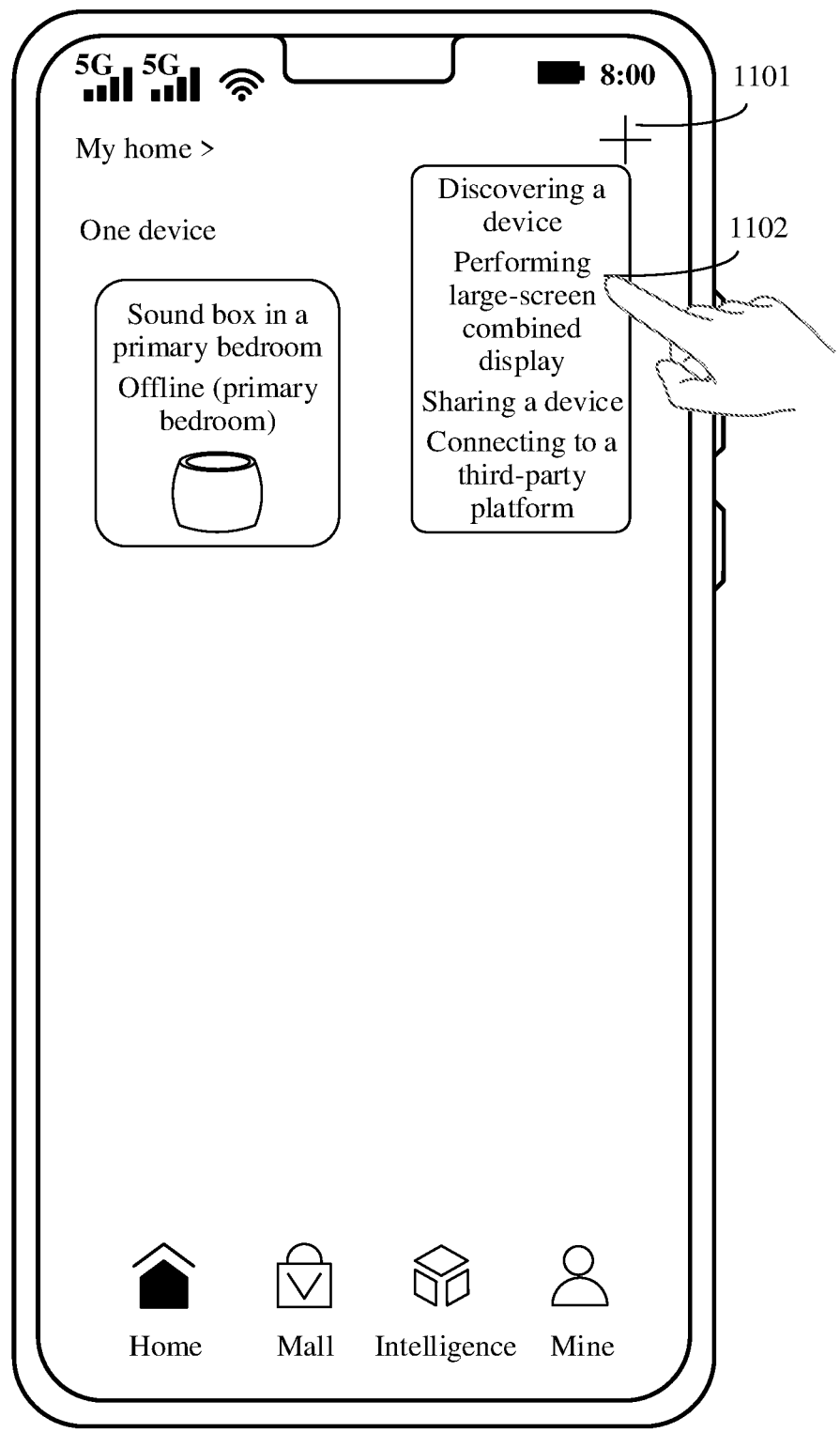
Figures 1, 11B:
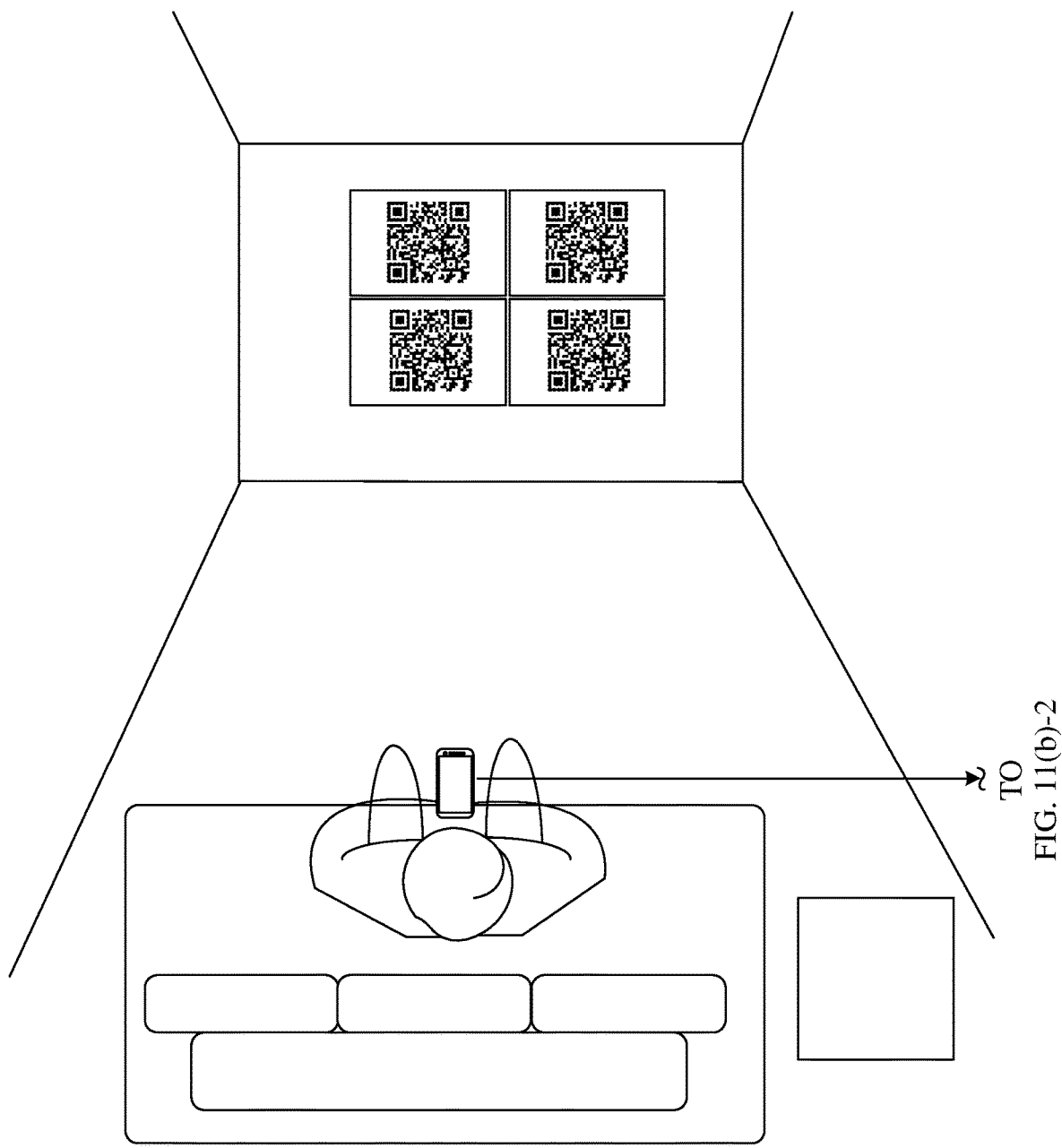
Figures 2, 11B:
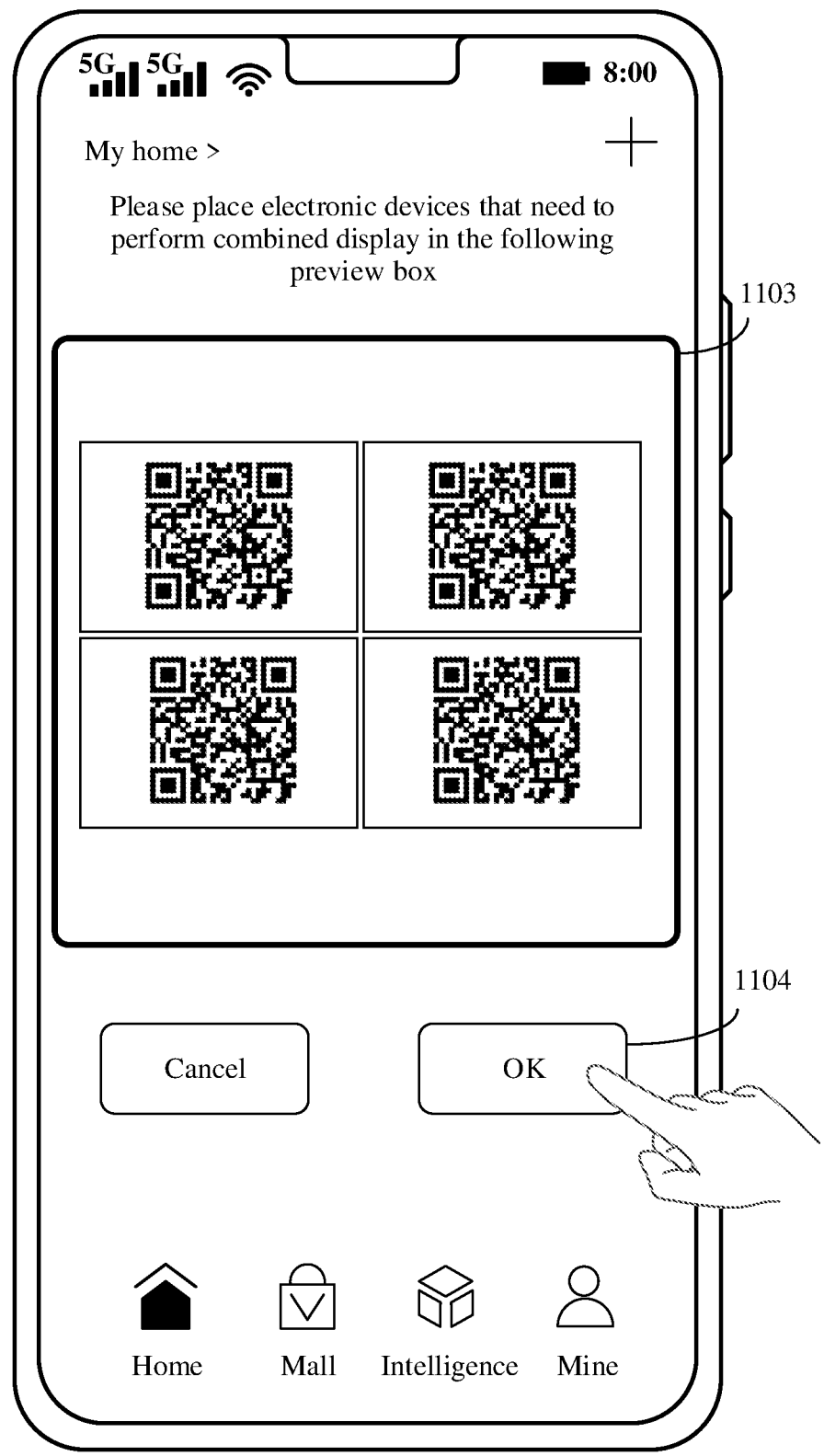

For example, as shown in FIG. 11(a)-1 and FIG. 11(a)-2, when the mobile phone detects an operation of tapping a control 1102 by the user, the mobile phone may send the broadcast message to the devices in the local area network.

It should be understood that, in this embodiment of this application, the broadcast message indicates the electronic devices in the local area network to enter a combined display state, that is, indicates the electronic devices in the local area network to perform combined display. Alternatively, it may be understood that the broadcast message indicates displays of the plurality of electronic devices in the local area network form a larger display.

For example, the broadcast message may be a user datagram protocol (user datagram protocol, UDP) data packet. The UDP data packet includes a data part of an IP datagram. The data part of the IP datagram may include an extensible bit. The electronic device 200 to the electronic device 203 may agree on content of an extensible bit with the mobile device 100. When an extensible bit is 1, the electronic device 200 to the electronic device 203 may learn that the mobile device 100 expects the electronic device 200 to the electronic device 203 to enter a combined display state.

In an embodiment, both a device (for example, the electronic device 200 to the electronic device 203) that supports combined display and a device (for example, a tablet, a smart watch, or a sound box) that does not support combined display may access a same local area network. The device that supports combined display may respond to the broadcast message (for example, display address information on a display) after receiving the broadcast message sent by the mobile device 100, and the device that does not support combined display may ignore the broadcast message after receiving the broadcast message.

S402: The electronic device 200 displays first information on a display in response to receiving the broadcast message, where the first information indicates an address of the electronic device 200.

S403: The electronic device 201 displays second information on a display in response to receiving the broadcast message, where the second information indicates an address of the electronic device 201.

S404: The electronic device 202 displays third information on a display in response to receiving the broadcast message, where the third information indicates an address of the electronic device 202.

S405: The electronic device 203 displays fourth information on a display in response to receiving the broadcast message, where the fourth information indicates an address of the electronic device 203.

It should be understood that there is no actual sequence of performing S402 to S405.

For example, the electronic device 200 to the electronic device 203 are the smart television 1, the smart television 2, the smart television 3, and the smart television 4. As shown in FIG. 10(*b*)-1 and FIG. 10(*b*)-2, after receiving the broadcast message, the smart television 1, the smart television 2, the smart television 3, and the smart television 4 may display QR codes on respective displays, where the QR code indicates a MAC address.

It should be understood that the foregoing manner of displaying the QR code on each smart television to indicate the MAC address of the smart television is merely an example, and this embodiment of this application is not limited thereto. For example, after receiving the broadcast message, each smart television may alternatively display a MAC address of the smart television on a display of the smart television. For example, after receiving the broadcast message, the smart television 1 may display "3E-57-48-00-F8-ED" on a display of the smart television 1.

S406: The mobile device obtains a first image in response to a received second input, where the first image includes the display of the electronic device 200, the display of the electronic device 201, the display of the electronic device 202, and the display of the electronic device 203.

In an embodiment, the first image includes the display of the electronic device 200, and the display of the electronic device 200 displays the first information. The first image includes the display of the electronic device 201, and the display of the electronic device 201 displays the second information. The first image includes the display of the electronic device 202, and the display of the electronic device 202 displays the third information. The first image includes the display of the electronic device 203, and the display of the electronic device 203 displays the fourth information.

In an embodiment, the mobile device obtains the first image when detecting a photographing operation performed by the user on the electronic device 200 to the electronic device 203.

For example, as shown in FIG. 10(*d*)-1 and FIG. 10(*d*)-2, when the mobile phone detects an operation of tapping a control 1006 by the user, the mobile phone may obtain image in a preview box. The image includes QR code information displayed on the smart television 1, the smart television 2, the smart television 3, and the smart television 4.

It should be understood that the first image may include one or more frames of images. The mobile device may prompt the user to photograph electronic devices that need to perform combined display, to obtain information about one frame of image; or the mobile device may prompt the user to record a video for electronic devices that need to perform combined display, to obtain information about a plurality of frames of images.

In an embodiment, the mobile device obtains the first image when detecting that images of several electronic devices (for example, the electronic device 200 to the electronic device 203) are always in the preview box and no image of another electronic device is added to the preview box within preset duration.

In an embodiment, before the mobile device detects the second input of the user, the mobile device may further prompt the user to obtain image including the plurality of electronic devices that need to perform combined display.

In an embodiment, the electronic device 200 to the electronic device 203 may further send responses to the mobile device in response to receiving the broadcast message. If the mobile device receives responses from a plurality of electronic devices, the mobile device may prompt the user that the plurality of electronic devices are found in the local area network, and prompt the user whether to enable the plurality of electronic devices to perform combined display. In response to an operation that the user determines to enable the plurality of electronic devices in the local area network to perform combined display, the mobile device may prompt the user to obtain the image including the plurality of electronic devices that need to perform combined display.

S407: The mobile device determines orientation information of each electronic device in the plurality of electronic devices and address information of each electronic device based on the first image.

In this embodiment of this application, the mobile device may determine address information of the electronic device 200 to the electronic device 203 based on the first information to the fourth information displayed on the displays of the electronic device 200 to the electronic device 203, and may determine orientation information of the electronic device 200 to the electronic device 203 based on positions of the electronic device 200 to the electronic device 203 in the first image.

Figures 1, 10D:
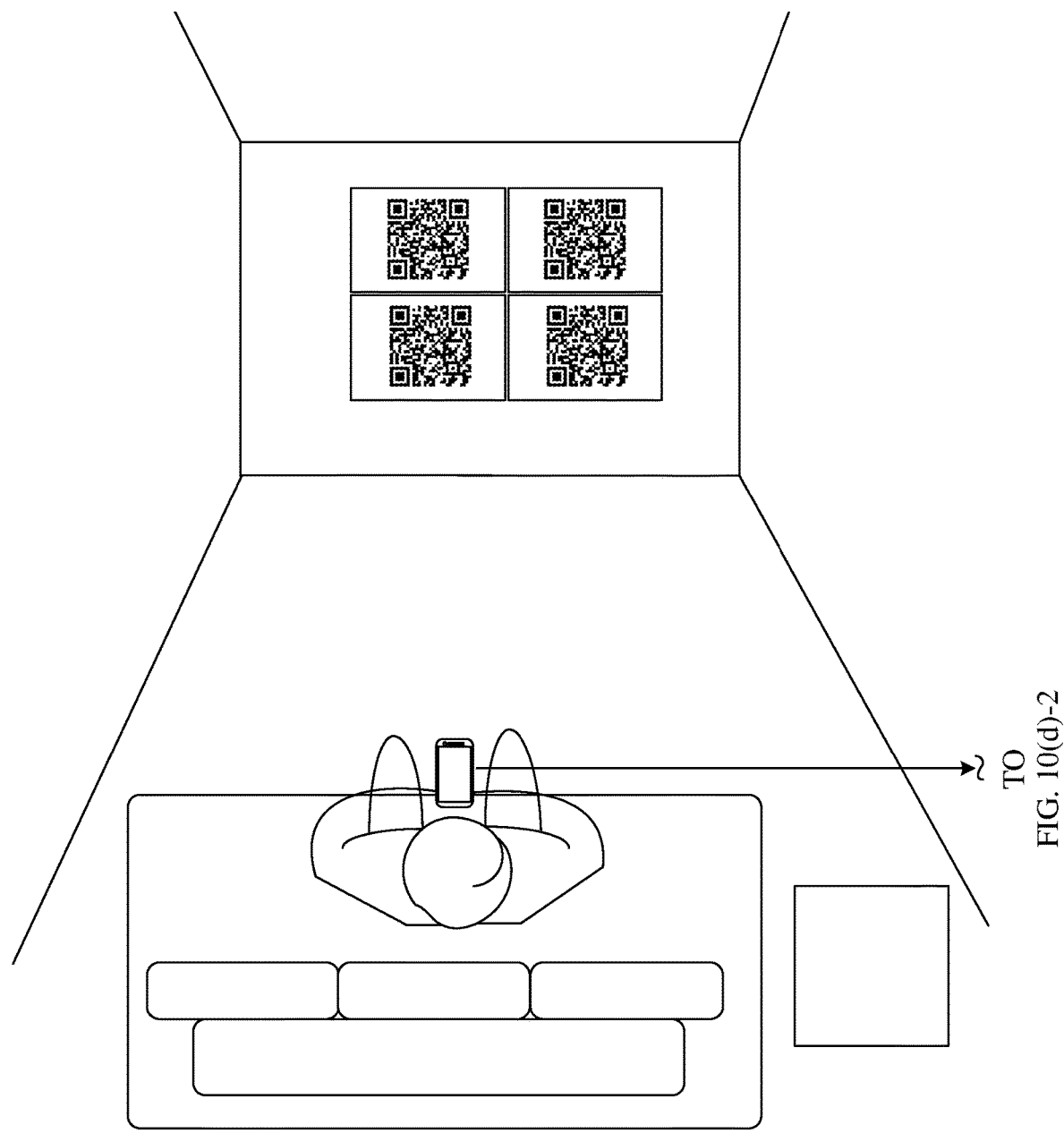
Figures 2, 10D:
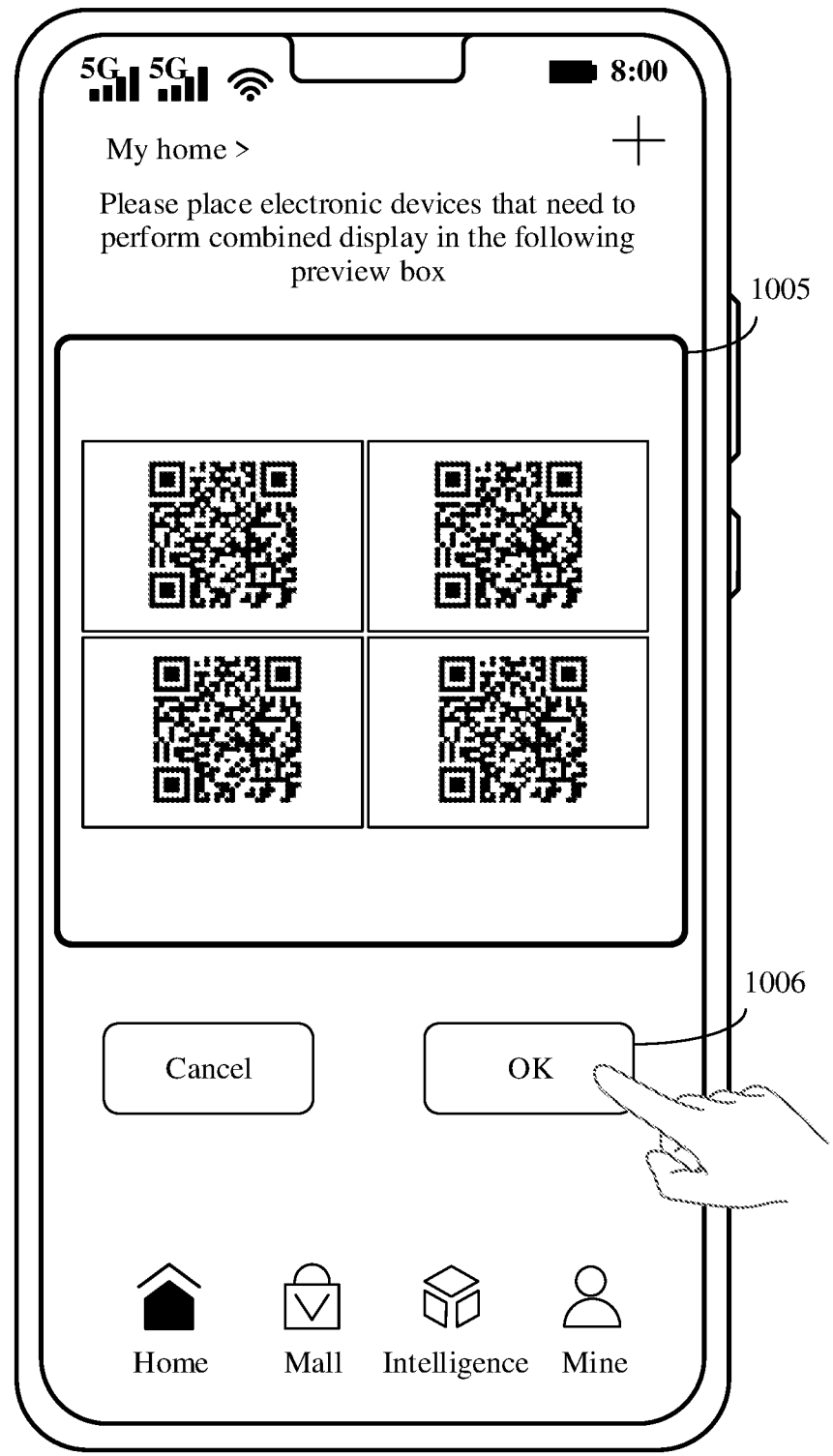

For example, as shown in FIG. 10(d)-1 and FIG. 10(d)-2, the mobile phone may determine that address information of a device (the smart television 1) in an upper left corner is a MAC address 1, that address information of a device (the smart television 2) in an upper right corner is a MAC address 2, that address information of a device (the smart television 3) in a lower left corner is a MAC address 3, and that address information of a device (the smart television 4) in a lower right corner is a MAC address 4.

S408: The mobile device sends indication information to the electronic device 200, where the indication information indicates the orientation information of each electronic device in the plurality of electronic devices and the address information of each electronic device.

In an embodiment, the indication information may include the first information, the second information, the third information, and the fourth information, orientation information of the display of the electronic device 200 to the display of the electronic device 203, a correspondence between the first information and the display of the electronic device 200, a correspondence between the second information and the display of the electronic device 201, a correspondence between the third information and the display of the electronic device 202, and a correspondence between the fourth information and the display of the electronic device 203.

In an embodiment, if devices that need to perform combined display include the electronic device 200 and the electronic device 201, the indication information may include the first information, the second information, orientation information of the display of the electronic device 200 and the display of the electronic device 201, and the correspondence between the first information and the display of the electronic device 200.

In an embodiment, the mobile device may further send another piece of indication information to the electronic device 200, where the another piece of indication information indicates that the electronic device 200 is a main control device.

In an embodiment, the indication information and the another piece of indication information may be carried in a same message, or may be carried in different messages.

For example, the mobile device may carry matrix information in the indication information, where the matrix information indicates orientation information of each electronic device in the plurality of electronic devices and address information of each electronic device.

For example, information about a matrix M carried in the indication information may be shown in Formula (1):

$$M = \begin{pmatrix} MAC \text{ address } 1 & MAC \text{ address } 2 \\ MAC \text{ address } 3 & MAC \text{ address } 4 \end{pmatrix} \quad (1)$$

After receiving the indication information, the electronic device 200 may obtain the matrix M. The MAC address 1 shown in a first row and a first column of the matrix M may indicate that a MAC address of an electronic device in an upper left corner is the MAC address 1. The MAC address 2 shown in the first row and a second column of the matrix M may indicate that a MAC address of an electronic device in an upper right corner is the MAC address 2. The MAC address 3 shown in a second row and the first column of the matrix M may indicate that a MAC address of an electronic device in a lower left corner is the MAC address 3. The MAC address 4 shown in the second row and the second column of the matrix M may indicate that a MAC address of an electronic device in a lower right corner is the MAC address 4. A MAC address of the electronic device 200 is the MAC address 1. Therefore, the electronic device 200 may determine that the electronic device 200 is located in an upper left corner of a plurality of electronic devices. In addition, the electronic device 200 may further determine orientation information of another electronic device and a MAC address of the another electronic device.

In an embodiment, when determining that a plurality of electronic devices need to perform combined display, the mobile device may randomly select one electronic device (for example, the electronic device 200) from the plurality of electronic devices, and send indication information to the electronic device.

In an embodiment, in response to receiving the indication information, the electronic device 200 may prompt, on the display, the user that the electronic device 200 may control the electronic device 200 to the electronic device 203 to display images.

In an embodiment, before sending the indication information to the electronic device 200, the mobile device may first determine whether the plurality of electronic devices in the first image are regularly distributed.

Figure 12A:
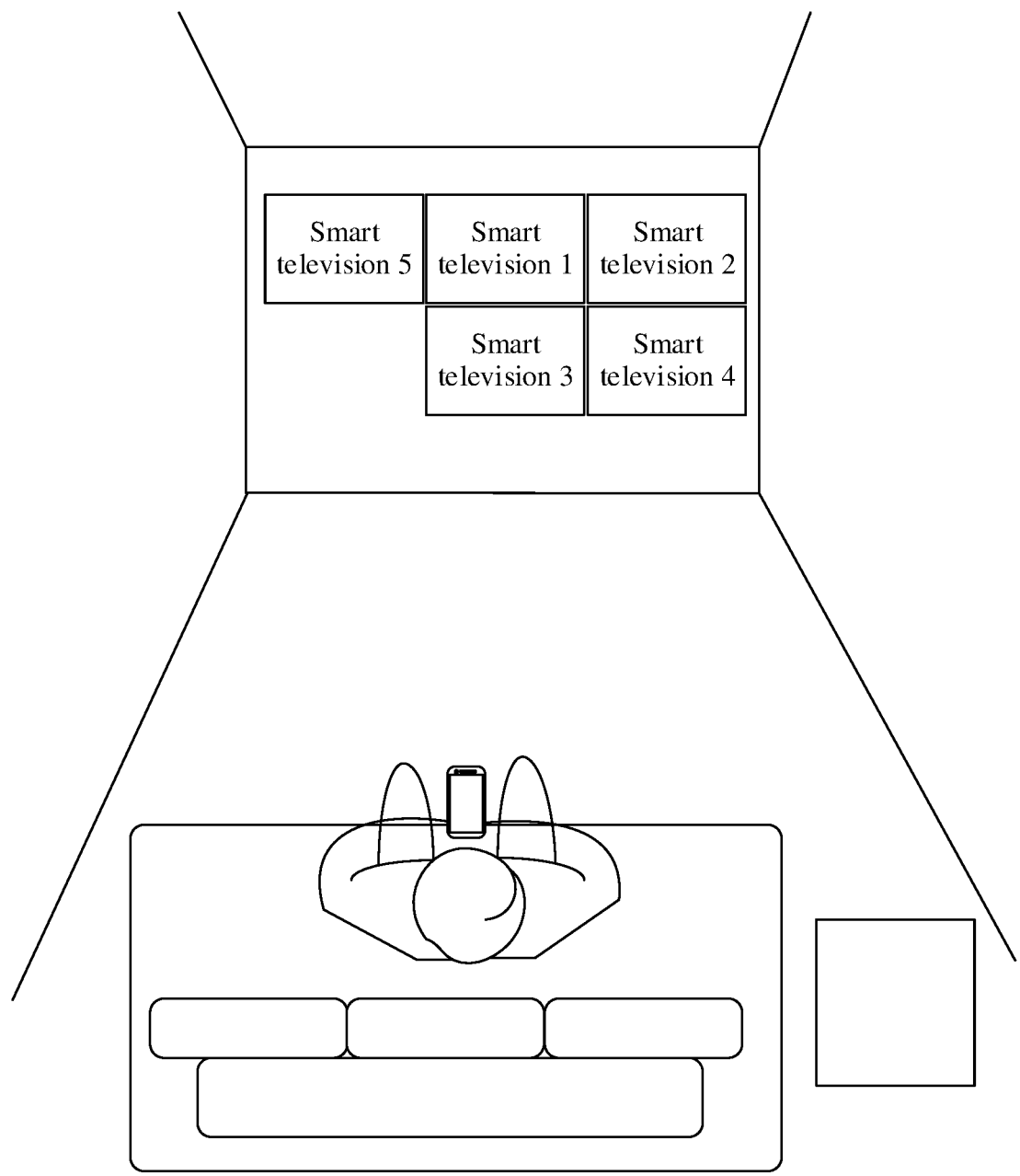
FIG. 12(a) to FIG. 12(f) show another set of graphical user interfaces according to an embodiment of this application.
Figures 1, 12B:
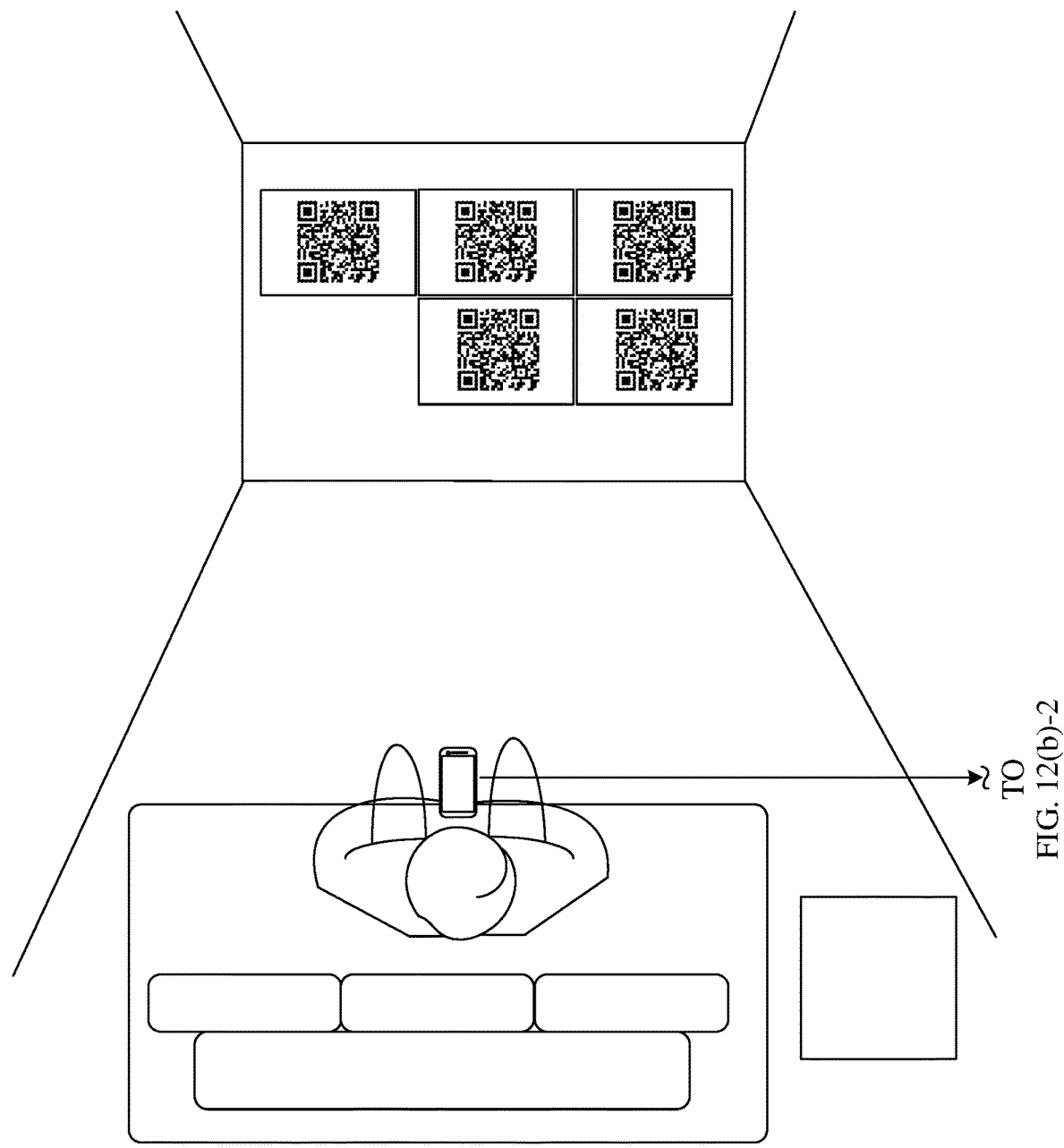
Figures 2, 12B:
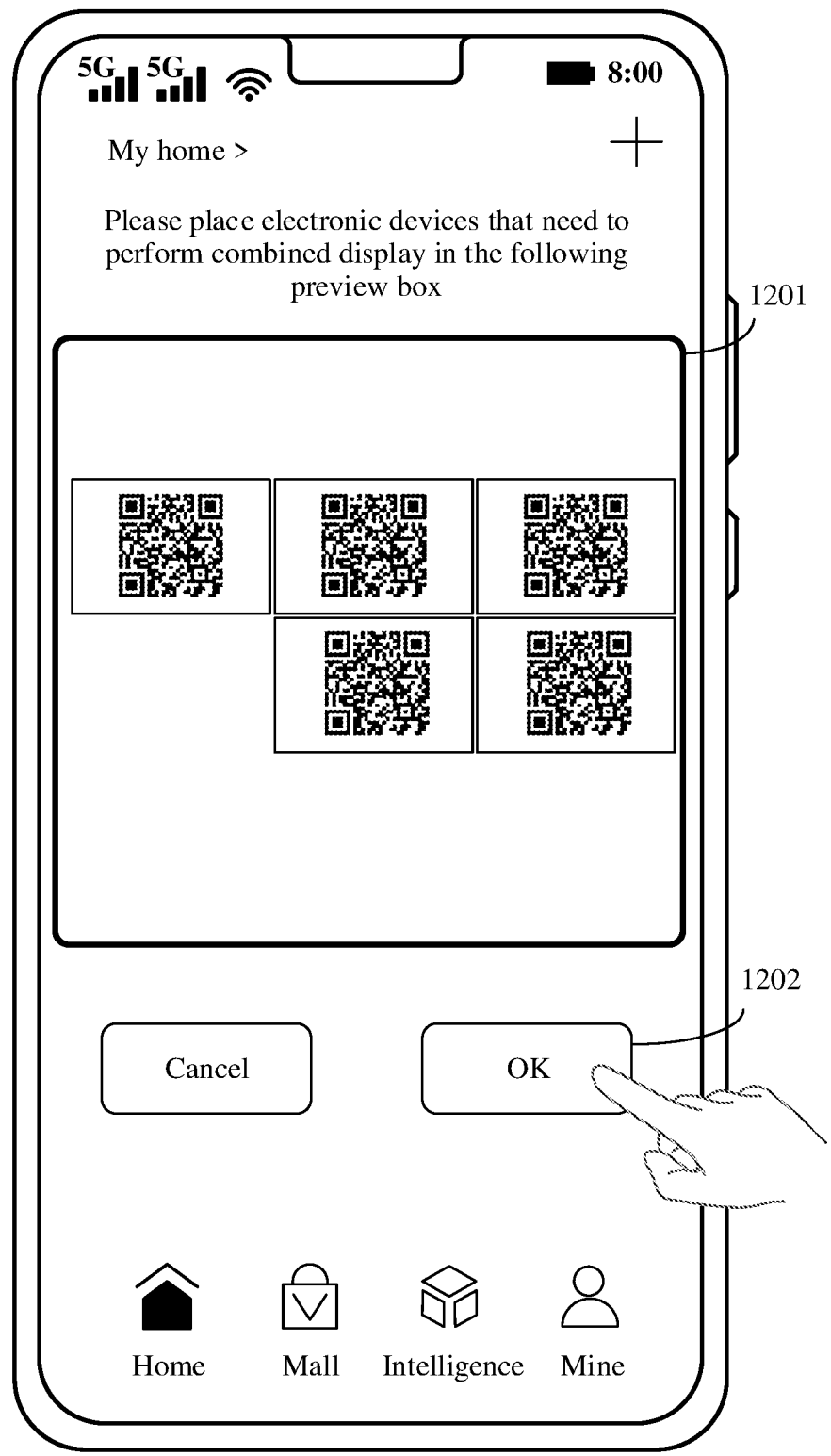

For example, as shown in FIG. 12(b)-1 and FIG. 12(b)-2, when the mobile phone detects an operation of tapping a control 1202 by the user, the mobile phone may obtain the first image in a preview box. The mobile phone may determine orientation information and the address information of the smart television 1 to a smart television 5 based on the first image. For example, the mobile phone may determine, based on the first image, that a MAC address of an electronic device located in an upper leftmost corner is a MAC address 5, that a MAC address of an electronic device located in an upper middle corner is the MAC address 1, that a MAC address of an electronic device located in a lower middle corner is the MAC address 3, that a MAC address of an electronic device located in an upper rightmost corner is the MAC address 2, and that a MAC address of an electronic device located in a lower rightmost corner is the MAC address 4.

The mobile phone may convert the orientation information and the address information of the smart television 1 to the smart television 5 into a matrix N. Information about a matrix N may be shown in Formula (2):

$$N = \begin{pmatrix} MAC \text{ address } 5 & MAC \text{ address } 1 & MAC \text{ address } 2 \\ & MAC \text{ address } 3 & MAC \text{ address } 4 \end{pmatrix} \quad (2)$$

The mobile phone may determine that the matrix N is an irregular matrix. In this way, the mobile phone may determine that the smart television 1 to the smart television 5 are irregularly distributed.

In an embodiment, if the mobile device determines that the plurality of electronic devices are irregularly distributed, the electronic device may prompt the user to select some electronic devices from the plurality of electronic devices for combined display.

Figures 1, 12C:
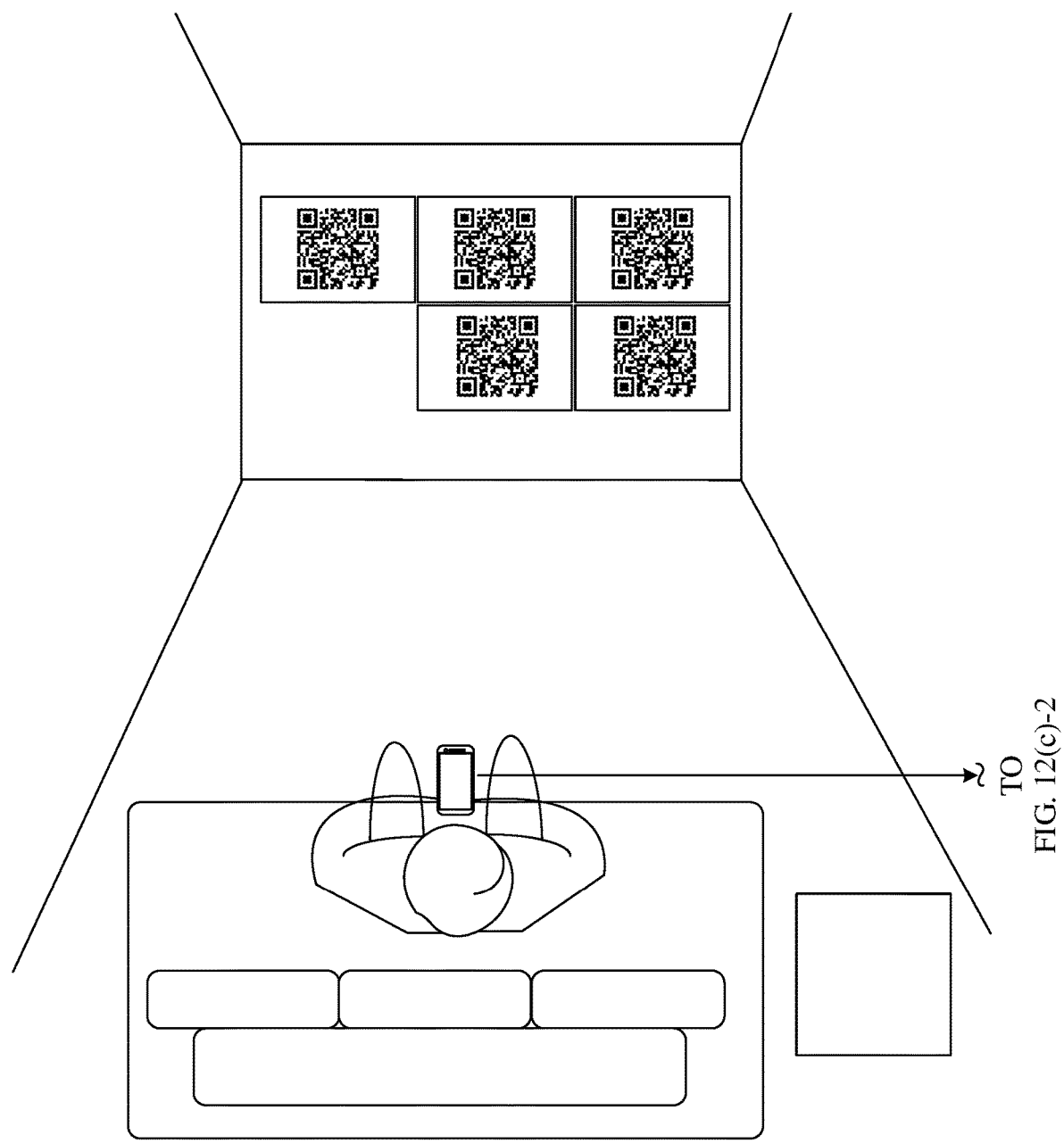
Figures 2, 12C:
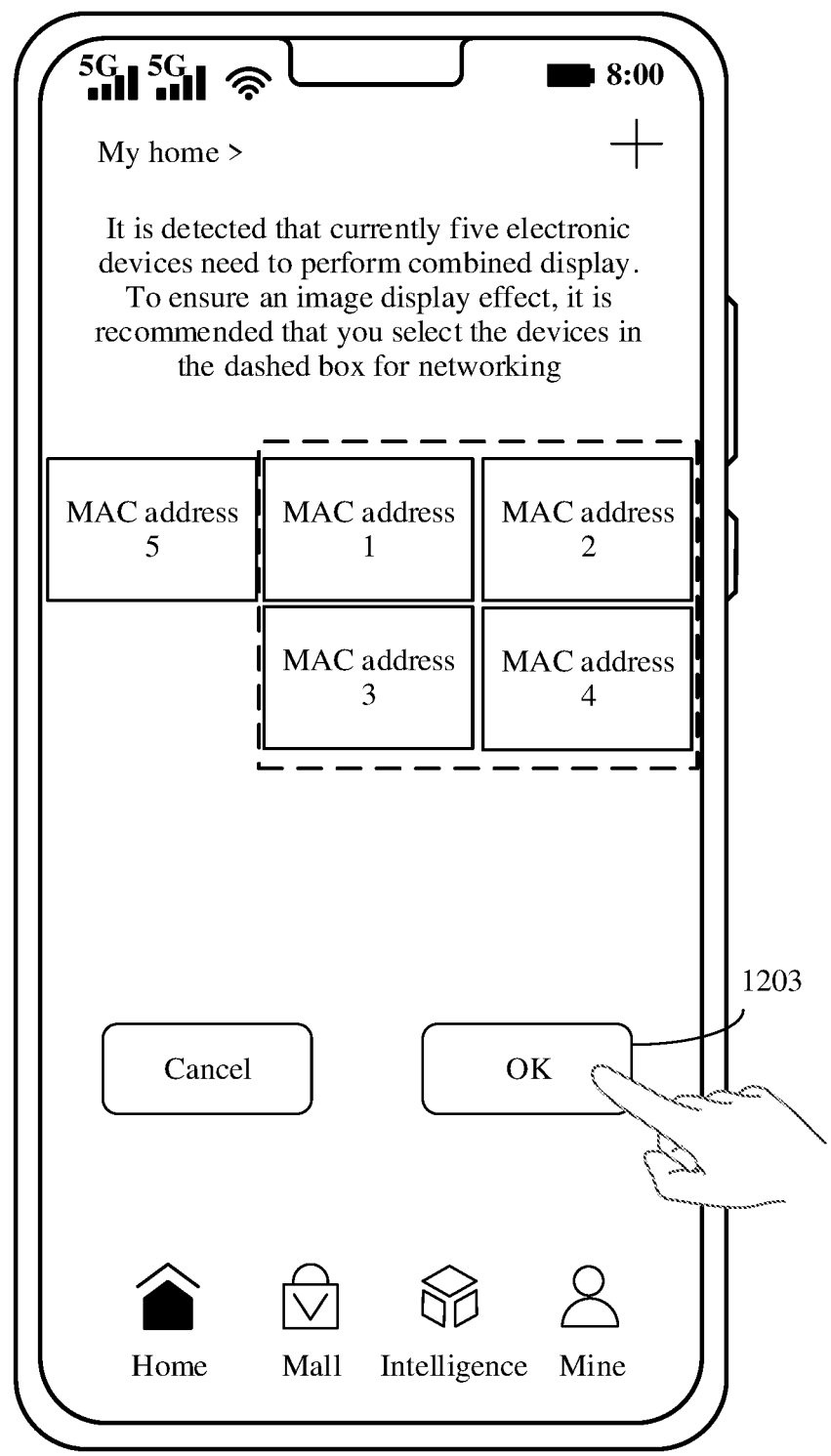
Figure 12D:
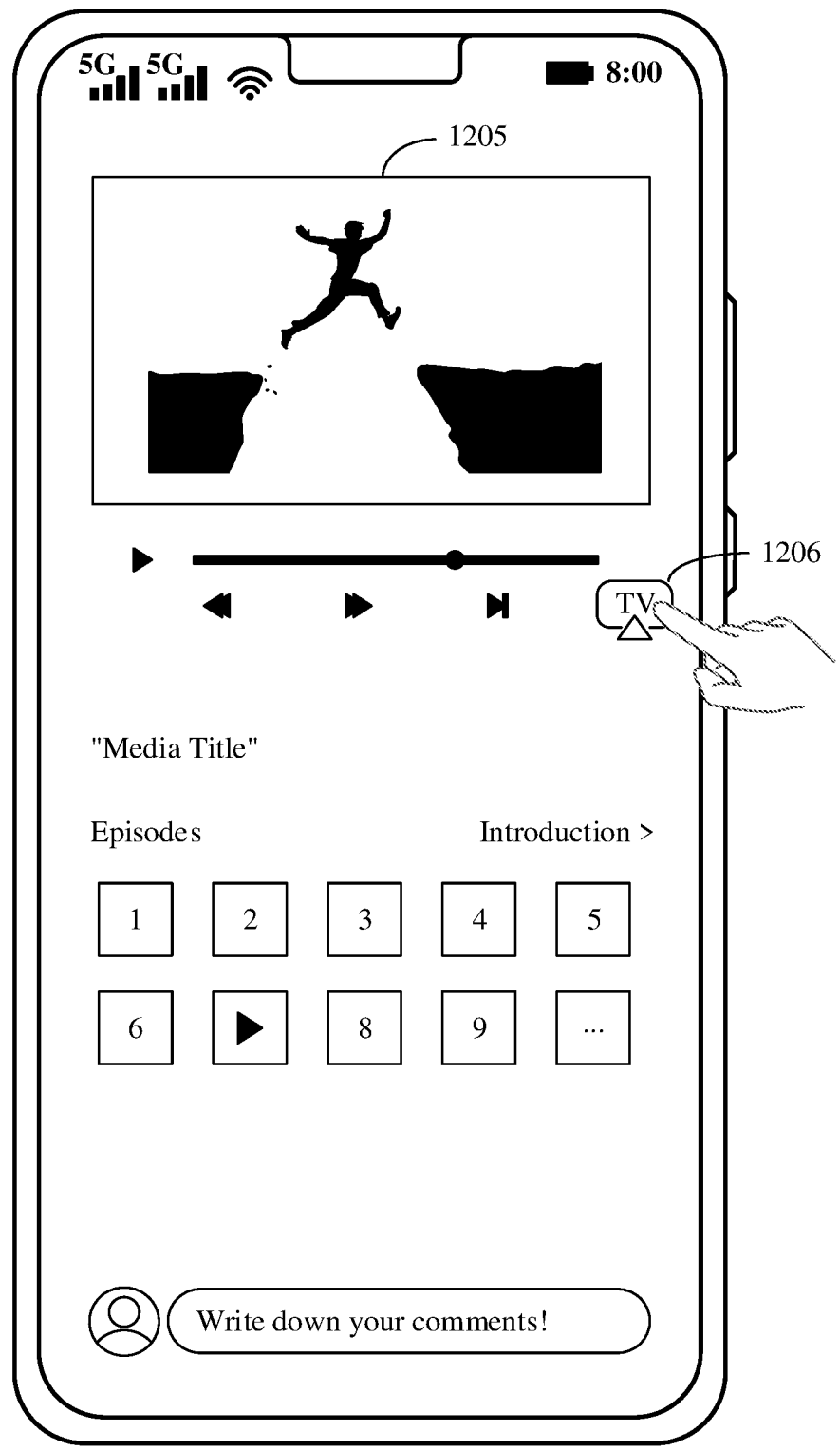
Figure 12E:
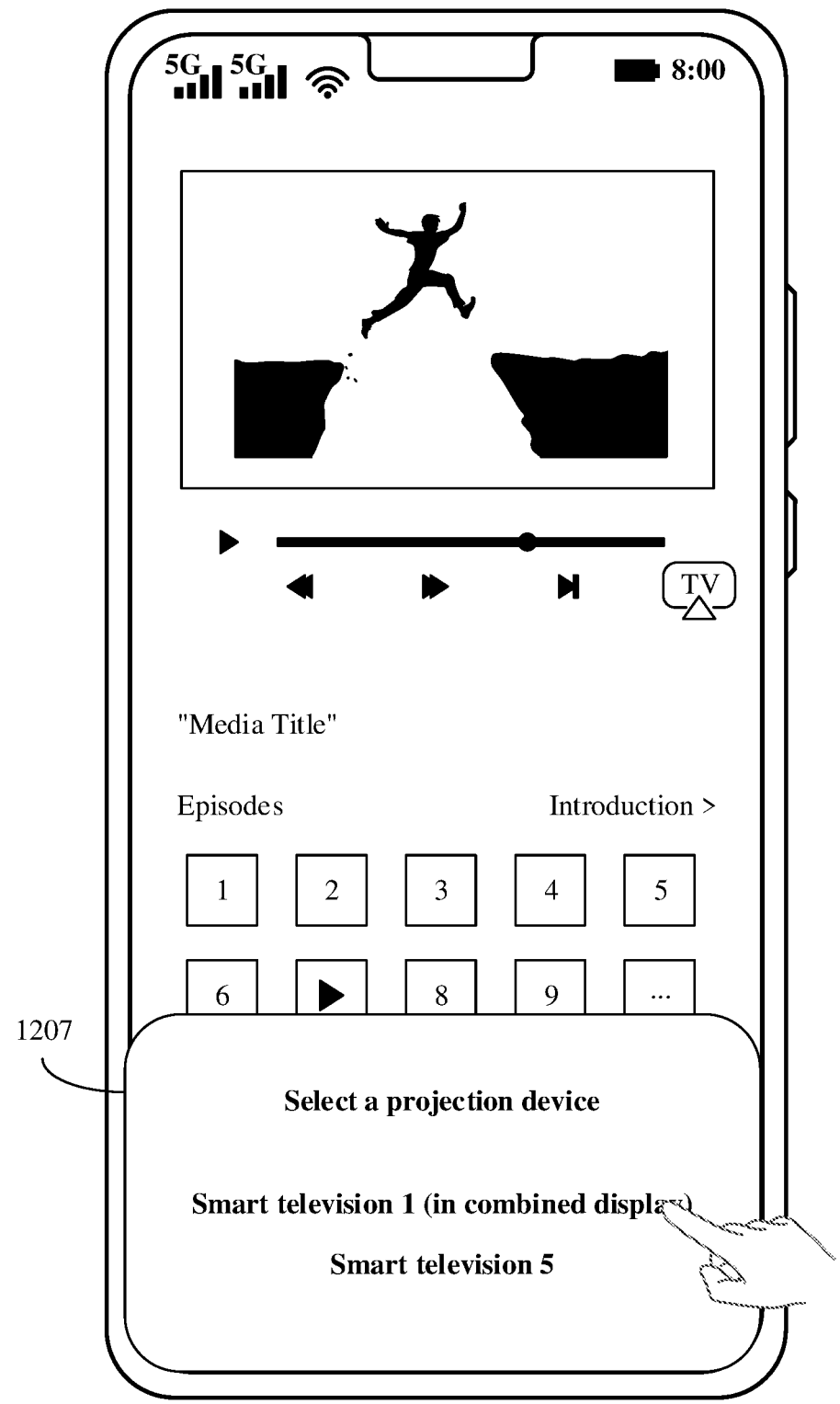
Figure 12F:
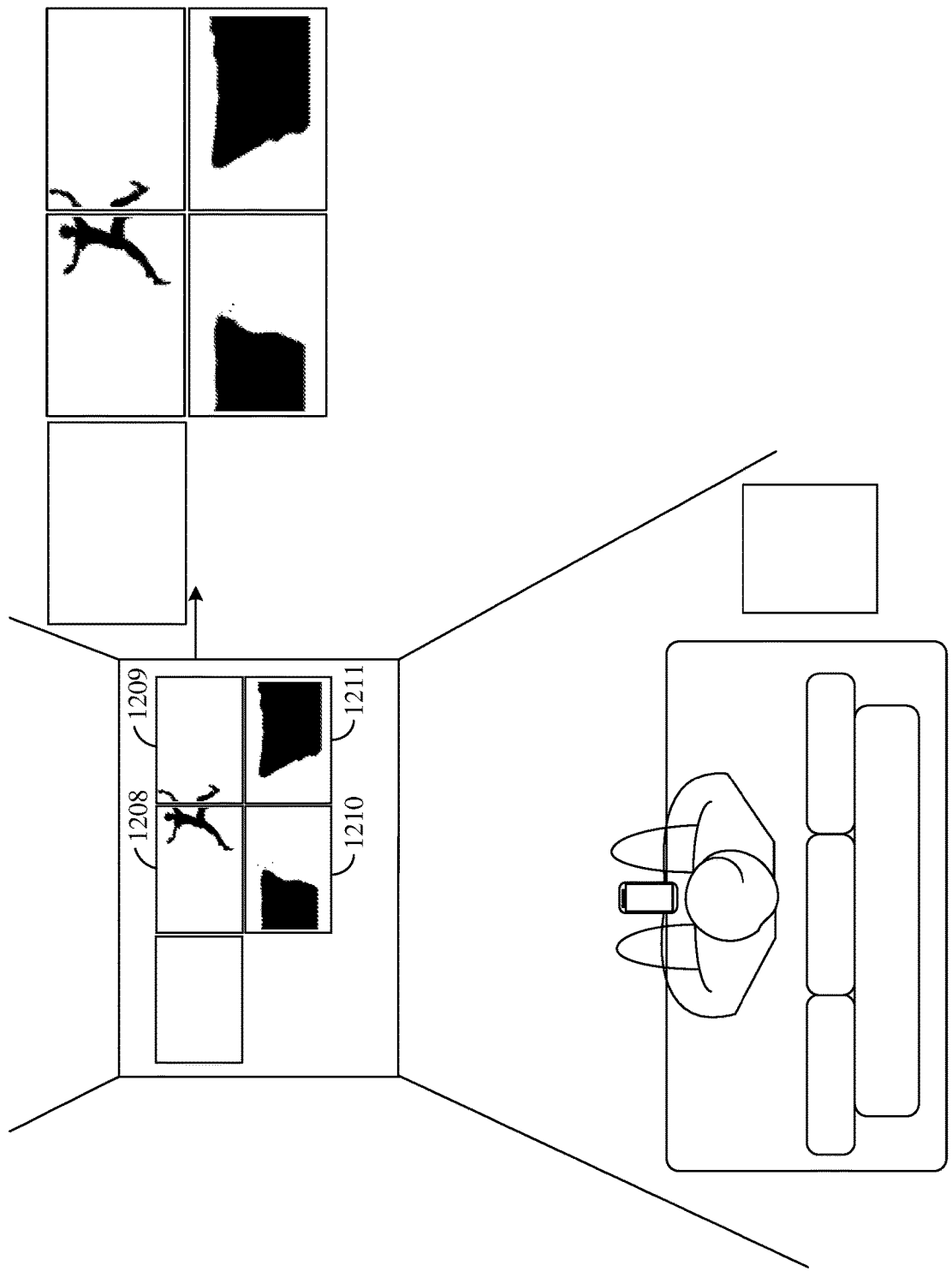

For example, as shown in FIG. 12(c)-1 and FIG. 12(c)-2, when the mobile phone determines that the smart television 1 to the smart television 5 are irregularly distributed, the mobile phone may select, for the user, the smart television 1 to the smart television 4 that are regularly distributed, for combined display. The mobile phone may prompt the user that "It is detected that currently five electronic devices need to perform combined display. To ensure an image display effect, it is recommended that you select the devices in the dashed box for combined display."

S409: The electronic device 200 controls, based on the indication information, the electronic device 200 to the electronic device 203 to display images.

Figure 7A:
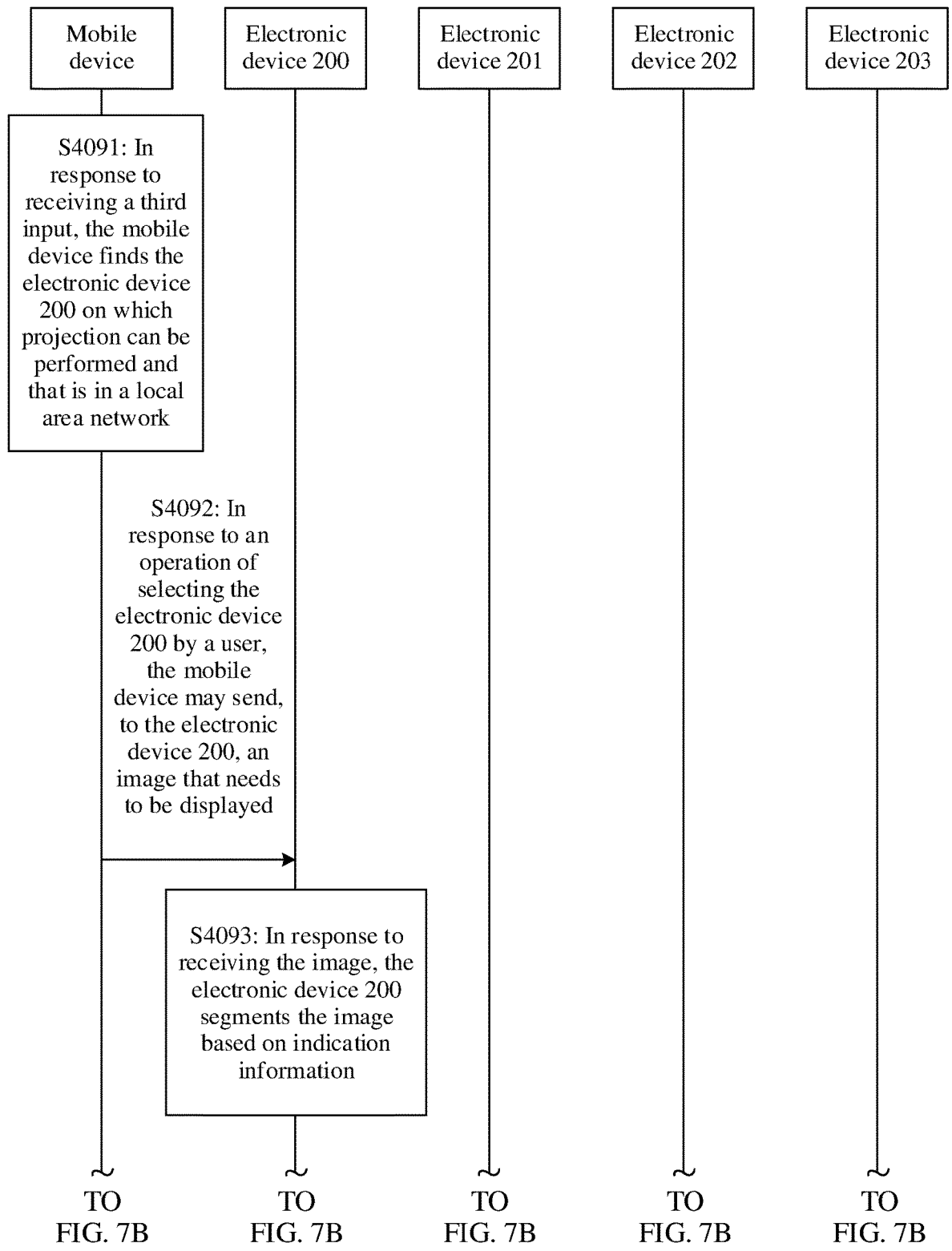
FIG. 7A and FIG. 7B are another schematic flowchart of a combined display method according to an embodiment of this application.
Figure 7B:
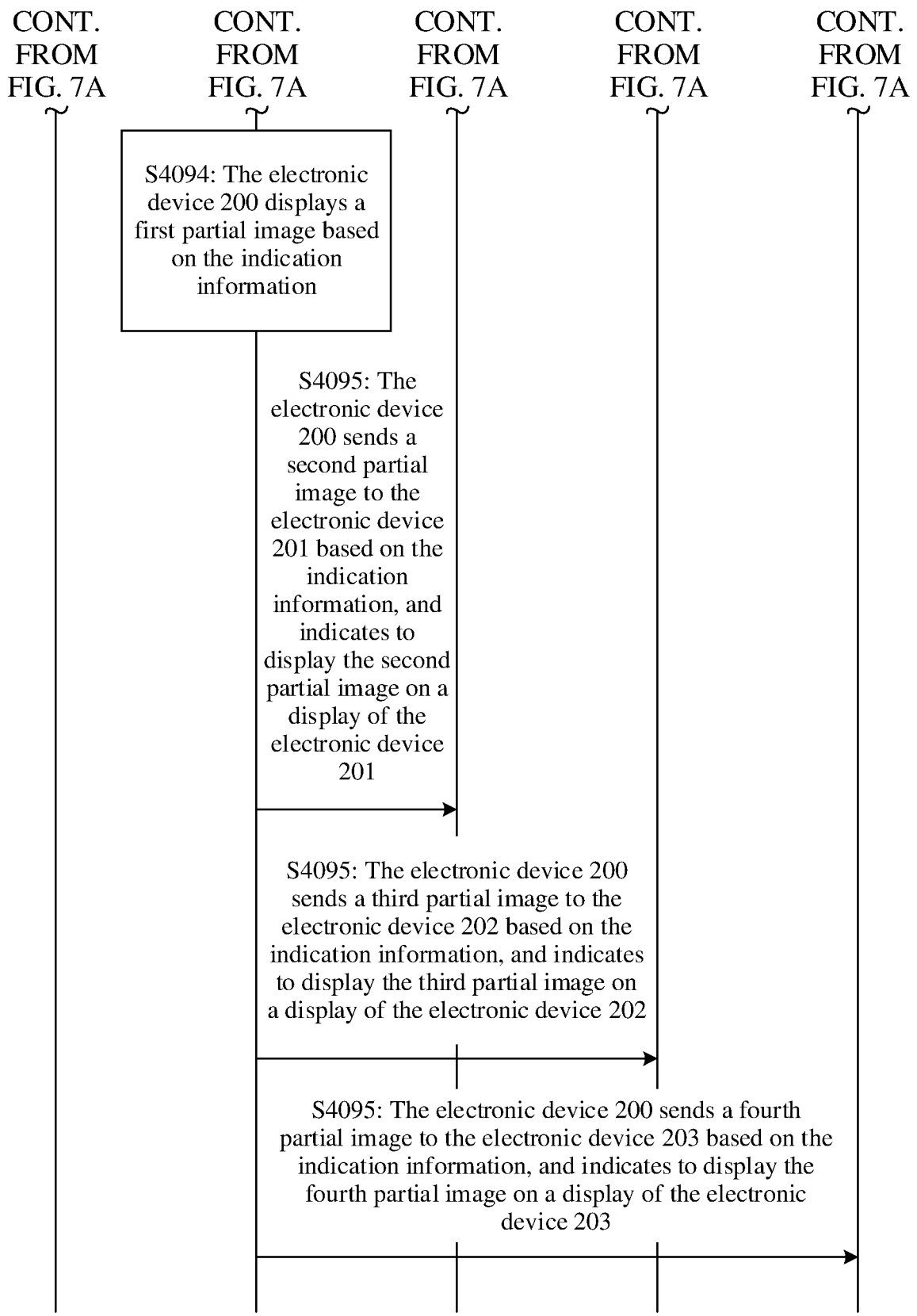
Figure 8:
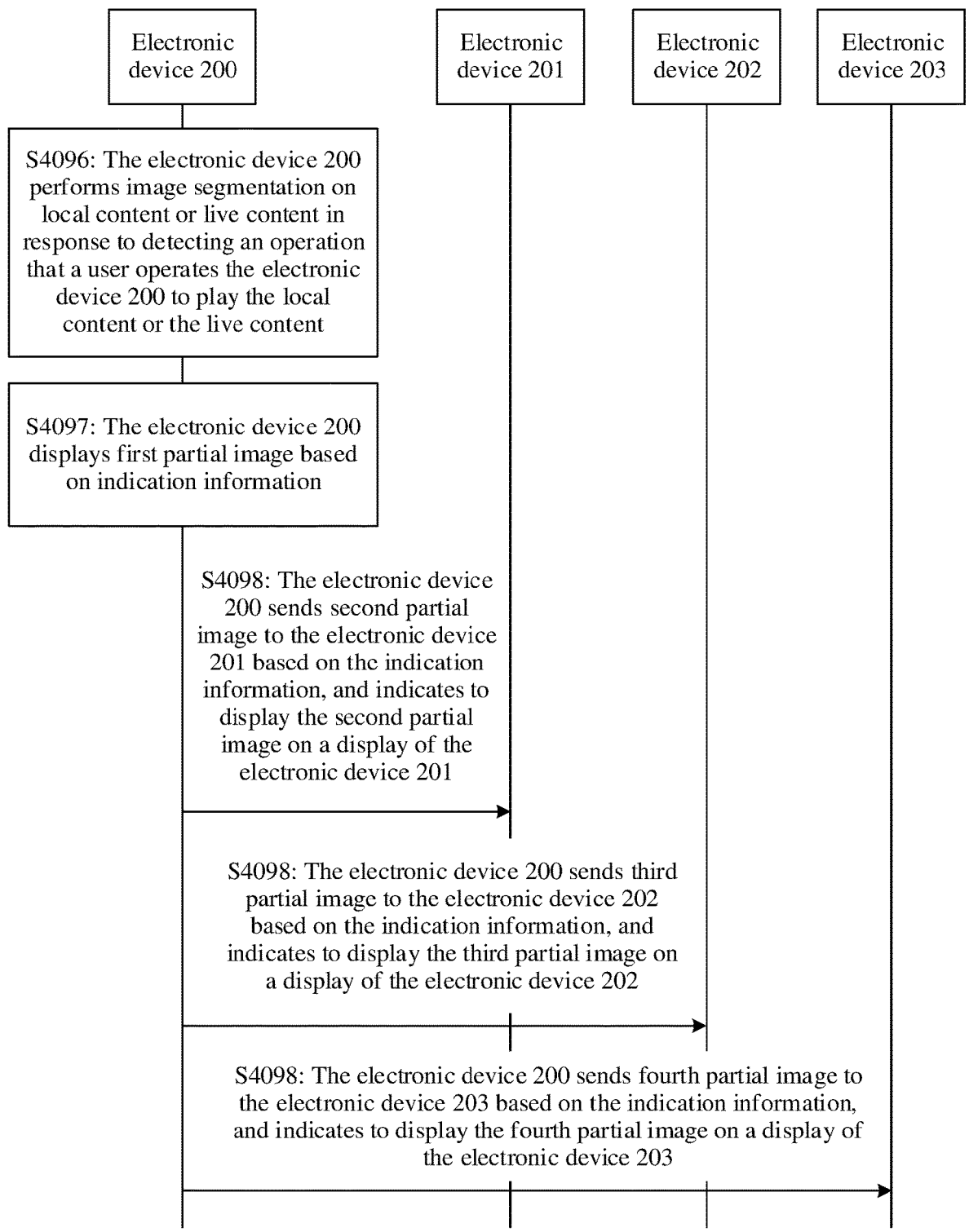
FIG. 8 is another schematic flowchart of a combined display method according to an embodiment of this application.

It should be understood that for a process in S409, refer to the processes shown in FIG. 7A and FIG. 7B and FIG. 8. Details are not described herein again.

In an embodiment, the mobile device may not send the indication information to the electronic device, but send the first image to the electronic device 200. After receiving the first image, the electronic device 200 may determine, based on the first image, the first information, the second information, the third information, and the fourth information, orientation information of the display of the electronic device 200 to the display of the electronic device 203, a correspondence between the first information and the display of the electronic device 200, a correspondence between the second information and the display of the electronic device 201, a correspondence between the third information and the display of the electronic device 202, and a correspondence between the fourth information and the display of the electronic device 203. After determining the foregoing information, the electronic device 200 may segment an image frame, and further control the electronic device 200 to the electronic device 203 to display images.

Figure 5:
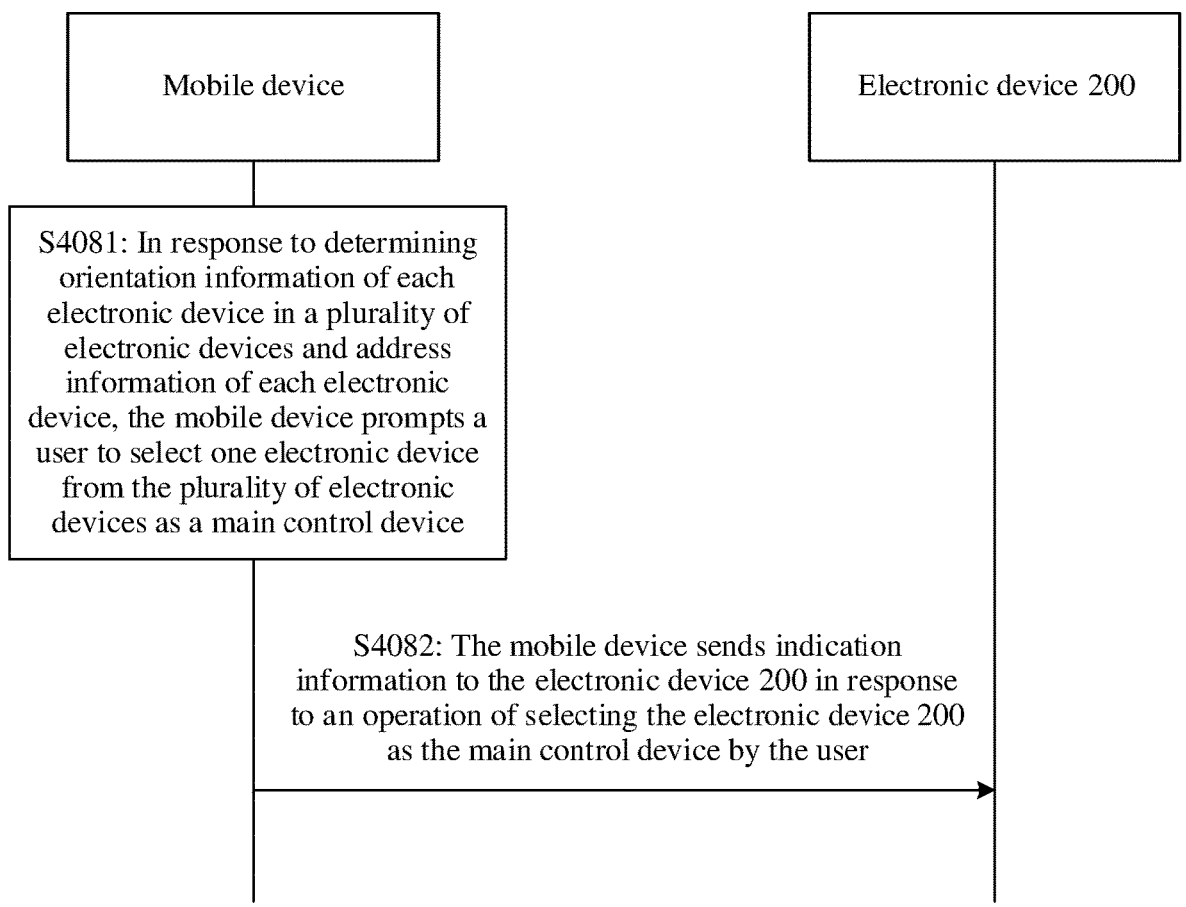
FIG. 5 is another schematic flowchart of a combined display method according to an embodiment of this application.

In S408 shown in FIG. 4C, the mobile device may randomly select an electronic device (for example, the electronic device 200) from the plurality of electronic devices and send the indication information to the electronic device; or when detecting an operation of selecting the electronic device 200 from the plurality of electronic devices by the user, the mobile device sends the indication information to the electronic device 200. FIG. 5 shows another schematic flowchart of a combined display method according to an embodiment of this application. As shown in FIG. 5, the method includes the following steps.

S4081: In response to determining the orientation information of each electronic device in the plurality of electronic devices and the address information of each electronic device, the mobile device prompts the user to select one electronic device (for example, an electronic device 200) from the plurality of electronic devices as a main control device.

It should be understood that, in this embodiment of this application, after a plurality of electronic devices perform combined display, the main control device may be discovered by a device (for example, a device that needs to perform projection) in a local area network. The main control device may be configured to: perform image segmentation on an image that needs to be displayed, and control the plurality of electronic devices to separately display the image obtained after segmentation.

Figures 1, 10E:
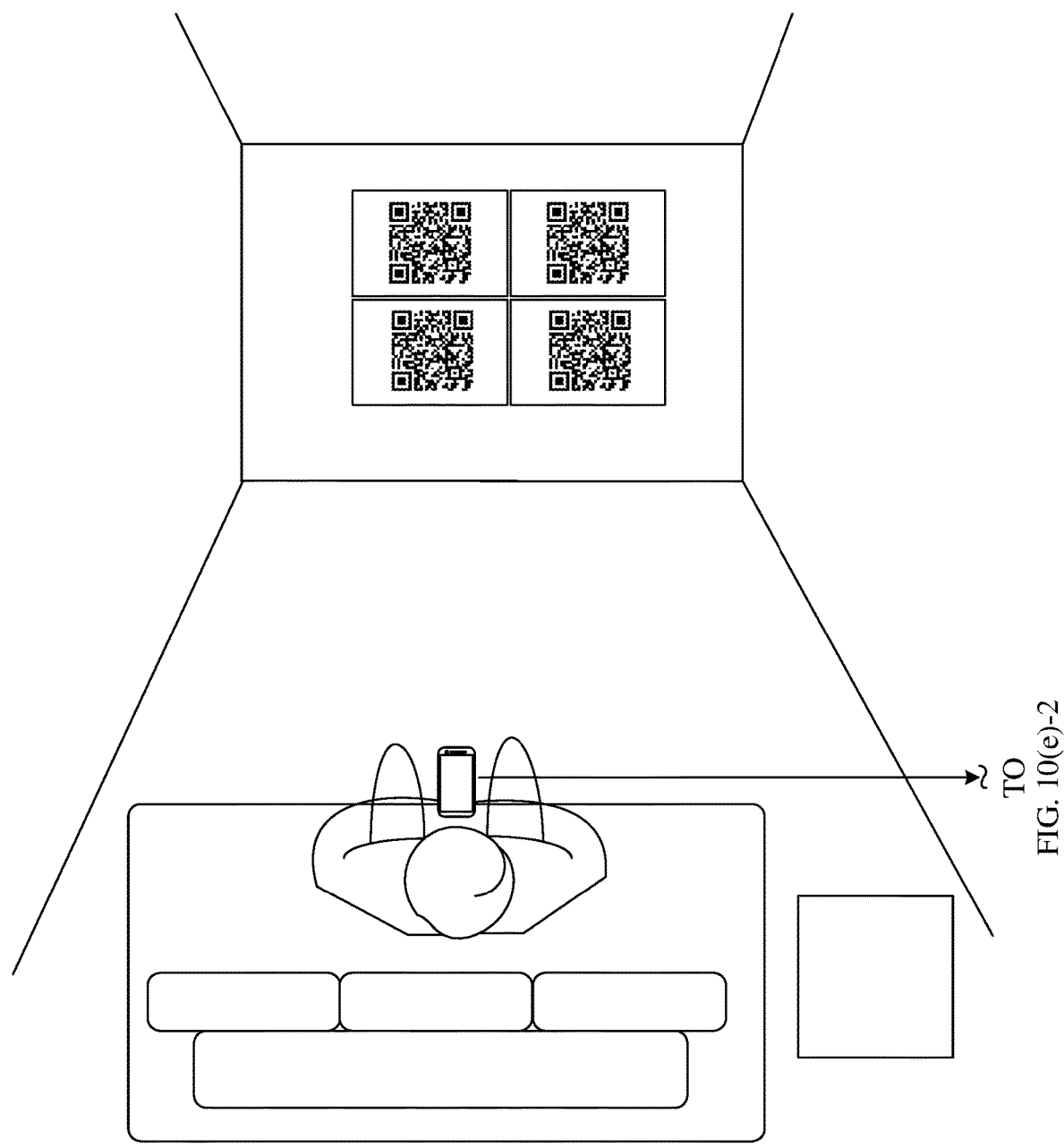
Figures 2, 10E:
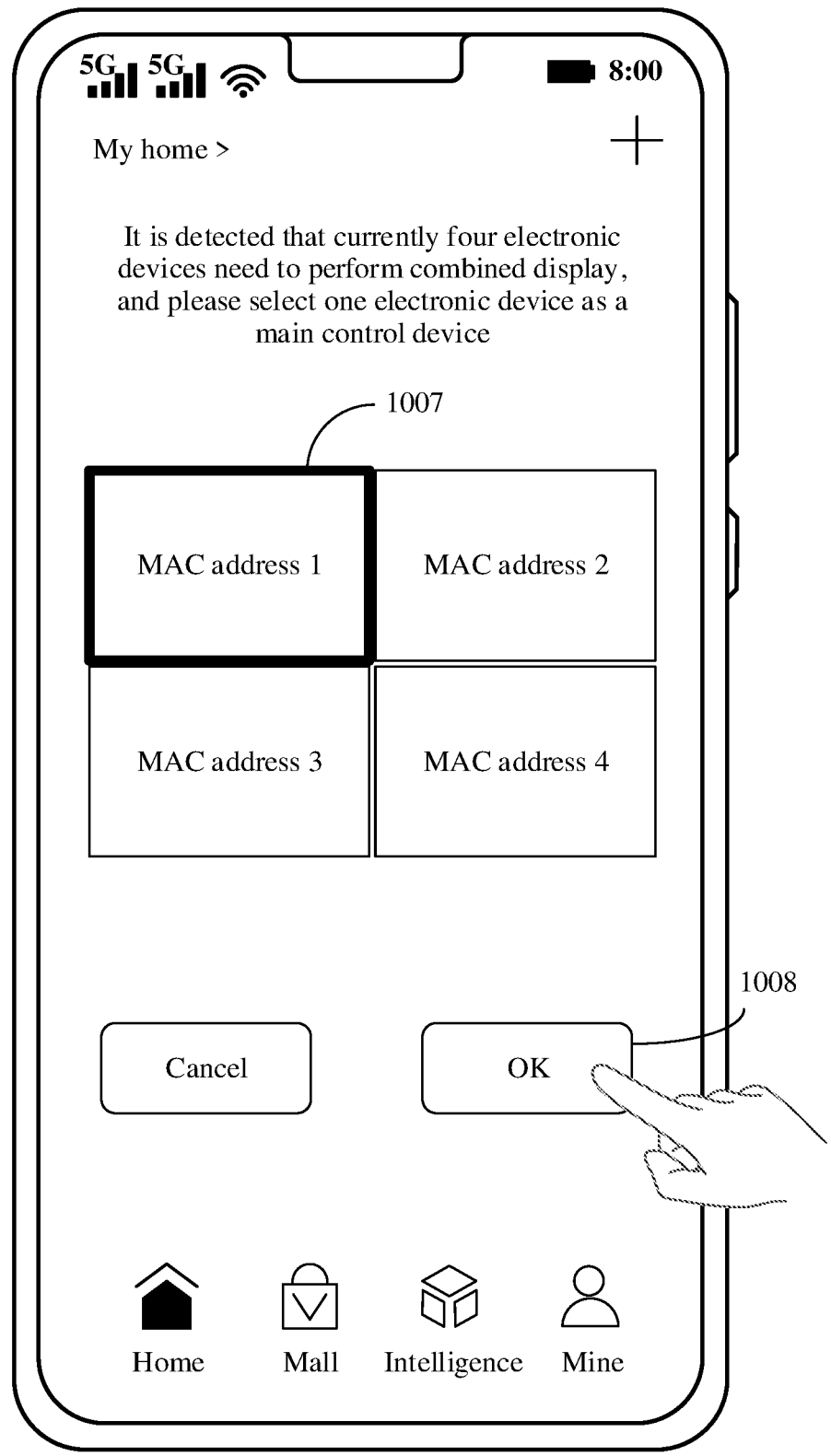
Figure 10F:
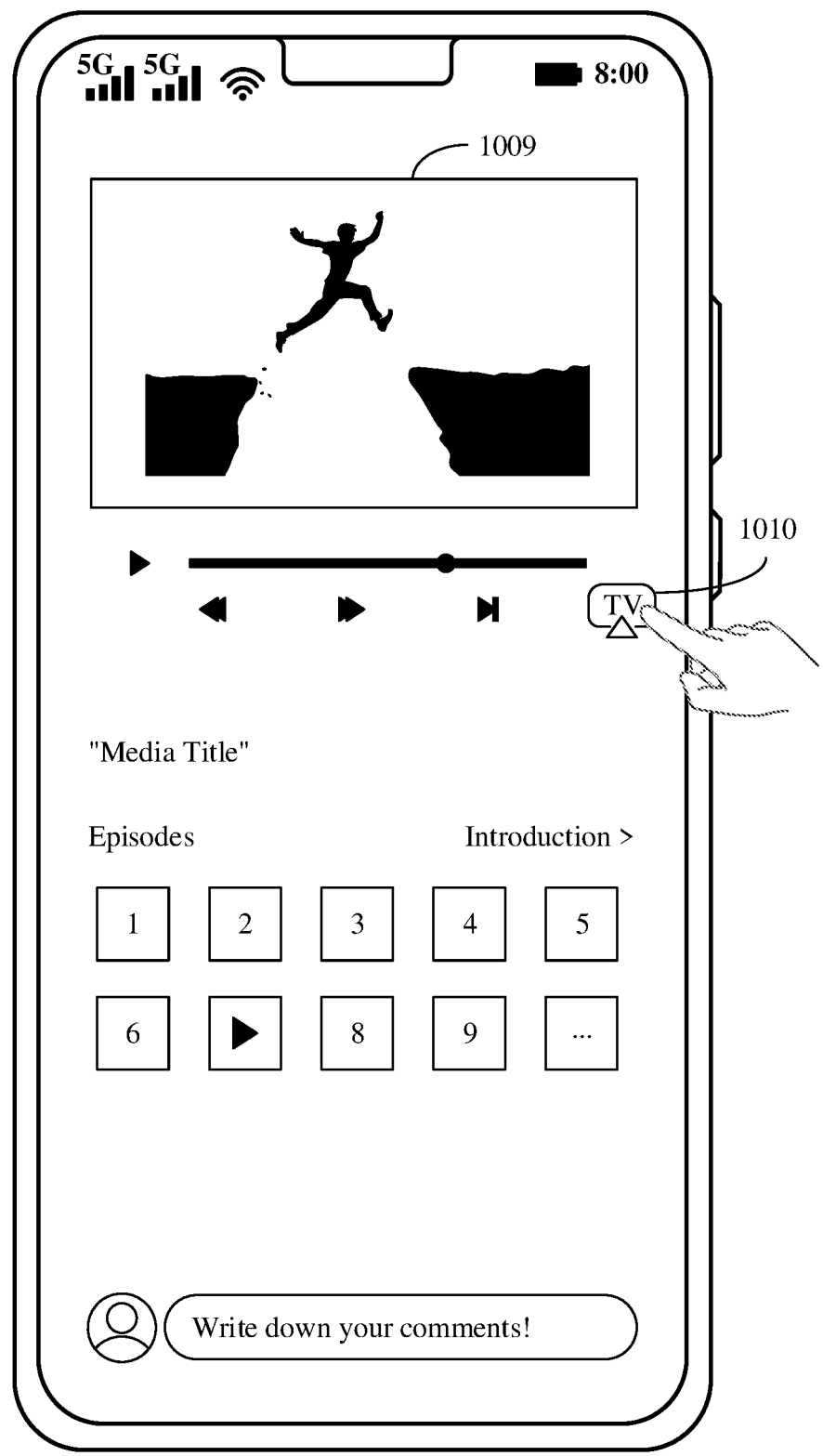
Figure 10G:
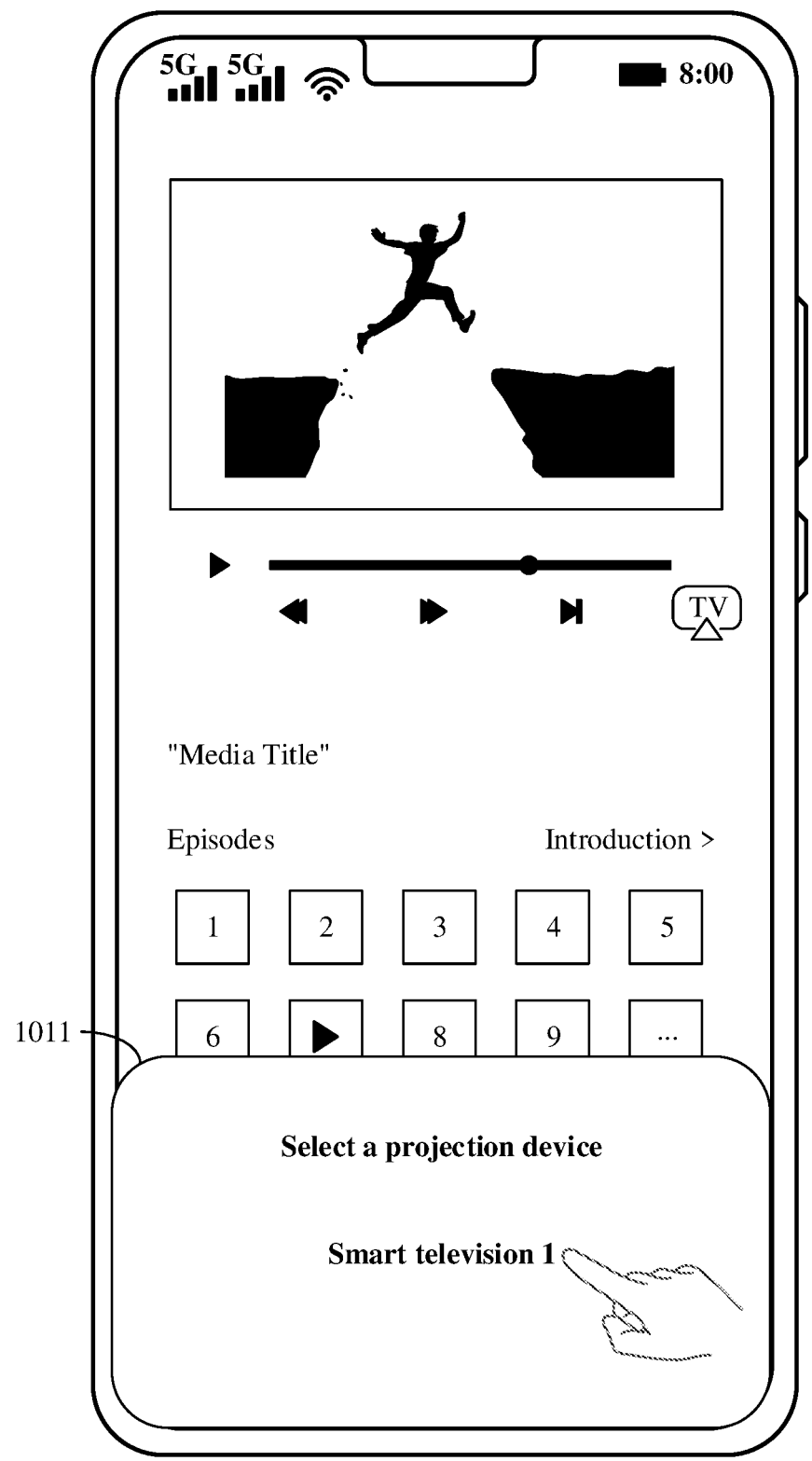
Figure 10H:
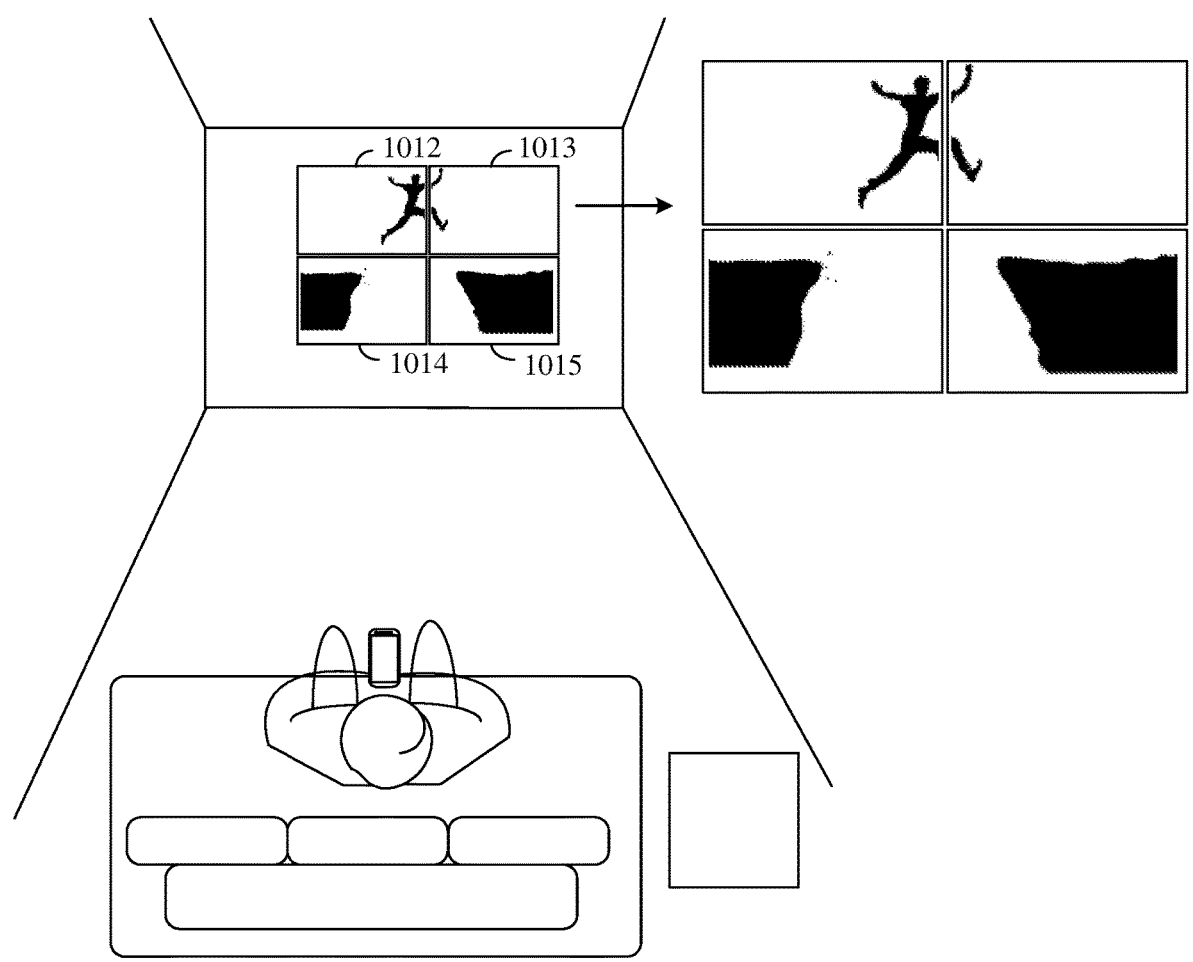

For example, as shown in FIG. 10(e)-1 and FIG. 10(e)-2, when the mobile phone detects an operation of selecting an electronic device whose MAC address is the MAC address 1 and tapping a control 1008 by the user, the mobile phone may determine that the electronic device whose MAC address is the MAC address 1 is a main control device.

S4082: The mobile device sends the indication information to the electronic device 200 in response to an operation of selecting the electronic device 200 as the main control device by the user.

It should be understood that, for a process in which the mobile device sends the indication information to the electronic device 200, refer to the description of S408. Details are not described herein again.

Figure 6:
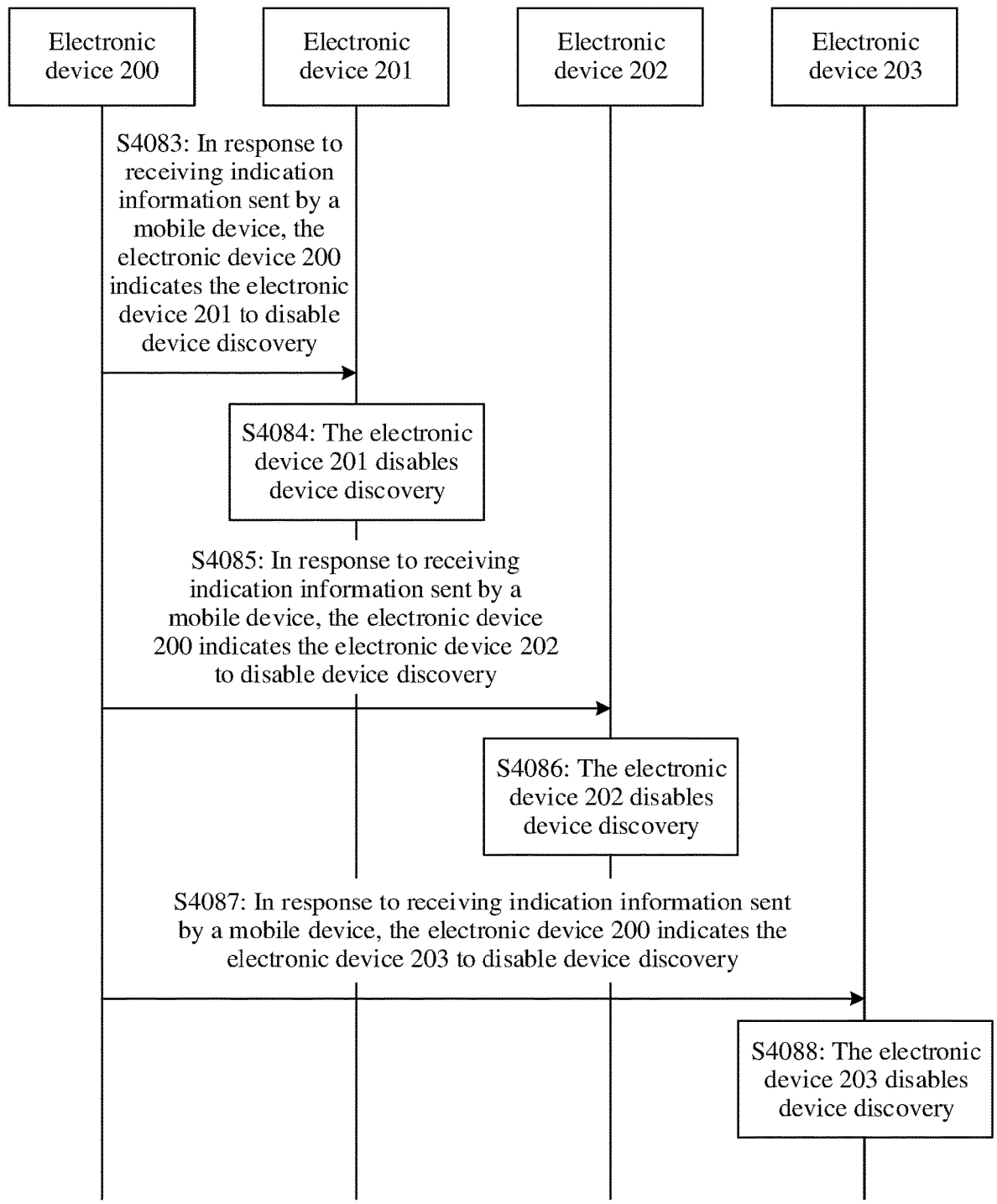
FIG. 6 is another schematic flowchart of a combined display method according to an embodiment of this application.

In this embodiment of this application, after receiving the indication information sent by the mobile device, the electronic device 200 may further indicate the electronic device 201 to the electronic device 203 to disable a device discovery state. FIG. 6 shows another schematic flowchart of a combined display method according to an embodiment of this application. As shown in FIG. 6, the method includes the following steps.

S4083: In response to receiving the indication information sent by the mobile device, the electronic device 200 indicates the electronic device 201 to disable device discovery.

In an embodiment, that the electronic device 200 indicates the electronic device 201 to disable device discovery includes: The electronic device 200 sends a notification message to the electronic device 201, where the notification message indicates the electronic device 201 to stop being in a to-be-discovered state.

S4084: The electronic device 201 disables device discovery.

S4085: In response to receiving the indication information sent by the mobile device, the electronic device 200 indicates the electronic device 202 to disable device discovery.

In an embodiment, that the electronic device 200 indicates the electronic device 202 to disable device discovery includes: The electronic device 200 sends a notification message to the electronic device 202, where the notification message indicates the electronic device 202 to stop being in a to-be-discovered state.

S4086: The electronic device 202 disables device discovery.

S4087: In response to receiving the indication information sent by the mobile device, the electronic device 200 indicates the electronic device 203 to disable device discovery.

In an embodiment, that the electronic device 200 indicates the electronic device 203 to disable device discovery includes: The electronic device 200 sends a notification message to the electronic device 203, where the notification message indicates the electronic device 203 to stop being in a to-be-discovered state.

S4088: The electronic device 203 disables device discovery.

It should be understood that, in this embodiment of this application, that the electronic device 200 indicates the electronic device 201 to the electronic device 203 to disable device discovery may alternatively be understood as the following: The electronic device 200 indicates the electronic device 201 to the electronic device 203 to stop being in a to-be-discovered state.

It should be further understood that, in this embodiment of this application, after the electronic device 201 to the electronic device 203 disable device discovery, when another device (for example, the mobile device) in the local area network searches in the local area network for a device on which projection may be performed, the electronic device 201 to the electronic device 203 are not found.

It should be further understood that there is no actual sequence between S4083 and S4084, S4085 and S4086, and S4087 and S4088.

For example, as shown in FIG. 10(*e*)-1 and FIG. 10(*e*)-2, when the mobile phone detects an operation of selecting an electronic device (the smart television 1) whose MAC address is the MAC address 1 and tapping a control 1008 by the user, the mobile phone may send the indication information to the smart television 1. After receiving the indication information, the smart television 1 may indicate the smart television 2, the smart television 3, and the smart television 4 to disable device discovery. As shown in FIG. 10(*g*), the smart television 1 is the only device on which projection may be performed and that is found in the local area network by a mobile phone.

With reference to FIG. 7A and FIG. 7B and FIG. 8, the following specifically describes S409 in which the electronic device 200 controls, based on the indication information, the electronic device 200 to the electronic device 203 to display images. FIG. 7A and FIG. 7B show another schematic flowchart of a combined display method according to an embodiment of this application. As shown in FIG. 7A and FIG. 7B, the method includes the following steps.

S4091: In response to receiving a third input, the mobile device finds an electronic device 200 on which projection may be performed and that is in the local area network.

For example, as shown in FIG. 10(*g*), the mobile phone may prompt the user to select a projection device and display a found device list, where the device list includes the smart television 1.

It should be understood that the mobile device in S4091 and the mobile device in FIG. 4A to FIG. 4C to FIG. 6 may be the same, or may be different. This is not limited in this embodiment of this application.

S4092: In response to an operation of selecting, by the user, the electronic device 200 to perform projection, the mobile device may send, to the electronic device 200, an image that needs to be displayed.

For example, as shown in FIG. 10(*g*), when the mobile phone detects an operation of selecting the smart television 1 by the user, the mobile phone may send the image of a video display window 1009 to the smart television 1.

S4093: In response to receiving the image, the electronic device 200 segments the image based on the indication information.

In an embodiment, the electronic device 200 segments the image based on the indication information, to obtain first partial image, second partial image, third partial image, and fourth partial image.

In an embodiment, that the electronic device 200 segments the image based on the indication information includes: The electronic device 200 segments the image based on orientation information of the display of the electronic device 200, the display of the electronic device 201, the display of the electronic device 202, and the display of the electronic device 203.

In an embodiment, that the electronic device 200 segments the image based on the indication information includes: The electronic device 200 segments the image based on orientation information of the display of the electronic device 200, the display of the electronic device 201, the display of the electronic device 202, and the display of the electronic device 203 and sizes of the display of the electronic device 200, the display of the electronic device 201, the display of the electronic device 202, and the display of the electronic device 203.

S4094: The electronic device 200 displays the first partial image based on the indication information.

In an embodiment, the electronic device 200 displays the first partial image based on orientation information of the electronic device 200.

S4095: Based on the indication information, the electronic device 200 sends the second partial image to the electronic device 201 and indicates to display the second partial image on the display of the electronic device 201, sends the third partial image to the electronic device 202 and indicates to display the third partial image on the display of the electronic device 202, and sends the fourth partial image to the electronic device 203 and indicates to display the fourth partial image on the display of the electronic device 203.

In an embodiment, the electronic device 200 determines, based on orientation information of the electronic device 201, to send the second partial image to the electronic device 201; the electronic device 200 determines, based on orientation information of the electronic device 202, to send the third partial image to the electronic device 202; and the electronic device 200 determines, based on orientation information of the electronic device 203, to send the fourth partial image to the electronic device 203.

For example, after obtaining the image sent by the mobile device, the electronic device 200 may segment the image based on a quantity of electronic devices in the matrix M and orientation information of the electronic devices. For example, that the matrix M includes the MAC addresses 1 to 4 indicates that four electronic devices perform combined display, and the four electronic devices are respectively located in an upper left corner, an upper right corner, a lower left corner, and a lower right corner. In this case, the electronic device 200 may segment, based on orientations of the four electronic devices, one frame of image sent by the mobile device into four frames of images. Therefore, the electronic device 200 may display image in the upper left corner. The electronic device 200 may send image in the upper right corner to the electronic device corresponding to the MAC address 2 in the first row and the second column in the matrix M, so that the electronic device displays the image in the upper right corner. The electronic device 200 may send image in the lower left corner to the electronic device corresponding to the MAC address 3 in the second row and the first column in the matrix M, so that the electronic device displays the image in the lower left corner. The electronic device 200 may send image in the lower right corner to the electronic device corresponding to the MAC address 4 in the second row and the second column in the matrix M, so that the electronic device displays the image in the lower right corner.

It should be understood that there is no actual sequence between S4094 and S4095.

For example, as shown in FIG. 10(*h*), after receiving image sent by the mobile phone, the smart television 1 may segment the image into image 1012, image 1013, image 1014, and image 1015. The smart television 1 may display the image 1012 in the upper left corner. The smart television 1 may further send the image 1013 to the smart television 2, so that the smart television 2 displays the image 1013 in the upper right corner. The smart television 1 may further send the image 1014 to the smart television 3, so that the smart television 3 displays the image 1014 in the lower left corner. The smart television 1 may further send the image 1015 to the smart television 4, so that the smart television 4 displays the image 1015 in the lower right corner.

FIG. 8 shows another schematic flowchart of a combined display method according to an embodiment of this application. As shown in FIG. 8, the method includes the following steps.

S4096: The electronic device 200 performs image segmentation on local content or live content in response to detecting an operation that a user operates the electronic device 200 to play the local content or the live content.

In an embodiment, the electronic device 200 segments the image based on the indication information, to obtain first partial image, second partial image, third partial image, and fourth partial image.

S4097: The electronic device 200 displays the first partial image based on the indication information.

In an embodiment, the electronic device 200 displays the first partial image based on orientation information of the electronic device 200.

S4098: Based on the indication information, the electronic device 200 sends the second partial image to the electronic device 201 and indicates to display the second partial image on the display of the electronic device 201, sends the third partial image to the electronic device 202 and indicates to display the third partial image on the display of the electronic device 202, and sends the fourth partial image to the electronic device 203 and indicates to display the fourth partial image on the display of the electronic device 203.

In an embodiment, the electronic device 200 determines, based on orientation information of the electronic device 201, to send the second partial image to the electronic device 201; the electronic device 200 determines, based on orientation information of the electronic device 202, to send the third partial image to the electronic device 202; and the electronic device 200 determines, based on orientation information of the electronic device 203, to send the fourth partial image to the electronic device 203.

It should be understood that a difference between S4096 and S4093 lies in the following: In S4093, the electronic device 200 needs to receive the image sent by the mobile device, and control the electronic device 200 to the electronic device 203 to display images; however, in S4096, the electronic device 200 does not need to receive image sent by another device in the local area network, and when playing the local content or the live content, the electronic device 200 controls the electronic device 200 to the electronic device 203 to display images.

It should be further understood that S4091 to S4095 and S4096 to S4098 are in a parallel relationship.

It should be further understood that, for a process in which the electronic device 200 controls the electronic device 200 to the electronic device 203 to display images in S4096 to S4098, refer to the foregoing processes in S4093 to S4095. For brevity, details are not described herein again.

Figure 13A:
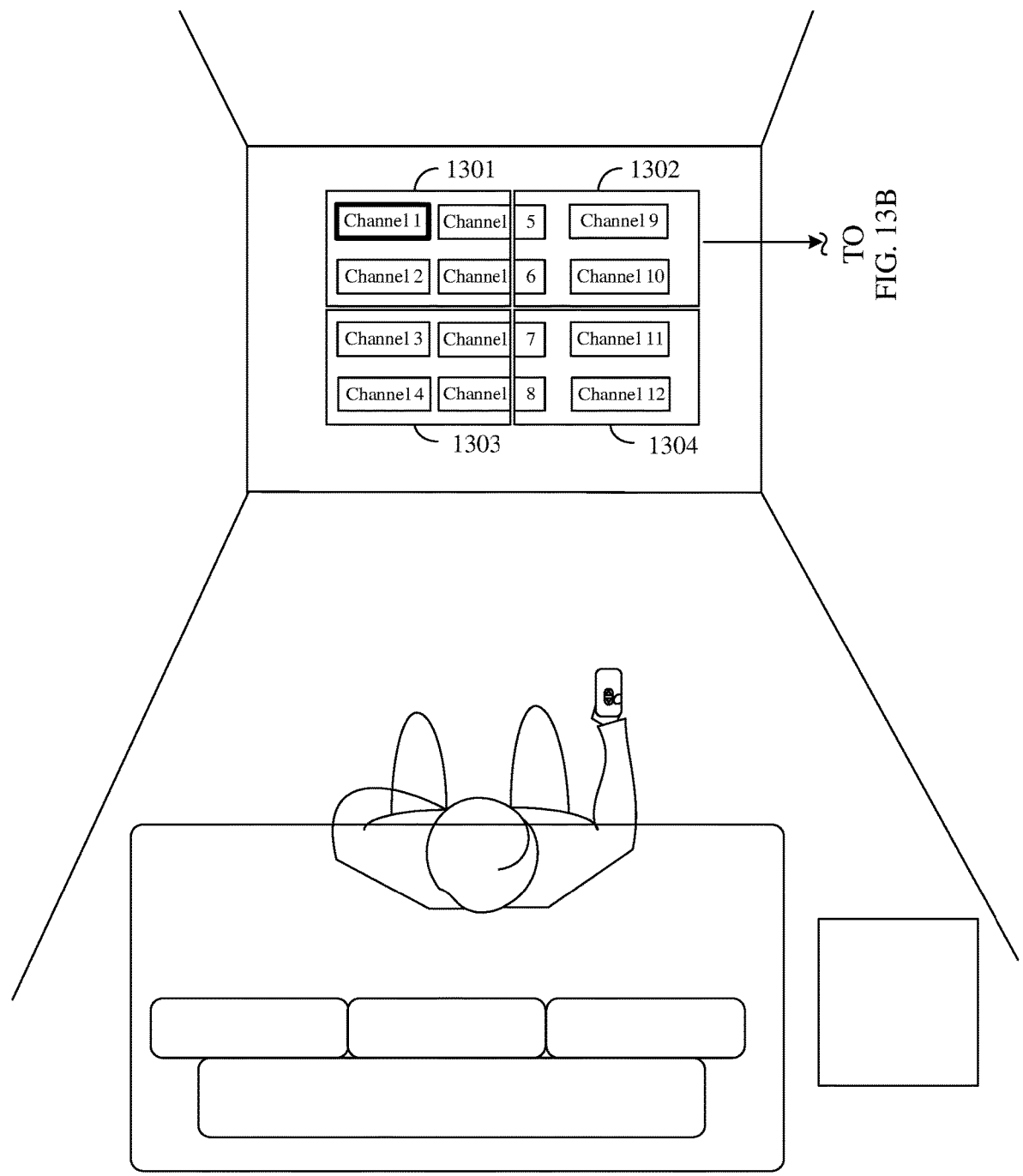
FIG. 13A and FIG. 13B show another set of graphical user interfaces according to an embodiment of this application.
Figure 13B:
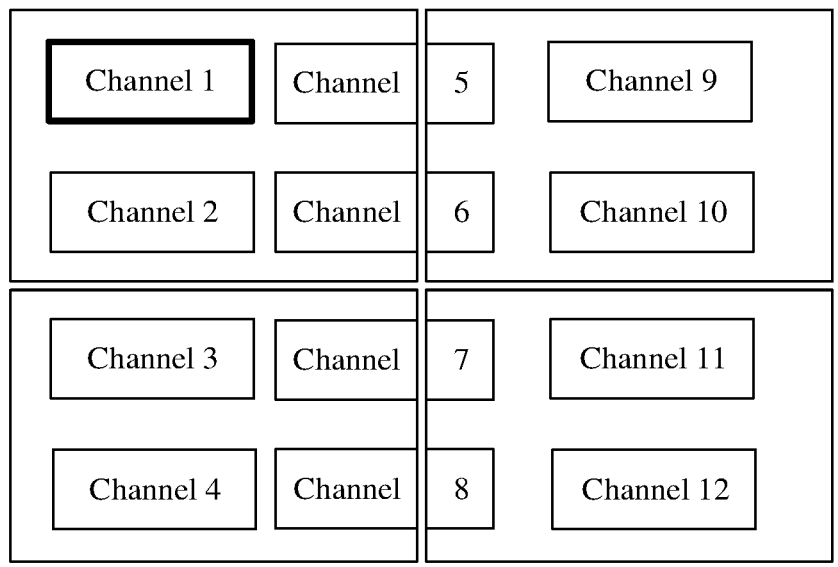

For example, as shown in FIG. 13A and FIG. 13B, after detecting that the user switches to a channel display interface by using a remote control, the smart television 1 may segment image corresponding to the channel display interface into image 1301, image 1302, image 1303, and image 1304. The smart television 1 may display the image 1301 in the upper left corner. The smart television 1 may further send the image 1302 to the smart television 2, so that the smart television 2 displays the image 1302 in the upper right corner. The smart television 1 may further send the image 1303 to the smart television 3, so that the smart television 3 displays the image 1303 in the lower left corner. The smart television 1 may further send the image 1304 to the smart television 4, so that the smart television 4 displays the image 1304 in the lower right corner.

According to the technical solutions provided in this application, no dedicated screen splitting device is required. In addition, complex cabling between different electronic devices is not required in a wireless manner. Because the screen splitting device and cabling between different electronic devices are not used, costs are accordingly reduced. In addition, combined display performed by a plurality of different electronic devices is implemented.

Figure 14A:
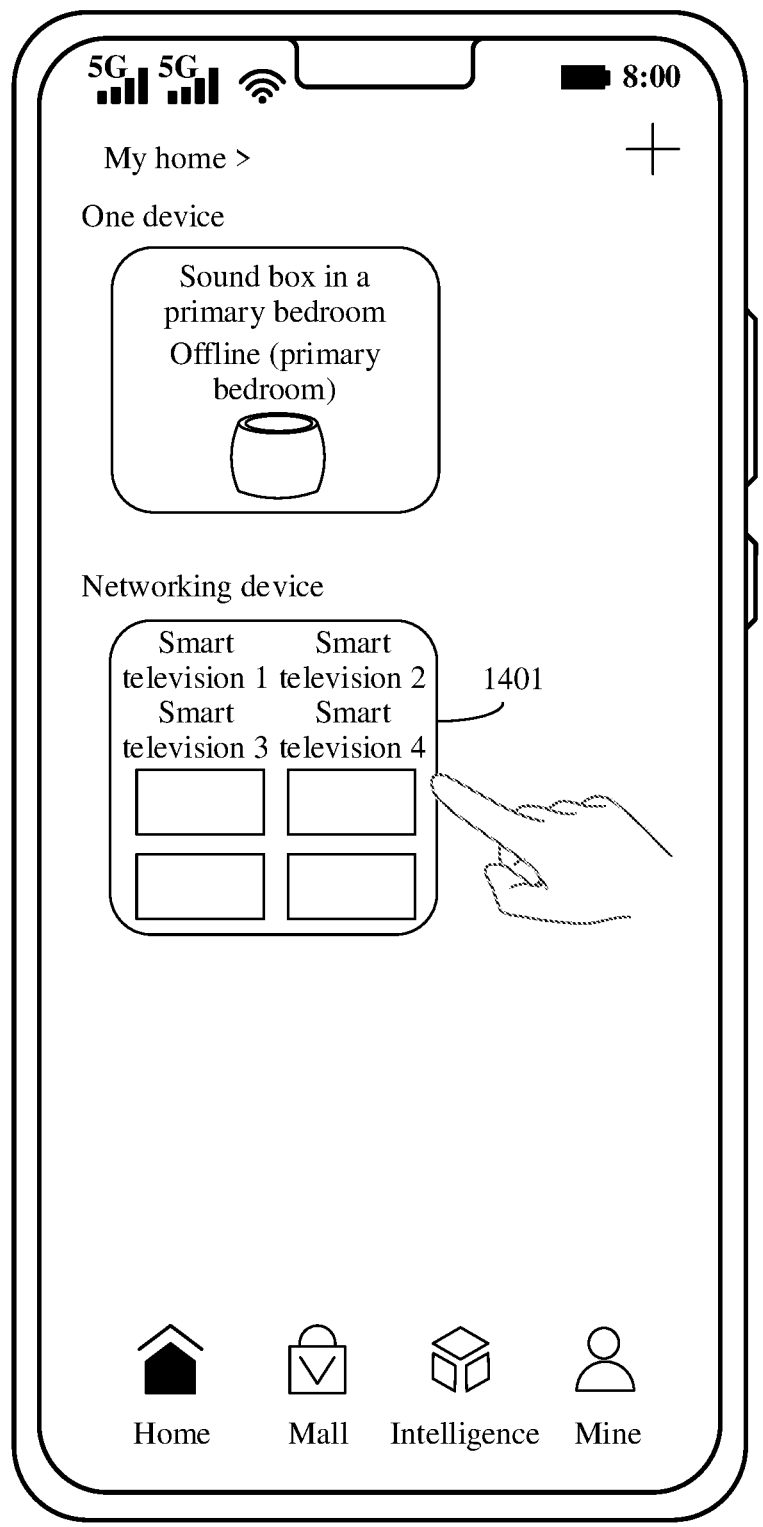
FIG. 14(a) to FIG. 14(c) show another set of graphical user interfaces according to an embodiment of this application.
Figure 14B:
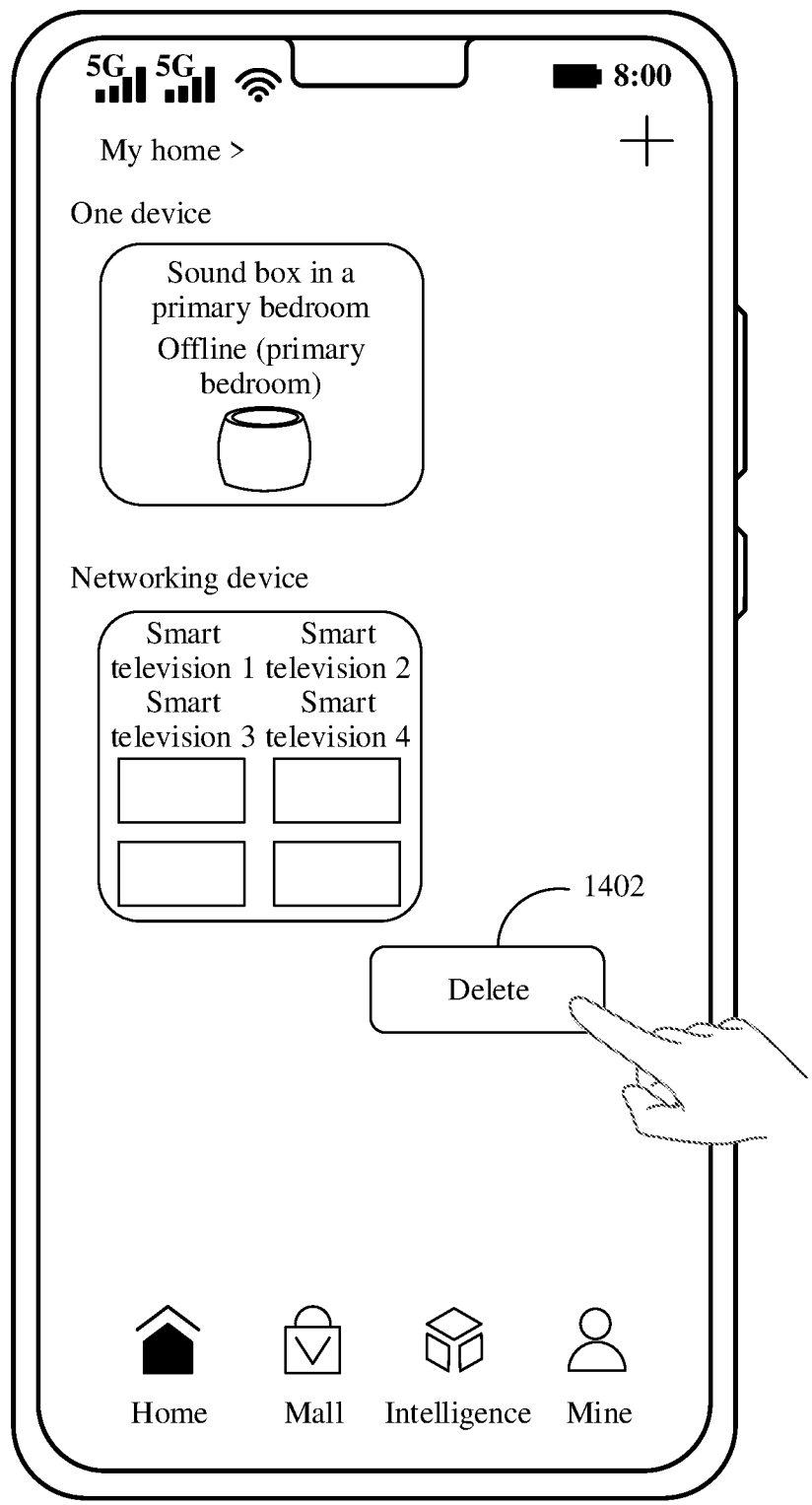
Figure 14C:
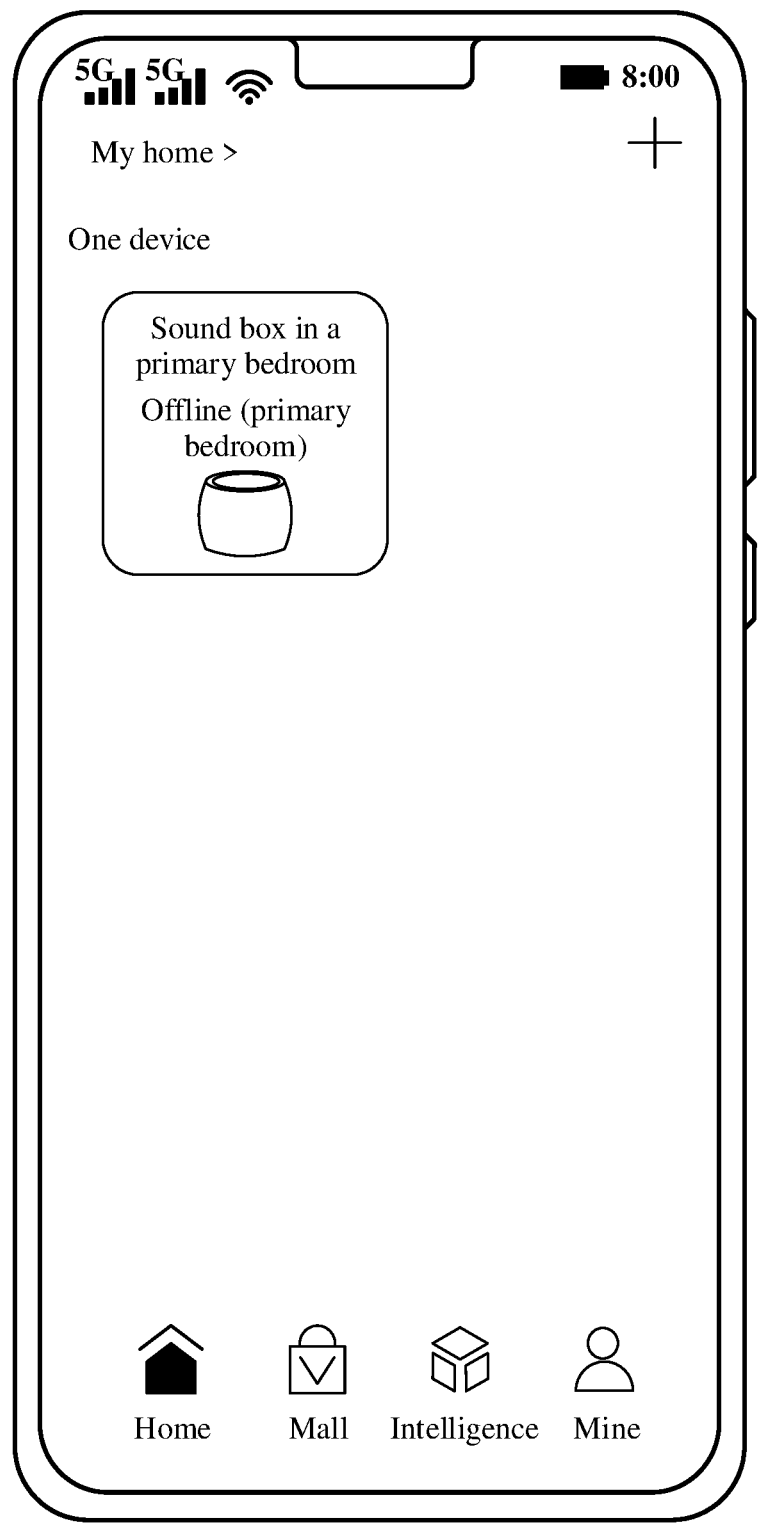

The following further describes the combined display method in embodiments of this application with reference to graphical user interfaces (graphical user interface, GUI) shown in FIG. 9(*a*) and FIG. 9(*b*) to FIG. 14(*a*) to FIG. 14(*c*). FIG. 9(*a*) and FIG. 9(*b*) show a set of GUIs according to an embodiment of this application.

As shown in FIG. 9(*a*), a mobile phone, a smart television 1, a smart television 2, a smart television 3, and a smart television 4 are located in a same local area network. The mobile phone displays a video playback interface. The video playback interface includes a video display window 901 and a projection control 902. The smart television 1, the smart television 2, the smart television 3, and the smart television 4 are in a to-be-discovered state. In response to detecting an operation of tapping the control 902 by the user, the mobile phone may display a GUI shown in FIG. 9(*b*).

On the GUI shown in FIG. 9(*b*), the mobile phone may display a prompt box 903, where the prompt box 903 includes device information of the smart television 1, the smart television 2, the smart television 3, and the smart television 4 that are in a to-be-discovered state in the local area network.

For example, when the mobile phone detects an operation of selecting the smart television 2 by the user, the mobile phone may send the image in the video display window 901 to the smart television 2.

FIG. 10(*a*)-1 to FIG. 10(*h*) show still another set of GUIs according to an embodiment of this application.

As shown in FIG. 10(*a*)-1 and FIG. 10(*a*)-2, a living room includes the smart television 1, the smart television 2, the smart television 3, and the smart television 4. The mobile phone displays a desktop of the mobile phone. The desktop of the mobile phone includes icons of a plurality of applications, and the plurality of applications include Clock, Calendar, Gallery, Memo, Smart life, and the like. In response to detecting an input (for example, tapping) for an app (for example, Smart life) icon, the mobile phone may display a GUI shown in FIG. 10(*b*)-1 and FIG. 10(*b*)-2.

In this embodiment of this application, the mobile phone, the smart television 1, the smart television 2, the smart television 3, and the smart television 4 may be connected to a same router. Alternatively, there is a central device, for example, the mobile phone, among the mobile phone, the smart television 1, the smart television 2, the smart television 3, and the smart television 4.

For example, the router may be used as an access point (access point, AP) to provide a signal source of a network. Further, the mobile phone, the smart television 1, the smart television 2, the smart television 3, and the smart television 4 may be used as stations (station, STA) to access the router. The router may separately communicate with each electronic device in a wired network manner or a wireless network manner. For example, a Wi-Fi link is established between the electronic devices by using a wireless fidelity (wireless fidelity, Wi-Fi) protocol, to implement communication between the devices. A specific implementation may be as follows: A peer-to-peer (peer-to-peer, P2P) connection (or referred to as Wi-Fi direct (Wi-Fi Direct)) is established between the electronic devices, or each electronic device accesses a same router, to implement communication between the devices.

For another example, a Wi-Fi P2P GO, that is, a Group Owner, is created on a central device (for example, the mobile phone), and other devices serves as P2P GCs, that is, Group Clients, to be connected to the GO. In this way, a one-to-many combined display is formed between these devices, and these devices can communicate with each other.

In an embodiment, after the smart television 1, the smart television 2, the smart television 3, and the smart television 4 are powered on, the smart television 1, the smart television 2, the smart television 3, and the smart television 4 may be in a to-be-discovered state within preset duration (for example, 10 minutes) starting from a power-on moment. Another device in the local area network may discover the smart television 1, the smart television 2, the smart television 3, and the smart television 4. For example, when the mobile phone needs to perform projection, the mobile phone may search for a device in the local area network, to prompt the user that projection may be performed on the smart television 1, the smart television 2, the smart television 3, or the smart television 4.

As shown in FIG. 10(*b*)-1 and FIG. 10(*b*)-2, the mobile phone may display a display interface of Smart life. In response to detecting an operation of tapping a control 1001 by the user, the mobile phone may display a function list, where the function list includes functions such as discovering a device, creating intelligence, sharing a device, and connecting to a third-party platform.

In an embodiment, in response to detecting an operation of tapping a "Discovering a device" function 1002 by the user, the mobile phone may send a broadcast message to a device located in the same local area network as that of the mobile phone, where the broadcast message indicates the electronic device to enter a combined display state. In response to receiving the broadcast message, the smart television 1, the smart television 2, the smart television 3, and the smart television 4 may display QR codes on displays. The QR code displayed by each smart television indicates address information (for example, a media access control (media access control, MAC) address) of the smart television. For example, QR code information displayed on the smart television 1 indicates that address information of the smart television 1 is a MAC address 1; QR code information displayed on the smart television 2 indicates that address information of the smart television 2 is a MAC address 2; QR code information displayed on the smart television 3 indicates that address information of the smart television 3 is a MAC address 3; and QR code information displayed on the smart television 4 indicates that address information of the smart television 4 is a MAC address 4.

As shown in FIG. 10(*c*)-1 and FIG. 10(*c*)-2, the mobile phone may display another display interface of Smart life. The display interface includes a prompt box 1003, where the prompt box 1003 includes prompt information "It is detected that there are a plurality of electronic devices in the local area network. Do you want to enable the plurality of electronic devices to perform combined display". In response to detecting, by the mobile phone, an operation of tapping a control 1004 by the user, the mobile phone may display a GUI shown in FIG. 10(*d*)-1 and FIG. 10(*d*)-2.

In an embodiment, after the mobile phone sends a broadcast message, the smart television 1, the smart television 2, the smart television 3, and the smart television 4 may send responses to the mobile phone. If the mobile phone receives responses from a plurality of electronic devices (for example, the smart television 1, the smart television 2, the smart television 3, and the smart television 4), the mobile phone may display the prompt box 1003.

As shown in FIG. 10(*d*)-1 and FIG. 10(*d*)-2, the mobile phone may start a camera and display prompt information "Please place electronic devices that need to perform combined display in the following preview box". The mobile phone may display, in a preview box 1005, information that is about the plurality of devices and that is collected by the camera of the mobile phone. When the mobile phone detects an operation of tapping a control 1006 by the user, the mobile phone may display a GUI shown in FIG. 10(*e*)-1 and FIG. 10(*e*)-2.

In an embodiment, when the mobile phone detects the operation of tapping the control 1006 by the user, the mobile phone may determine address information of the plurality of smart televisions based on the QR code information that is displayed on the plurality of smart televisions and that is in the preview box 1005. In addition, the mobile phone may also determine orientation information of each smart television based on the image in the preview box 1005. For example, the mobile phone may determine that a device whose MAC address is 1 is located in an upper left corner, that a device whose MAC address is 2 is located in an upper right corner, that a device whose MAC address is 3 is located in a lower left corner, and that a device whose MAC address is 4 is located in a lower right corner.

As shown in FIG. 10(*e*)-1 and FIG. 10(*e*)-2, the mobile phone may display prompt information "It is detected that currently four electronic devices need to perform combined display, and please select one electronic device as a main control device". In response to detecting, by the mobile phone, that the user selects a device 1007 located in the upper left corner, and detecting an operation of tapping a control 1008 by the user, the mobile phone may determine that a device whose address information is the MAC address 1 is the main control device.

In an embodiment, when the mobile phone determines that the user selects the smart television 1 as the main control device, the mobile phone may send indication information to the smart television 1, where the indication information indicates address information of other smart televisions (the smart television 2, the smart television 3, and the smart television 4) and orientation information of other smart devices and the smart television 1.

In this embodiment of this application, the indication information sent by the mobile phone to the smart television 1 may be used for image segmentation performed by the smart television 1. After obtaining the indication information, the smart television 1 may determine devices that are selected by the user for combined display and a specific device to which segmented images should be sent for display. For example, the smart television 1 may learn, based on the indication information, that the user selects four devices for combined display; that the smart television 1 is located in an upper left corner of the four devices; that the device whose address information is the MAC address 2 is located in an upper right corner of the four devices; that the device whose address information is the MAC address 3 is located in a lower left of the four devices; and that the device whose address information is the MAC address 4 is located in a lower right of the four devices. After obtaining the image, the smart television 1 may segment the image into four images (an image in an upper left corner, an image in an upper right corner, an image in a lower left corner, and an image in a lower right corner). The smart television 1 may display the image in the upper left corner on the display; send the image in the upper right corner to the device whose address information is the MAC address 2 for display, send the image in the lower left corner to the device whose address information is the MAC address 3 for display, and send the image in the lower right corner to the device whose address information is the MAC address 4 for display.

In an embodiment, after receiving the indication information, the smart television 1 may determine that the smart television 1 is the main control device, and the smart television 1 may indicate other smart televisions to disable device discovery (or indicate other smart devices to stop entering a to-be-discovered state). After receiving notification from the smart television 1, other smart televisions may disable device discovery.

A GUI shown in FIG. 10(*f*) is a video playback interface, and the video playback interface includes a video display window 1009 and a projection control 1010. In response to detecting an operation of tapping the control 1010 by the user, the mobile phone may display a GUI shown in FIG. 10(*g*).

It should be understood that the mobile phone shown in FIG. 10(*f*) and the mobile phone shown in FIG. 10(*a*)-1 to FIG. 10(*e*)-2 may be the same, or may be different.

On the GUI shown in FIG. 10(*g*), the mobile phone may display a prompt box 1011, where the prompt box 1011 includes a list of devices on which projection may be performed and that are found by the mobile phone. Because the smart television 2, the smart television 3, and the smart television 4 have disabled device discovery, only the smart television 1 exists in the list of devices. In response to detecting an operation of selecting, by the user, the smart television 1 to perform projection, the mobile phone may send the image in the video display window 1009 to the smart television 1.

As shown in FIG. 10(*h*), in response to an operation of selecting the smart television 1 by the user, the mobile phone may send the image in the video display window 1009 to the smart television 1. After receiving the image sent by the mobile phone, the smart television 1 may segment the image based on orientation information of the smart television 1 and another smart television. For example, the smart television 1 may segment each frame of image in the image into four frames of images. For example, the four frames of images obtained after segmentation are respectively an image 1012 in an upper left corner, an image 1013 in an upper right corner, an image 1014 in a lower left corner, and an image 1015 in a lower right corner.

The smart television 1 may send the image 1013 in the upper right corner to the smart television 2 based on orientation information of the smart television 2 and address information of the smart television 2, so that the smart television 2 may display the image 1013. The smart television 1 may send the image 1014 in the lower left to the smart television 3 based on orientation information of the smart television 3 and address information of the smart television 3, so that the smart television 3 may display the image 1014. The smart television 1 may send the image 1015 in the lower right corner to the smart television 4 based on orientation information of the smart television 4 and address information of the smart television 4, so that the smart television 4 may display the image 1015. The smart television 1 may display the image 1012 in the upper left corner.

In this embodiment of this application, a plurality of small displays can form a large display without using another hardware device, and there is no requirement on display installation, thereby helping reduce hardware costs. A user may select one display from the plurality of small displays as a controlling display. Subsequently, image segmentation and distribution display may be performed on the controlling display, thereby helping improve user experience.

FIG. 11(*a*)-1 to FIG. 11(*b*)-2 show another set of GUIs according to an embodiment of this application.

As shown in FIG. 11(*a*)-1 and FIG. 11(*a*)-2, when the mobile phone detects an operation of tapping a control 1101 by the user, the mobile phone may display a function list, where the function list includes functions of discovering a device, performing large-screen combined display, sharing a device, and connecting to a third-party platform. When the mobile phone detects an operation of tapping a "Performing large-screen combined display" function 1102 by the user, the mobile phone may display a GUI shown in FIG. 11(*b*)-1 and FIG. 11(*b*)-2.

In an embodiment, in response to detecting an operation of tapping a "Performing large-screen combined display" function 1102 by the user, the mobile phone may send a broadcast message to a device located in the same local area network as the mobile phone, where the broadcast message indicates the electronic device to enter a combined display state. In response to receiving the broadcast message, the smart television 1, the smart television 2, the smart television 3, and the smart television 4 may display QR codes on the displays, where the QR code displayed on each smart television indicates address information (for example, a MAC address) of the smart television.

As shown in FIG. 11(*b*)-1 and FIG. 11(*b*)-2, in response to the operation of selecting the "Performing large-screen combined display" function 1102 by the user, the mobile phone may start a camera and display prompt information "Please place electronic devices that need to perform combined display in the following preview box". The mobile phone may display, in a preview box 1103, information that is about the plurality of devices and that is collected by the camera of the mobile phone. When the mobile phone detects the operation of tapping the control 1104 by the user, the mobile phone may determine address information of the plurality of smart televisions based on the QR code information that is displayed on the plurality of smart televisions and that is in the preview box 1103. In addition, the mobile phone may also determine orientation information of each smart television based on the image in the preview box 1103.

It should be understood that for a process in which the mobile phone detects the operation of tapping the control 1104 by the user, refer to FIG. 10(*e*)-1 to FIG. 10(*h*). For brevity, details are not described herein again.

FIG. 12(*a*) to FIG. 12(*f*) show another set of GUIs according to an embodiment of this application.

As shown in FIG. 12(*a*), a living room includes the smart television 1, the smart television 2, the smart television 3, the smart television 4, and a smart television 5.

As shown in FIG. 12(*b*)-1 and FIG. 12(*b*)-2, when the mobile phone determines that the user expects to perform large-screen combined display, the mobile phone may start a camera and display prompt information "Please place electronic devices that need to perform combined display in the following preview box".

It should be understood that for a process in which the mobile phone determines that the user expects to perform large-screen combined display, refer to the GUIs shown in FIG. 10(*a*)-1 to FIG. 10(*d*)-2. Alternatively, refer to the GUIs shown in FIG. 11(*a*)-1 to FIG. 11(*b*)-2.

The mobile phone may display, in a preview box 1201, information that is about the plurality of devices and that is collected by the camera of the mobile phone. When the mobile phone detects the operation of tapping the control 1202 by the user, the mobile phone may determine address information of the plurality of smart televisions based on the QR code information that is displayed on the plurality of smart televisions and that is in the preview box 1201. In addition, the mobile phone may also determine orientation information of each smart television based on the image in the preview box 1201.

It should be understood that for a process in which the mobile phone detects the operation of tapping the control 1104 by the user, refer to FIG. 10(*e*)-1 to FIG. 10(*h*). Details are not described herein again.

As shown in FIG. 12(*c*)-1 and FIG. 12(*c*)-2, when the mobile phone determines that the five devices in the preview box 1201 are irregularly distributed, the mobile phone may prompt the user that "It is detected that currently five electronic devices need to perform combined display. To ensure an image display effect, it is recommended that you select the devices in the dashed box for combined display." The mobile phone may prompt the user to select four devices in the dashed box for combined display. When the mobile phone detects an operation that the user taps the control 1203, the mobile phone may enable the smart television 1, the smart television 2, the smart television 3, and the smart television 4 to perform combined display, and prompt the user to select one of the devices as a main control device.

It should be understood that for a process in which the mobile phone prompts the user to select one of the devices as the main control device, refer to the GUI shown in FIG. 10(*e*)-1 and FIG. 10(*e*)-2. For brevity, details are not described herein again.

It should be further understood that, when the mobile phone detects that the user selects the smart television 1 as the main control device, the mobile phone may send indication information to the smart television 1. For description of the indication information, refer to the description in the foregoing embodiment.

As shown in FIG. 12(*d*), the GUI is a video playback interface, and the video playback interface includes a video display window 1205 and a projection control 1206. In response to detecting an operation of tapping the control 1206 by the user, the mobile phone may display a GUI shown in FIG. 12(*e*).

On the GUI shown in FIG. 12(*e*), the mobile phone may display a prompt box 1207, where the prompt box 1207 includes a list of devices on which projection may be performed and that are found by the mobile phone. The list of devices includes the smart television 1 and the smart television 5. After the smart television 1, prompt information "in combined display" is further included.

In response to detecting an operation of selecting, by the user, the smart television 1 to perform projection, the mobile phone may send the image in the video display window 1205 to the smart television 1.

As shown in FIG. 12(*f*), in response to an operation of selecting the smart television 1 by the user, the mobile phone may send the image in the video display window 1205 to the smart television 1. After receiving the image sent by the mobile phone, the smart television 1 may segment the image based on orientation information of the smart television 1 and another smart television. For example, the smart television 1 may segment each frame of image in the image into four frames of images. For example, the four frames of images obtained after segmentation are an image 1208 in an upper left corner, an image 1209 in an upper right corner, an image 1210 in a lower left corner, and an image 1211 in a lower right corner.

The smart television 1 may send the image 1209 in the upper right corner to the smart television 2 based on orientation information of the smart television 2 and address information of the smart television 2, so that the smart television 2 may display the image 1209. The smart television 1 may send the image 1210 in the lower left to the smart television 3 based on orientation information of the smart television 3 and address information of the smart television 3, so that the smart television 3 may display the image 1210. The smart television 1 may send the image 1211 in the lower right corner to the smart television 4 based on orientation information of the smart television 4 and address information of the smart television 4, so that the smart television 4 may display the image 1211. The smart television 1 may display the image 1208 in the upper left corner.

In an embodiment, in response to an operation of selecting, by the user, the smart television 1, the smart television 2, the smart television 3, and the smart television 4 for combined display, the mobile phone may further indicate the smart television 5 to enter a screen-off state, to avoid an impact caused by the smart television 5 on the user when the image is displayed on the smart television 1 to the smart television 4. This helps improve user experience during video watching.

In this embodiment of this application, when a plurality of small displays are irregularly distributed, the mobile phone may prompt the user to select an appropriate display distribution manner for device combined display. This can ensure that the user obtains an optimal image viewing effect when using the mobile phone for projection, thereby helping improve user experience.

The GUIs shown in FIG. 10(*a*)-1 to FIG. 10(*h*) and FIG. 12(*a*) to FIG. 12(*f*) all show processes of displaying the image on the smart television 1, the smart television 2, the smart television 3, and the smart television 4 in a mobile phone projection manner. With reference to FIG. 13A and FIG. 13B, the following describes a process in which after receiving indication information, the smart television 1 plays, on the smart television 1, the smart television 2, the smart television 3, and the smart television 4, the image displayed on the smart television 1. FIG. 13A and FIG. 13B show another GUI according to an embodiment of this application.

As shown in FIG. 13A and FIG. 13B, when the smart television 1 needs to display a channel switching interface, the smart television may perform image segmentation on the channel switching interface based on indication information sent by the mobile phone, to obtain image 1301, image 1302, image 1303, and image 1304. In this way, one split image is displayed on the smart television 1, and other split images are separately sent to the smart television 2, the smart television 3, and the smart television 4 for display. It should be understood that for processes of displaying the image on the smart television 1, the smart television 2, the smart television 3, and the smart television 4, refer to descriptions in the foregoing embodiment. For brevity, details are not described herein again.

FIG. 14(*a*) to FIG. 14(*c*) show another set of GUIs according to an embodiment of this application.

A GUI shown in FIG. 14(*a*) is another display interface of Smart life. After the mobile phone enables the smart television 1, the smart television 2, the smart television 3, and the smart television 4 to perform combined display, a display box 1401 of device information of combined display devices may be added to the display interface. When the mobile phone detects a touch and hold operation performed by the user on the display box 1401, the mobile phone may display a GUI shown in FIG. 14(*b*).

The GUI shown in FIG. 14(*b*) is another display interface of Smart life. In response to detecting the touch-and-hold operation performed by the user on the display box 1401, the mobile phone may display a control 1402. When the mobile phone detects an operation of tapping the control 1402 by the user, the mobile phone may send another piece of indication information to the smart television, where the another piece of indication information indicates the smart television 1 to cancel combined display with the smart television 2, the smart television 3, and the smart television 4. After receiving the another piece of indication information, the smart television 1 may indicate the smart television 2, the smart television 3, and the smart television 4 to cancel combined display: Then, when the mobile phone detects a projection operation performed by the user, the mobile phone may further prompt the user to select one projection device from the smart television 1, the smart television 2, the smart television 3, and the smart television 4.

A GUI shown in FIG. 14(*c*) is another display interface of Smart life. In response to the operation of tapping the control 1402 by the user, the mobile phone deletes the display box 1401 from the display interface.

It should be noted that all or some of the foregoing embodiments provided in this application may be freely and randomly combined with each other.

The combined display method provided in embodiments of this application is applicable to the following mobile device and electronic device.

Figure 15:
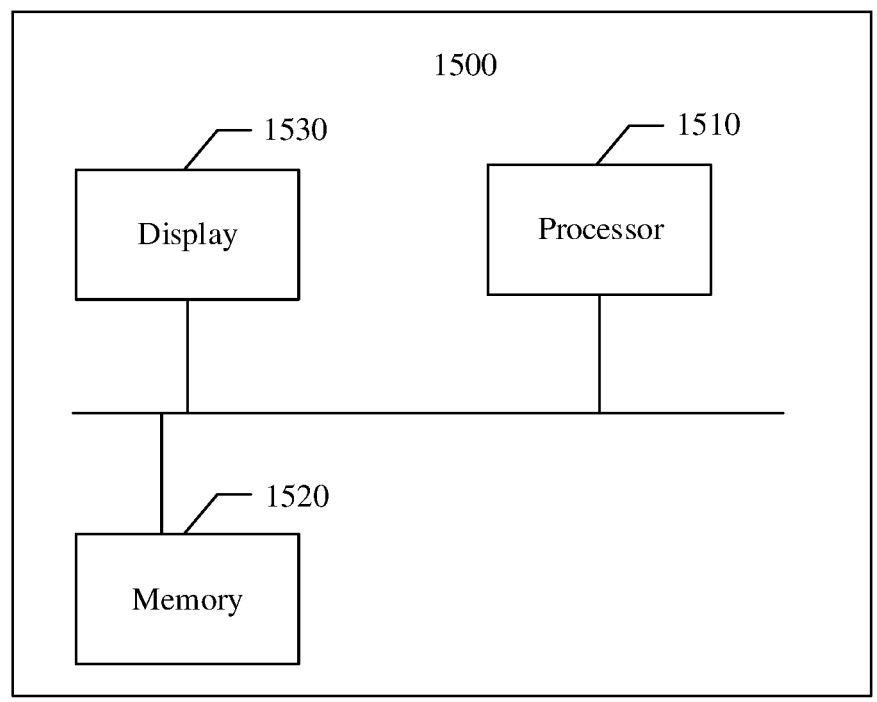
FIG. 15 is a schematic diagram of structure composition of a mobile device according to an embodiment of this application.

FIG. 15 shows a mobile device 1500 according to this application. For example, the mobile device 1500 includes at least one processor 1510, a memory 1520, and a display 1530. The processor 1510 is coupled to the memory 1520 and the display 1530. The coupling in this embodiment of this application may be a communication connection, may be an electrical connection, or may be in another form. Specifically, the memory 1520 is configured to store program instructions. The display 1530 is configured to display a user interface. The processor 1510 is configured to invoke the program instructions stored in the memory 1520, and the mobile device 1500 is enabled to perform the steps performed by the mobile device in the combined display method provided in embodiments of this application. It should be understood that the mobile device 1500 may be configured to implement the combined display method provided in embodiments of this application. For related features, refer to the foregoing descriptions. Details are not described herein.

In some embodiments, when the display has a touch function, the display is also referred to as a touch display screen. An operation on the touch display screen may be implemented by using a virtual key. When the display has no touch function, the display is also referred to as a non-touch display screen. An operation on the non-touch display may be implemented by using a physical button.

This application provides a computer program product including instructions. When the computer program product runs on a mobile device, the mobile device is enabled to perform the steps performed by the mobile device in the combined display method provided in embodiments of this application.

This application provides a computer-readable storage medium including instructions. When the instructions are run on a mobile device, the mobile device is enabled to perform the steps performed by the mobile device in the combined display method provided in embodiments of this application.

A person skilled in the art may clearly understand that embodiments of this application may be implemented by hardware, or by hardware and software. When embodiments of this application are implemented by hardware and software, the foregoing functions may be stored in a computer-readable medium. Based on such an understanding, the technical solutions of embodiments of this application essentially, or a part that contributes to a current technology, or all or a part of the technical solutions may be embodied in a form of a software product. The computer software product is stored in a storage medium, and includes several instructions for instructing a computer device (which may be a personal computer, a server, or a network device) or a processor to perform all or some of the steps of the methods in embodiments of this application. The foregoing storage medium includes any medium that can store program code, such as a flash memory, a removable hard disk, a read-only memory, a random access memory, a magnetic disk, or an optical disc.

Figure 16:
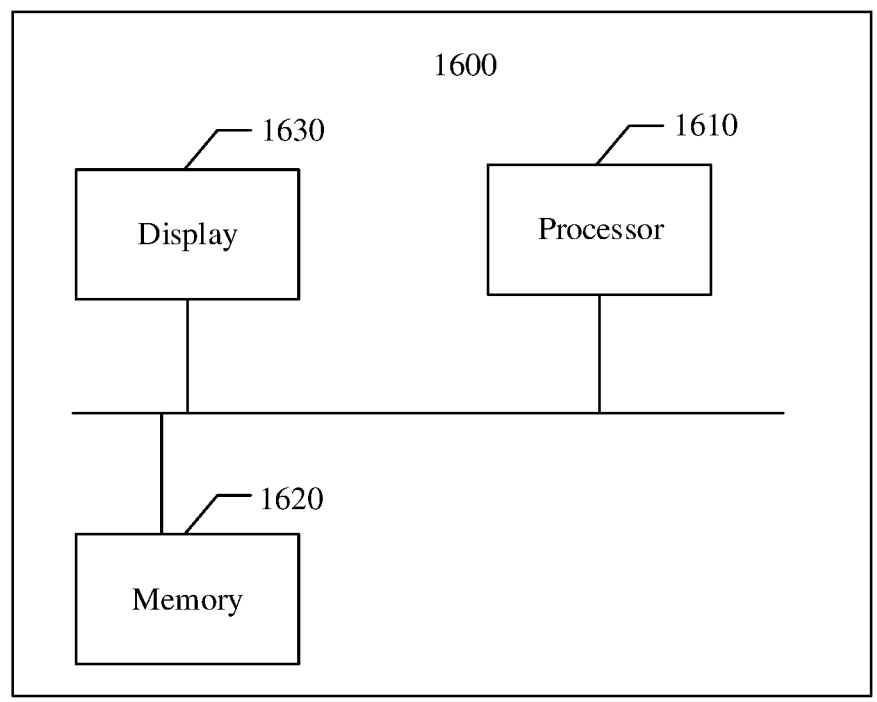
FIG. 16 is a schematic diagram of structure composition of an electronic device according to an embodiment of this application.

FIG. 16 shows an electronic device 1600 according to this application. For example, the electronic device 1600 includes at least one processor 1610, a memory 1620, and a display 1630. The processor 1610 is coupled to the memory 1620 and the display 1630. The coupling in this embodiment of this application may be a communication connection, may be an electrical connection, or may be in another form. Specifically, the memory 1620 is configured to store program instructions. The display 1630 is configured to display a user interface. The processor 1610 is configured to invoke the program instructions stored in the memory 1620, and the electronic device 1600 is enabled to perform the steps performed by the electronic device in the combined display method provided in embodiments of this application. It should be understood that the electronic device 1600 may be configured to implement the combined display method provided in embodiments of this application. For related features, refer to the foregoing descriptions. Details are not described herein.

In some embodiments, when the display has a touch function, the display is also referred to as a touch display screen. An operation on the touch display screen may be implemented by using a virtual button. When the display has no touch function, the display is also referred to as a non-touch display screen. An operation on the non-touch display may be implemented by using a physical button.

This application provides a computer program product including instructions. When the computer program product runs on an electronic device, the electronic device is enabled to perform the steps performed by the electronic device in the method provided in embodiments of this application.

This application provides a computer-readable storage medium including a computer program. When the computer program is run on an electronic device, the electronic device is enabled to perform the steps performed by the electronic device in the method provided in embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part that contributes to a current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A combined display system, wherein the system comprises:
   a mobile device configured to broadcast a first message in response to a received first input, wherein the first message indicates that a combined display needs to be performed,
   a first electronic device that comprises a first display and is configured to display first information on the first display in response to the received first message, wherein the first information indicates address information of the first electronic device;
   a second electronic device that comprises a second display and that is configured to display second information on the second display in response to the received first message, wherein the second information indicates address information of the second electronic device, wherein the mobile device and the first and second electronic devices are located in a same local area network;
   the mobile device is further configured to:
      obtain a first image, wherein the first image comprises the first display and the second display, the first display displays the first information, and the second display displays the second information;
      select the first electronic device corresponding to the first display as a main control device, and send a second message to the first electronic device, wherein the second message comprises the first information, the second information, orientation information of the first display and the second display, a size proportion relationship between the first display and the second display, and a correspondence between the first information and the first display that are obtained by the mobile device based on the first image, and the second message further indicates that the first electronic device is selected as the main control device; and
   the first electronic device is further configured to: control, in response to the received second message, the first display and the second display to perform combined display.

2. The system of claim 1, wherein the selecting the first electronic device corresponding to the first display as a main control device comprises:
   receiving, by the mobile device, user selection for the first electronic device corresponding to the first display; and
   recording, by the mobile device, the first electronic device as the main control device in response to the user selection.

3. The system of claim 1, wherein the selecting the first electronic device corresponding to the first display as a main control device comprises:
   randomly selecting, by the mobile device, the first electronic device corresponding to the first display as the main control device.

4. The system of claim 1, wherein
   the first electronic device and the second electronic device are further configured to maintain a first state after being powered on, until duration elapsing after the power-on reaches preset duration or until the first electronic device and the second electronic device receive the second message, a notification message, or a stop message, wherein in the first state, the first electronic device and the second electronic device are configured to display the first information and the second information respectively on the first display and the second display after receiving the first message from the mobile device;
   the first electronic device is further configured to send a notification message to the second electronic device after receiving the second message from the mobile device, wherein the notification message indicates the second electronic device to stop being in the first state;
   the second electronic device is further configured to enter a second state after receiving the notification message, wherein in the second state, the second electronic device is controlled only by the main control device; and
   the second electronic device is further configured to skip displaying the second information on the second display after receiving the stop message.

5. The system of claim 1, wherein the controlling the first display and the second display to perform combined display comprises:
receiving, by the first electronic device, a to-be-displayed image frame; segmenting the image frame based on the orientation information of the first display and the second display, the size proportion relationship between the first display and the second display, and a size of the first display, to obtain a first partial image and a second partial image; displaying the first partial image on the first display; sending the second partial image to the second electronic device; and indicating to display the second partial image on the second display.

6. The system of claim 5, wherein the segmenting the image frame based on the orientation information of the first display and the second display, the size proportion relationship between the first display and the second display, and a size of the first display comprises:
segmenting the image frame based on the orientation information of the first display and the second display, the size of the first display, and a size of the second display.

7. The system of claim 5, wherein the image frame comes from projection data of the mobile device.

8. The system of claim 1, wherein the mobile device is specifically configured to:
before obtaining the first image, prompt to photograph the first display and the second display that need to perform combined display; and
obtain the first image in response to a detected photographing operation performed on the first display and the second display.

9. The system of claim 1, wherein the first information indicates a media access control layer MAC address of the first electronic device, and the second information indicates a MAC address of the second electronic device.

10. A method performed by a mobile device, wherein the mobile device, a first electronic device, and a second electronic device are located in a same local area network, the first electronic device comprises a first display, and the second electronic device comprises a second display; and the method comprises:
receiving a first input;
broadcasting a first message in response to the first input, wherein the first message indicates that combined display needs to be performed;
obtaining a first image, wherein the first image comprises the first display and the second display, the first display displays first information, the second display displays second information, the first information indicates address information of the first electronic device, and the second information indicates address information of the second electronic device;
selecting the first electronic device corresponding to the first display as a main control device, and sending a second message to the first electronic device, wherein the second message comprises the first information, the second information, orientation information of the first display and the second display, and a correspondence between the first information and the first display that are obtained by the mobile device based on the first image, and the second message further indicates that the first electronic device is selected as the main control device; and
sending an image frame to the first electronic device, or sending a link address to the first electronic device.

11. The method of claim 10, wherein the selecting the first electronic device corresponding to the first display as a main control device comprises:
receiving user selection for the first electronic device corresponding to the first display; and
recording the first electronic device as the main control device in response to the user selection.

12. The method of claim 10, wherein the selecting the first electronic device corresponding to the first display as a main control device comprises:
randomly selecting the first electronic device corresponding to the first display as the main control device.

13. The method of claim 10, wherein the image frame comes from projection data of the mobile device.

14. A method performed by a first electronic device, wherein the first electronic device, a second electronic device, and a mobile device are located in a same local area network, the first electronic device comprises a first display, and the second electronic device comprises a second display; and the method comprises:
receiving a first message, wherein the first message indicates that combined display needs to be performed;
displaying first information on the first display in response to the received first message, wherein the first information indicates address information of the first electronic device;
receiving a second message sent by the mobile device, wherein the second message comprises the first information, second information, orientation information of the first display and the second display, and a correspondence between the first information and the first display that are obtained by the mobile device based on a first image, and the second message further indicates that the first electronic device is selected as a main control device; and
controlling, in response to the received second message, the first display and the second display to perform combined display.

15. The method of claim 14, wherein before the receiving, by the first electronic device, the first message, the method further comprises:
maintaining, by the first electronic device, a first state after being powered on, until duration elapsing after the power-on reaches preset duration or until the first electronic device receives the second message;
wherein in the first state, the first electronic device is configured to display the first information on the first display after receiving the first message from the mobile device.

16. The method of claim 14, wherein the method further comprises:
sending a notification message to the second electronic device after receiving the second message from the mobile device, wherein the notification message indicates the second electronic device to stop being in the first state.

17. A mobile device, comprising:
a memory configured to store instructions; and
one or more processors coupled to the memory and configured to:
receive a first input;
broadcast a first message in response to the first input, wherein the first message indicates that combined display needs to be performed;
obtain a first image, wherein the first image comprises the first display and the second display, the first display displays first information, the second display displays second information, the first information indicates address information of the first electronic device, and the second information indicates address information of the second electronic device;

select the first electronic device corresponding to the first display as a main control device, and send a second message to the first electronic device, wherein the second message comprises the first information, the second information, orientation information of the first display and the second display, and a correspondence between the first information and the first display that are obtained by the mobile device based on the first image, and the second message further indicates that the first electronic device is selected as the main control device; and send an image frame to the first electronic device, or send a link address to the first electronic device.

18. The mobile device of claim 17, wherein the select the first electronic device corresponding to the first display as a main control device comprises:

receive user selection for the first electronic device corresponding to the first display; and record the first electronic device as the main control device in response to the user selection.

19. The mobile device of claim 17, wherein the select the first electronic device corresponding to the first display as a main control device comprises:

randomly select the first electronic device corresponding to the first display as the main control device.

20. The mobile device of claim 17, wherein the image frame comes from projection data of the mobile device.

\* \* \* \* \*